(12) United States Patent
Kitaguchi et al.

(10) Patent No.: US 8,190,398 B2
(45) Date of Patent: May 29, 2012

(54) ENVIRONMENTAL RADIOACTIVITY MEASUREMENT SYSTEM OF ADMINISTRATION AND AN ANALYSIS METHOD OF THE RADIOACTIVITY

(75) Inventors: Hiroshi Kitaguchi, Naka (JP); Takahiro Tadokoro, Hitachi (JP); Akihisa Kaihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 647 days.

(21) Appl. No.: 12/193,143

(22) Filed: Aug. 18, 2008

(65) Prior Publication Data

US 2009/0070070 A1 Mar. 12, 2009

(30) Foreign Application Priority Data

Sep. 7, 2007 (JP) ................. 2007-233252

(51) Int. Cl.
*G06F 19/00* (2006.01)
*G06F 17/00* (2006.01)
(52) U.S. Cl. .......... 702/188; 702/127; 702/85; 702/183; 702/1; 705/1.1
(58) Field of Classification Search .................. 702/188, 702/85, 127, 183, 1
See application file for complete search history.

(56) References Cited

U.S. PATENT DOCUMENTS

| | | | | |
|---|---|---|---|---|
| 5,672,876 A | * | 9/1997 | Baba | 250/358.1 |
| 7,130,752 B2 | * | 10/2006 | Yoshida et al. | 702/85 |
| 2002/0079460 A1 | | 6/2002 | Uezu et al. | |
| 2004/0200968 A1 | | 10/2004 | Shibutani et al. | |
| 2004/0220780 A1 | * | 11/2004 | Linley et al. | 702/188 |
| 2009/0112524 A1 | * | 4/2009 | Schiefer | 702/188 |

FOREIGN PATENT DOCUMENTS

| | | |
|---|---|---|
| JP | 06-174850 | 6/1994 |
| JP | 06-201831 | 7/1994 |
| JP | 2002-169078 | 6/2002 |
| JP | 2002-196078 | 7/2002 |
| JP | 2002-251453 | 9/2002 |
| JP | 2003-050279 | 2/2003 |
| JP | 2003-099662 | 4/2003 |
| JP | 2004-301601 | 10/2004 |
| JP | 2006-338552 | 12/2006 |

OTHER PUBLICATIONS

Japanese Office Action for the corresponding Japanese Application No. 2007-233252 dated Sep. 8, 2009.

* cited by examiner

*Primary Examiner* — Hal Wachsman
(74) *Attorney, Agent, or Firm* — Antonelli, Terry, Stout & Kraus, LLP.

(57) ABSTRACT

At a worksite of a client, progeny nuclides of radon and thoron are collected into a filter, then making the gross measurement on α-ray amount within an hour from the collection. Next, the filter is sent to an analysis center with information added thereto, such as collection-condition information, gross-measurement information, and sampling-worksite information. At the analysis center, the gross measurement on the filter sent thereto is made again. Also, the radioactive-nuclide analysis is made to perform evaluation of the radioactivity intensity. Moreover, radon amount and thoron amount at the measurement-specimen sampling points-in-time at the worksite are calculated, then reporting the analysis result of the radon and thoron amounts to the client.

16 Claims, 35 Drawing Sheets

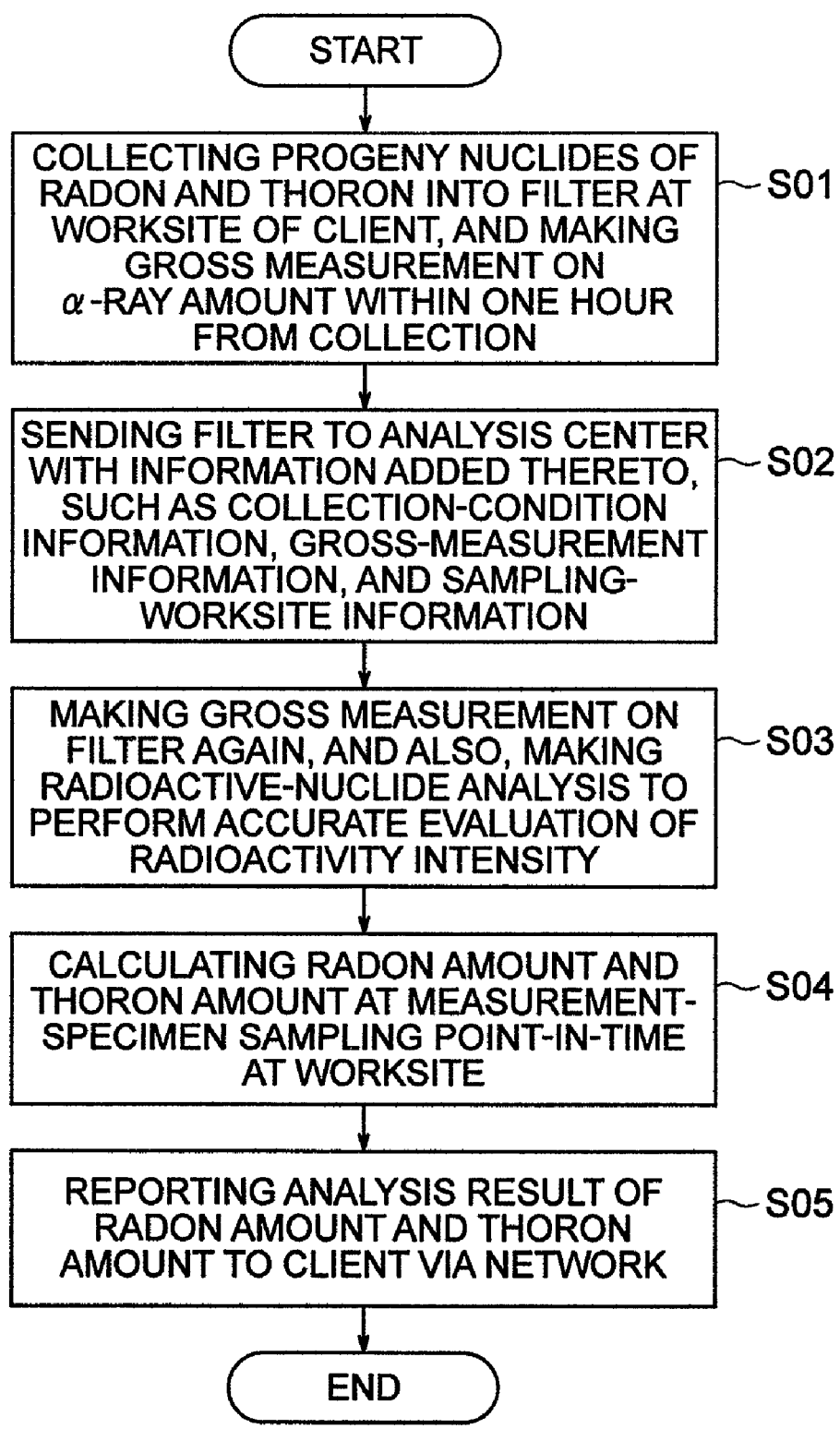

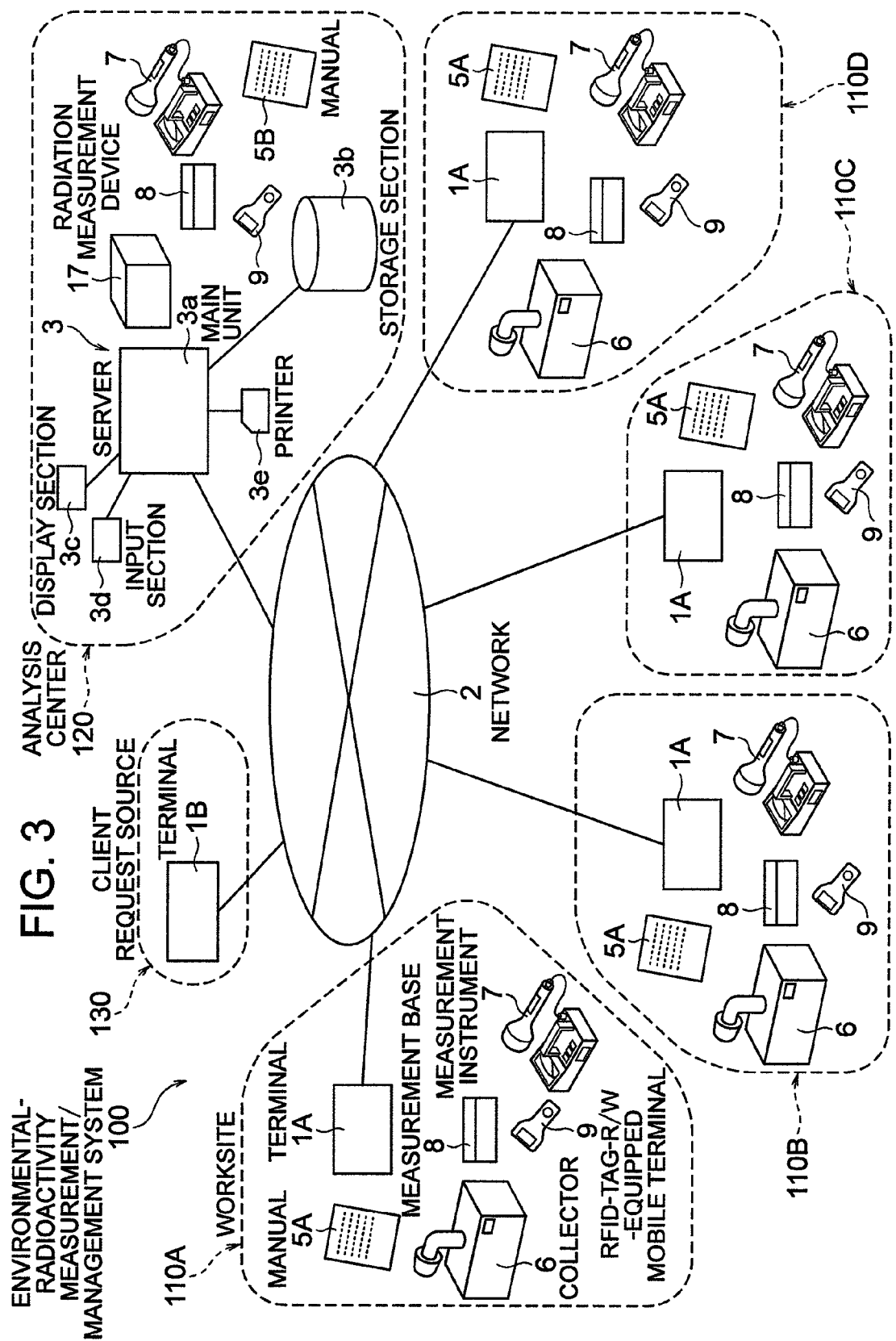

FIG. 5A

| RFID-TAG IDENTIFICATION NUMBER | |
|---|---|
| MANUAL ID | |
| APPLICABLE MEASUREMENT-INSTRUMENT FORMAT | |
| APPLICABLE MEASUREMENT-BASE FORMAT | |
| MEASUREMENT-INSTRUMENT SETTING CONDITION | |
| SENDING DATE | |
| CLIENT CODE | |
| SERVICE-CONTRACT ID | |

50 MANUAL INFORMATION

FIG. 5B

| RFID-TAG IDENTIFICATION NUMBER | |
|---|---|
| COLLECTOR ID | |
| COLLECTOR FORMAT | |
| WIND-SENDING CAPACITY | |
| MANUFACTURING NUMBER | |
| MANUFACTURER | |
| OWNER | |
| SET-UP DATE/CHECK DATE | |
| CHECKER'S NAME | |

51A COLLECTOR INFORMATION

51B CHECK INFORMATION

FIG. 6A

| RFID-TAG IDENTIFICATION NUMBER | |
|---|---|
| MEASUREMENT-INSTRUMENT ID | |
| MEASUREMENT-INSTRUMENT FORMAT | |
| MANUFACTURING NUMBER | |
| MANUFACTURER | |
| OWNER | |
| CALIBRATION EXECUTION DATE | |
| CALIBRATION EXPIRATION TIME-LIMIT | |
| CALIBRATION EXECUTER | |
| APPLICABLE MEASUREMENT-BASE FORMAT | |
| APPLICABLE MANUAL ID | |
| DETECTION EFFICIENCY | |

52 MEASUREMENT-INSTRUMENT INFORMATION

FIG. 6B

| RFID-TAG IDENTIFICATION NUMBER | |
|---|---|
| MEASUREMENT-BASE ID | |
| MEASUREMENT-BASE FORMAT | |
| APPLICABLE MEASUREMENT-INSTRUMENT FORMAT | |
| OWNER | |
| SET-UP DATE | |

53 MEASUREMENT-BASE INFORMATION

FIG. 13

| RFID-TAG IDENTIFICATION NUMBER | |
|---|---|
| WORKSITE-MEASUREMENT OPERATOR NAME | |
| SAMPLING PLACE NAME | |
| COLLECTION TERMINATION POINT-IN-TIME | |
| TIMER SETTING TIME | |
| COLLECTOR ID | |
| COLLECTOR FORMAT | |
| WIND-SENDING CAPACITY | |
| GROSS-MEASUREMENT VALUE | |
| MEASUREMENT POINT-IN-TIME | |
| MEASUREMENT-INSTRUMENT ID | |
| MEASUREMENT-INSTRUMENT FORMAT | |
| CALIBRATION EXPIRATION TIME-LIMIT | |
| DETECTION EFFICIENCY | |
| MEASUREMENT-BASE ID | |
| MEASUREMENT-BASE FORMAT | |
| MANUAL ID | |
| CLIENT CODE | |
| SERVICE-CONTRACT ID | |

54a (S115)
54b
55a (S121)
55b (S124)
51A (S127)
56 (S151) (S153)
52 (S133)
53 (S139)
50 (S112)

FIG. 17A
MEASUREMENT-INSTRUMENT RENTAL DATA — 61

| | | | |
|---|---|---|---|
| CLIENT CODE | | | 61a |
| SERVICE-CONTRACT ID | | | 61b |
| 1 | DURATION START DATE (SENDING DATE) | MM MONTH DD DAY YY YEAR | 62a |
| | DURATION TERMINATION DATE (RECALL DATE) | mm MONTH dd DAY yy YEAR | 62b |
| | MEASUREMENT-INSTRUMENT ID | | 62c |
| | RFID-TAG IDENTIFICATION NUMBER | | 62d |
| | MEASUREMENT-INSTRUMENT FORMAT | | 62e |
| | CALIBRATION EXPIRATION TIME-LIMIT | | 62f |
| | DETECTION EFFICIENCY | | 62g |
| | MANUAL ID | | 62h |
| 2 | | | |

62 ONE-RENTAL-DURATION-EQUIVALENT MEASUREMENT-INSTRUMENT RENTAL DATA UNIT

FIG. 17B
MEASUREMENT-BASE RENTAL DATA — 63

| | | | |
|---|---|---|---|
| CLIENT CODE | | | 63a |
| SERVICE-CONTRACT ID | | | 63b |
| 1 | DURATION START DATE (SENDING DATE) | | 64a |
| | DURATION TERMINATION DATE (RECALL DATE) | | 64b |
| | MEASUREMENT-BASE ID | | 64c |
| | RFID-TAG IDENTIFICATION NUMBER | | 64d |
| | MEASUREMENT-BASE FORMAT | | 64e |
| | MANUAL ID | | 64f |
| | APPLICABLE MEASUREMENT-INSTRUMENT FORMAT | | 64g |
| 2 | | | |

64 MEASUREMENT-BASE RENTAL DATA UNIT

FIG. 18A
65 COLLECTOR RENTAL DATA

| | | |
|---|---|---|
| CLIENT CODE | | ← 65a |
| SERVICE-CONTRACT ID | | ← 65b |
| 1 | DURATION START DATE (SENDING DATE) | ← 66a |
| | DURATION TERMINATION DATE (RECALL DATE) | ← 66b |
| | COLLECTOR ID | ← 66c |
| | RFID-TAG IDENTIFICATION NUMBER | ← 66d |
| | COLLECTOR FORMAT | ← 66e |
| | WIND-SENDING CAPACITY (LITER/MINUTE) | ← 66f |
| | MANUFACTURING NUMBER | ← 66g |
| | MANUFACTURER | ← 66h |
| | (1) | CHECK DATE | ← 66i |
| | | CHECKER | |
| | | REMARKS | |
| | (2) | CHECK DATE | ← 66i |
| | | CHECKER | |
| | | REMARKS | |

66 COLLECTOR RENTAL DATA UNIT

CHECK DATA

FIG. 18B
67 MOBILE-TERMINAL RENTAL DATA

| | | |
|---|---|---|
| CLIENT CODE | | ← 67a |
| SERVICE-CONTRACT ID | | ← 67b |
| 1 | DURATION START DATE (SENDING DATE) | ← 68a |
| | DURATION TERMINATION DATE (RECALL DATE) | ← 68b |
| | MOBILE-TERMINAL ID | ← 68c |
| | FORMAT | ← 68d |
| | MANUFACTURING NUMBER | ← 68e |
| | MANUFACTURER | ← 68f |
| 2 | | |

68 MOBILE-TERMINAL RENTAL DATA UNIT

FIG. 19

| | | | |
|---|---|---|---|
| | CLIENT CODE | | ~69a |
| | SERVICE-CONTRACT ID | | ~69b |
| 1 | DURATION START DATE (SENDING DATE) | | ~70a |
| | DURATION TERMINATION DATE (RECALL DATE) | | ~70b |
| | MANUAL ID | | ~70c |
| | RFID-TAG IDENTIFICATION NUMBER | | ~70d |
| | MEASUREMENT-INSTRUMENT FORMAT | | ~70e |
| | MEASUREMENT-BASE FORMAT | | ~70f |
| | PUBLICATION DATE | | ~70g |
| | REVISION NUMBER | | ~70h |
| | REVISION DATE | | ~70i |
| 2 | | | |

69 MANUAL RENTAL DATA

70 MANUAL RENTAL DATA UNIT

FIG. 20

43 MEASUREMENT-INSTRUMENT DB

| | |
|---|---|
| MEASUREMENT-INSTRUMENT ID | 43a |
| RFID-TAG IDENTIFICATION NUMBER | 43b |
| MEASUREMENT-INSTRUMENT NAME | 43c |
| MEASUREMENT-INSTRUMENT FORMAT | 43d |
| APPLICABLE MEASUREMENT-BASE FORMAT | 43e |
| MANUFACTURING NUMBER | 43f |
| MANUFACTURER | 43g |
| USAGE-LIMIT SCHEDULED DATE | 43h |
| DISPOSAL FLAG | 43i |
| OWNER | 43j |
| LOCATION SITUATION FLAG | 43k |
| APPLICABLE MANUAL ID | 43m |
| 1 SERVICE-CONTRACT ID | |
|   IN-SERVICE DURATION (START, TERMINATION) | |
|   CALIBRATION EXECUTION DATE | |
|   CALIBRATION EXPIRATION TIME-LIMIT | |
|   CALIBRATION EXECUTER | |
|   DETECTION EFFICIENCY | 43n |
| 2 | |
| | |
| | 43n |

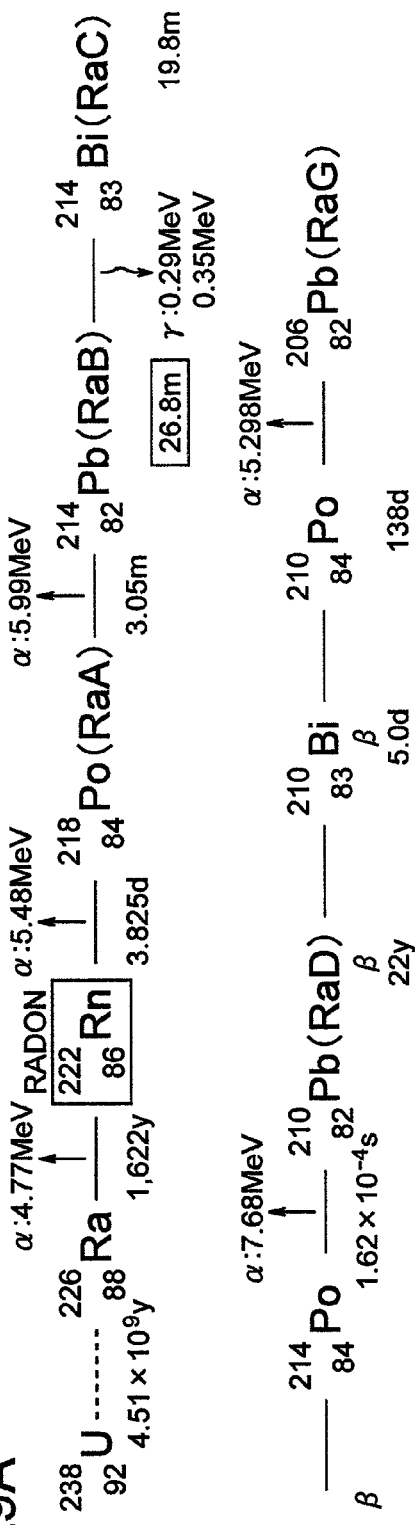
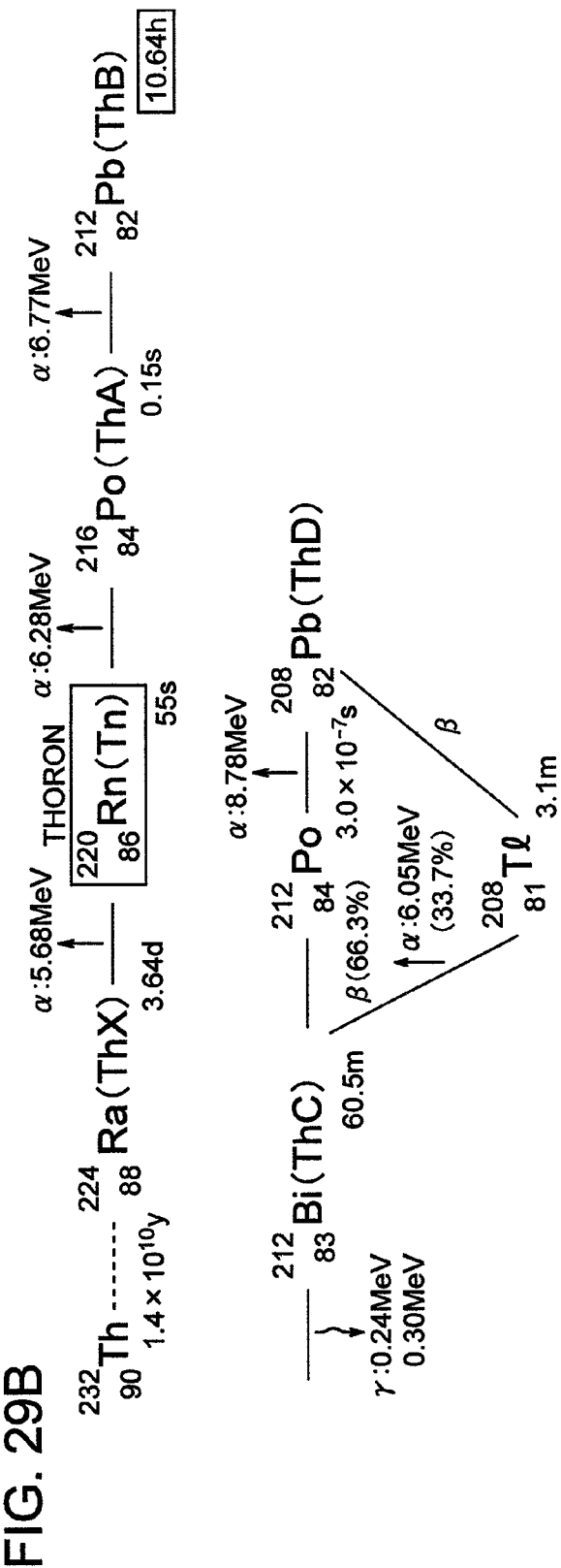
FIG. 29A
FIG. 29B

FIG. 33

| | | |
|---|---|---|
| RFID-TAG IDENTIFICATION NUMBER | | 48a |
| WORKSITE-MEASUREMENT OPERATOR NAME | | 54a |
| SAMPLING PLACE NAME | | 54b |
| COLLECTION TERMINATION POINT-IN-TIME | | 55a |
| TIMER SETTING TIME | | 55b |
| COLLECTOR ID | | 51A |
| COLLECTOR FORMAT | | |
| WIND-SENDING CAPACITY | | |
| FIRST GROSS-MEASUREMENT VALUE | | 56 |
| MEASUREMENT POINT-IN-TIME | | |
| MEASUREMENT-INSTRUMENT ID | | 52 |
| MEASUREMENT-INSTRUMENT FORMAT | | |
| CALIBRATION EXPIRATION TIME-LIMIT | | |
| DETECTION EFFICIENCY ($\eta 1$) | | |
| MEASUREMENT-BASE ID | | 53 |
| MEASUREMENT-BASE FORMAT | | |
| MANUAL ID | | 50 |
| CLIENT CODE | | |
| SERVICE-CONTRACT ID | | |
| SECOND GROSS-MEASUREMENT VALUE | | 81 |
| MEASUREMENT POINT-IN-TIME | | |
| MEASUREMENT-INSTRUMENT ID | | 82 |
| MEASUREMENT-INSTRUMENT FORMAT | | |
| CALIBRATION EXPIRATION TIME-LIMIT | | |
| DETECTION EFFICIENCY ($\eta 2$) | | |
| THORON-PROGENY-NUCLIDES RADIOACTIVITY INTENSITY | | 83 |
| GROSS-MEASUREMENT CORRECTION COEFFICIENT $\varepsilon$ | | 84 |
| RADIATION-MEASUREMENT-DEVICE ID | | 85 |
| RADIATION-MEASUREMENT-DEVICE FORMAT | | |
| THORON AMOUNT | | 86 |
| RADON AMOUNT | | 87 |
| REPORT TIME-AND-DATE | | 88 |

FIG. 34

90 BILLING DATA

NUMBER OF MEASUREMENT SPECIMENS

| SAMPLING TIME-AND-DATE | WORKSITE NAME | |
|---|---|---|
| | WORKSITE NAME (SERVICE-CONTRACT ID) | UNITS |
| | | UNITS |

ANALYSIS FEE     ○○○YEN × ☐ UNITS = ☐ YEN

RENTAL FEE

MEASUREMENT INSTRUMENT, MEASUREMENT BASE, MANUAL     ☐ SETS     ☐ YEN

MOBILE TERMINAL     ☐ SETS     ☐ YEN

COLLECTOR     ☐ SETS     ☐ YEN

MEASUREMENT-INSTRUMENT CALIBRATION EXPENSE

CALIBRATION OPERATION + HOME-DELIVERY FEE ○○○YEN × ☐ NUMBER OF EQUIVALENT UNITS = ☐ YEN

RENTAL-APPLIANCE CHECK EXPENSE

BASIC FEE ○○YEN

MAINTENANCE EXPENSE     ☐ YEN     SUBTOTAL ☐ YEN

TOTAL ☐ YEN

ENVIRONMENTAL RADIOACTIVITY MEASUREMENT SYSTEM OF ADMINISTRATION AND AN ANALYSIS METHOD OF THE RADIOACTIVITY

CROSS REFERENCE TO RELATED APPLICATION

This application relates to and claims priority from Japanese Patent Application No. 2007-233252, filed on Sep. 7, 2007.

BACKGROUND OF THE INVENTION

1. Field of the Invention

The present invention relates to an environmental-radioactivity measurement. More particularly, it relates to an environmental-radioactivity measurement/management system using the same measurement, and an analysis method for the radioactivity intensity.

2. Description of the Related Art

In the recommendation (: ICRP Publication 60, 1990) presented by ICRP (International Commission on Radiological Protection), ICRP has made the following recommendation: Even in the case of radiation exposure due to a natural radiation source, for example, "operations at a place at which a regulation authority concerned has declared that careful attention is required for radon, and which the authority has recognized as being an operation worksite of which this requirement holds true" should be added into the range of occupational radiation exposure. Accordingly, there is a possibility that, for example, operations at hot spring, many underground mines, and certain type of underground worksites may be operations of which this requirement holds true.

By the way, in the air at an operation worksite like this, radioactive elements of radon, i.e., a radioactive noble gas, or the series of radon's progeny nuclides (: uranium series), and radioactive elements of thoron, i.e., a radioactive noble gas as well, or the series of thoron's progeny nuclides (: thorium series) exist in a mixed state in many cases. Also, in the series of thoron's progeny nuclides, the half-life of $^{212}$Pb (Pb-212) is equal to 10.64 hours, which is comparatively long. In the series of radon's progeny nuclides, on the other hand, the half-life of $^{214}$Pb (Pb-214) is equal to 26.8 minutes, which is short. As a result, even if $^{214}$Pb is collected using a collector, $^{214}$Pb will decay before it is sent to an analysis center to undergo the measurement and analysis. Consequently, there has existed a problem that it becomes impossible to detect the radioactive elements of the series of radon's progeny nuclides.

Also, in JP-A-2002-196078, the following method has been disclosed: When plural types of radioactive elements which radiate α-rays are in a mixed state, and further, if the energies of their respective α-rays are of mutually close values, the radioactive nuclides are identified and quantified as follows: Namely, this identification and quantification is implemented not by performing a chemical separation of the radioactive elements, but by making the analysis through determination of time intervals of the pulses which have been incident into an α-ray detector.

The method disclosed in JP-A-2002-196078, however, is difficult to employ in a large number of worksites where measurement specimens are to be generally sampled. This difficulty arises from a significant cost needed at this time. Accordingly, it is requested from the viewpoint of internal exposure management that the radioactivity should be measured by using an easier and simpler method. Here, the radioactivity is caused by radon, thoron or the radioactive elements of their progeny nuclides in the air of an environment requested by a client.

SUMMARY OF THE INVENTION

It is an object of the present invention to provide an environmental-radioactivity measurement/management system which allows measurement specimens for measuring environmental radioactivity to be processed at low cost and in large amounts, and an analysis method for the radioactivity intensity.

In order to accomplish the above-described object, in a first invention, there is provided an environmental-radioactivity measurement/management system including a server for managing an environmental-radioactivity measurement service-operation, the environmental-radioactivity measurement service-operation being an operation of sampling measurement specimens at a measurement place requested by a client, making gross measurement on radiation by using a first measurement instrument deployed at the worksite, sending result of the gross measurement and the measurement specimens to an analysis center, and, at the analysis center, calculating amounts of radioactive nuclides at a sampling point-in-time of the measurement specimens and reporting the calculated amounts to the client, the server including a contract management unit for managing measurement contract information which includes the measurement place requested by the client, and a measurement-instrument calibration management unit for managing calibration schedule of the first measurement instrument deployed at the worksite, wherein the measurement-instrument calibration management unit issues an instruction so that an alternative first measurement instrument will be delivered within a calibration expiration time-limit of the first measurement instrument, the first measurement instrument being deployed at the measurement place which is requested by the client based on the measurement contract information managed by the contract management unit, and so that the first measurement instrument deployed until at that time will be recalled in exchange for the delivery of the alternative first measurement instrument, and will be set into carry-out of the calibration.

According to the first invention, with respect to the first measurement instrument which has already become closer to the calibration expiration time-limit, an arrangement is made by the measurement-instrument calibration management unit so that the new first measurement instrument will be delivered before the calibration expiration time-limit has expired. Accordingly, it becomes possible to suitably perform quality management of the gross measurement at the worksite.

In a second invention, there is provided a method of analyzing radioactivity intensity of a measurement specimen in which short half-life component and long half-life component of a natural radioactive nuclide in an environment exist in a mutually mixed state, wherein a first measurement instrument for making gross measurement on radiation with a first detection efficiency is deployed at a sampling worksite of the measurement specimen, a second measurement instrument for making the gross measurement on the radiation with a second detection efficiency, a radiation measurement device for identifying the radioactive nuclide by analyzing energy of the radiation, and calculating radioactivity intensity of the radioactive nuclide, and an analysis-specific computer which stores in advance the first detection efficiency and the second detection efficiency into a memory unit being deployed at an analysis center for making accurate measurement on the measurement specimen, when, at the sampling worksite of the measurement specimen, a first gross-measurement value of the measurement specimen is acquired by the first measurement instrument, and the first gross-measurement value and measurement point-in-time information corresponding thereto are sent to the analysis center together with the sampled measurement specimen, the computer, at the analysis center, including a step A of acquiring, via an input unit, the sent first gross-measurement value and measurement point-in-time information corresponding thereto, a step B of acquiring, via the input unit, a second gross-measurement value of the sent measurement specimen acquired by the second measurement instrument and measurement point-in-time information corresponding thereto within a predetermined time width from a point-in-time of the sampling, a step C of acquiring, via the input unit, the radioactive nuclide and radioactivity intensity measured by the radiation measurement device by directly processing or pre-processing the measurement specimen within a short time from a point-in-time at which the second gross-measurement value was acquired, a step D of calculating a gross-measurement correction coefficient based on the acquired radioactive nuclide, radioactivity intensity, and second gross-measurement value, and the second detection efficiency, a step E of calculating radioactivity intensity of the long half-life component at a point-in-time at which the first gross-measurement value was acquired, based on the second gross-measurement value, the second detection efficiency, the gross-measurement correction coefficient, the measurement point-in-time information on the second gross-measurement value, and the measurement point-in-time information on the first gross-measurement value, and a step F of calculating radioactivity intensity of the short half-life component at the point-in-time at which the first gross-measurement value was acquired, the radioactivity intensity of the short half-life component being calculated by subtracting the radioactivity intensity of the long half-life component calculated at the step E from a value of radioactivity intensity resulting from both of the short half-life component and the long half-life component at the point-in-time at which the first gross-measurement value was acquired, the value of the radioactivity intensity being calculated based on the first gross-measurement value, the first detection efficiency, and the gross-measurement correction coefficient.

According to the second invention, it becomes possible to analyze the short half-life component of a natural radioactive nuclide at the analysis center by combining the easier and simpler methods at a worksite at which a measurement specimen is to be sampled.

According to the present invention, it becomes possible to provide the environmental-radioactivity measurement/management system which allows measurement specimens for measuring environmental radioactivity to be processed at low cost and in large amounts, and the analysis method for the radioactivity intensity.

Other objects, features and advantages of the invention will become apparent from the following description of the embodiments of the invention taken in conjunction with the accompanying drawings.

BRIEF DESCRIPTION OF THE DRAWINGS

FIG. 2 is an entire flowchart for illustrating the flows of the measurement specimens and data in the environmental-radioactivity measurement service-operation;

FIG. 3 is a schematic configuration diagram of the environmental-radioactivity measurement/management system as a whole in the environmental-radioactivity measurement;

FIG. 4A is a diagram for explaining the worksite-used manual, FIG. 4B is a configuration diagram of the collector, FIG. 4C is a diagram for explaining the appliance configuration in the case of making the gross measurement using the measurement instrument, FIG. 4D is an outer-appearance diagram of the RFID-tag-reader/writer-equipped mobile terminal, FIG. 4E is a diagram for explaining a state where the measurement specimens are contained in a container, and FIG. 4F is a configuration diagram of the terminal;

FIG. 5A is a diagram for exemplifying contents of RFID-tag information on a RFID tag affixed on the worksite-used manual, and FIG. 5B is a diagram for exemplifying contents of RFID-tag information on a RFID tag affixed on the collector;

FIG. 6A is a diagram for exemplifying contents of RFID-tag information affixed on the measurement instrument, and FIG. 6B is a diagram for exemplifying contents of RFID-tag information affixed on the measurement base;

FIG. 13 is a diagram for exemplifying contents of RFID-tag information to be written into the RFID tag affixed on the measurement specimen;

FIG. 17A is a diagram for exemplifying measurement-instrument rental data about the measurement instruments which are now rented, and which are recorded into the client rental-appliance DB for each worksite of the clients, and FIG. 17B is a diagram for exemplifying measurement-base rental data about the measurement bases which are now rented, and which are recorded into the client rental-appliance DB for each worksite of the clients;

FIG. 18A is a diagram for exemplifying collector rental data about the collectors which are now rented, and which are recorded into the client rental-appliance DB for each worksite of the clients, and FIG. 18B is a diagram for exemplifying mobile-terminal rental data about the mobile terminals which are now rented, and which are recorded into the client rental-appliance DB for each worksite of the clients;

FIG. 19 is a diagram for exemplifying manual rental data about the manuals which are now rented, and which are recorded into the client rental-appliance DB for each worksite of the clients;

FIG. 20 is a diagram for exemplifying management history information about a single measurement instrument in the measurement-instrument DB;

FIG. 29A is a flowchart for illustrating the decay series of the uranium series' natural radioactive nuclides, and FIG. 29B is a flowchart for illustrating the decay series of the thorium series' natural radioactive nuclides;

FIG. 33 is a diagram for exemplifying contents of a file of the measurement data about a single measurement specimen in the measurement-data DB; and FIG. 34 is a diagram for illustrating a format example of billing data for periodically charging a department of the client, which has commissioned the environmental-radioactivity measurement service-operation, the contract expense needed for the environmental-radioactivity measurement service-operation.

DESCRIPTION OF THE INVENTION

<<Flow of Entire Environmental-Radioactivity Measurement Service-Operation>>

Figure 1:
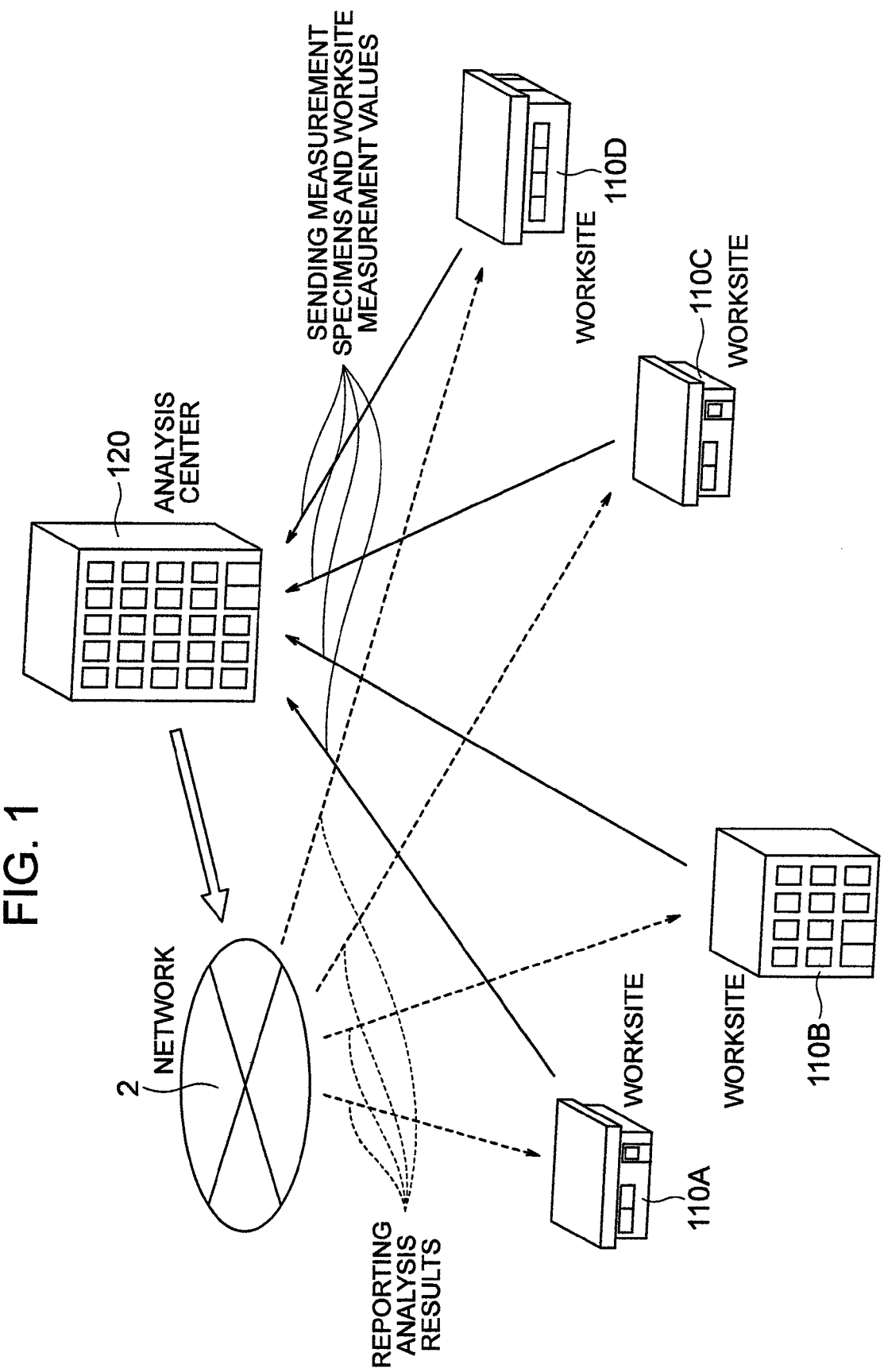
FIG. 1 is a diagram for illustrating flows of measurement specimens and data between worksites of clients at which the measurement specimens in an environmental-radioactivity measurement service-operation according to an embodiment of the present invention are to be sampled, and an analysis center of a service contractor which contracts the environmental-radioactivity measurement service-operation.

Next, referring to the drawings as appropriate, the explanation will be given below concerning an environmental-radioactivity measurement service-operation to which the environmental-radioactivity measurement/management system is applied that is a preferred embodiment of the present invention.

FIG. 1 is a diagram for illustrating flows of measurement specimens and data between worksites of clients at which the measurement specimens in an environmental-radioactivity measurement service-operation according to an embodiment of the present invention are to be sampled, and an analysis center of a service contractor which contracts the environmental-radioactivity measurement service-operation. FIG. 2 is an entire flowchart for illustrating the flows of the measurement specimens and data in the environmental-radioactivity measurement service-operation. FIG. 3 is a schematic configuration diagram of the environmental-radioactivity measurement/management system as a whole in the environmental-radioactivity measurement service-operation.

As illustrated in FIG. 1, at each worksite 110 (denoted by 110A, 110B, 110C, and 110D in FIG. 1) of each client, indoor or outdoor air is collected, thereby collecting, into a filter, progeny nuclides of radon and thoron contained in the air. Moreover, the gross measurement on the α-ray amount is made within, e.g., one hour from the collection (this process corresponds to a step S01 in FIG. 2).

Incidentally, the collection places (i.e., specimen-sampling places) are not limited to the indoors, but include common spaces (such as, e.g., public road, river's neighborhood, mountainous region, and hot-spring resort's vicinity).

The measurement value obtained by this gross measurement corresponds to a first gross-measurement value which will be disclosed in the appended claims.

Next, the filter (i.e., the measurement specimens) is sent to an analysis center 120 with information added thereto, such as collection-condition information, gross-measurement information, and sampling-worksite information (this process corresponds to the solid-line arrows in FIG. 1 and a step S02 in FIG. 2).

Incidentally, regarding concrete contents of the collection-condition information, the gross-measurement information, and the sampling-worksite information, the explanation will be given later referring to FIG. 7 to FIG. 13 in the description of a flow of operation of "first gross measurement".

At the analysis center 120, the gross measurement on the filter (i.e., the measurement specimens) sent thereto is made again. Also, the radioactive-nuclide analysis is made to perform accurate evaluation of the radioactivity intensity (this step corresponds to a step S03 in FIG. 2). The measurement value obtained by this gross measurement at the analysis center 120 corresponds to a second gross-measurement value which will be disclosed in the appended claims.

Incidentally, considering the above-described half-lives of the radon's progeny nuclides (e.g., half-life of $^{214}$Pb is equal to 26.8 minutes), and the above-described half-lives of the thoron's progeny nuclides (e.g., half-life of $^{212}$Pb is equal to 10.64 hours), it is desirable that the acquisition of the second gross-measurement value and the accurate radioactive-nuclide analysis be performed within ten to twenty-four hours after the sampling of the measurement specimens. This is because, within ten to twenty-four hours after the sampling, the radon's progeny nuclides will decay down to a degree of being able to be regarded as being substantially zero, and the thoron's progeny nuclides will not decay down to a degree at which measurement accuracy of the thoron's progeny nuclides becomes worse.

Next, the analysis center 120 calculates the radon amount and thoron amount at the measurement-specimen sampling points-in-time (i.e., getting back to the past, so to speak) at the worksite 110 (this process corresponds to a step S04 in FIG. 2).

Moreover, the analysis center 120 reports the analysis result of the radon amount and thoron amount to the client via a network 2 (this process corresponds to a step S05 in FIG. 2).

Furthermore, in order to perform the environmental-radioactivity measurement service-operation like this, the service contractor which contracts the environmental-radioactivity measurement service-operation rents out the following appliances to the clients, as are illustrated in FIG. 3: A manual 5A, a collector 6, a radiation measurement instrument (which, hereinafter, will be referred to as simply "measurement instrument") 7, a measurement base 8, and a RFID (Radio Frequency Identification)-tag-reader/writer-equipped mobile terminal (which, hereinafter, will be referred to as "mobile terminal") 9.

The measurement instrument 7 deployed at each of the worksites 110 corresponds to a first measurement instrument which will be disclosed in the appended claims.

In the environmental-radioactivity measurement service-operation, even if the progeny nuclides of radon and thoron have decayed, the accurate analysis of the radon amounts and thoron amounts in the environmental airs can be made by the gross measurement (first gross measurement) at the worksites 110 of the clients, and the swift sending of the measurement specimens to the analysis center 120. The environmental-radioactivity measurement service-operation like this can be implemented by the environmental-radioactivity measurement/management system, which will be described hereinafter.

<<Environmental-Radioactivity Measurement/Management System>>

As illustrated in FIG. 3, at each of the worksites 110 (denoted by 110A, 110B, 110C, and 110D in FIG. 3) of the measurement-specimen sampling, the following appliances are deployed at each terminal 1A connected to a server 3 of the analysis center 120 via the Internet 2, and configured with, e.g., a personal computer, the worksite-used manual 5A for describing the measurement-specimen sampling method and the first gross-measurement method at the worksites 110, the collector 6 for collecting aerosol, the measurement instrument 7, the measurement base 8, and the mobile terminal 9.

The terminal 1A is used for receiving, from the analysis center 120, the report of measurement result of the environmental radioactivity, or receiving, from the analysis center 120, a measurement-specimen sampling schedule guidance on the environmental-radioactivity measurement which accompanies the contract, or conversely, is used for notifying the analysis center 120 of communications items.

Also, a terminal 1B, which is configured with, e.g., a personal computer, is also deployed at a client request source 130 which has requested the analysis center 120 to perform the environmental-radioactivity measurement service-operation. The terminal 1B is also connected to the server 3 of the analysis center 120 via the network 2. The terminal 1B is used for receiving, from the analysis center 120, the report of measurement result of the environmental radioactivity, or receiving therefrom a bill for the environmental-radioactivity measurement service-operation.

When the client request source 130 possesses, e.g., a plurality of operation worksites or hot springs at locations away from the client request source 130, the terminal 1A and the terminal 1B are different from each other. In the case of the client request source 130 which possesses only one operation worksite or hot spring, the client request source 130 and the worksite 110 become one and the same place, and the terminal 1A and the terminal 1B are co-used in some cases.

The server 3, which is configured with, e.g., a personal computer, is deployed at the analysis center 120 which analyzes the sampled measurement specimens in a concentrated manner. The server 3 is connected to the terminals 1A and the terminal 1B via the network 2 of the Internet.

At the analysis center 120, in addition to the server 3, the following appliances are deployed: An analysis-center-used manual 5B for describing the second gross-measurement method at the analysis center 120 and the like, the measurement instrument 7, the measurement base 8, the mobile terminal 9, and a radiation measurement device 17 for making the accurate measurement on the measurement specimens. Here, the measurement instrument 7 deployed at the analysis center 120 corresponds to a second measurement instrument which will be disclosed in the appended claims.

The server 3 includes components such as a main unit 3a, a storage section (memory unit) 3b, a display section 3c configured with liquid-crystal display device or the like, an input section 3d configured with keyboard, mouse, or the like, and a printer 3e. The main unit 3a includes components such as a not-illustrated CPU, a not-illustrated bus connected to the CPU, a ROM, a RAM, and an I/O interface which are connected to the bus.

The server 3 is connected to a plurality of terminals 1A in a communications-capable manner via a LAN. The terminals 1A, whose illustrations are omitted, are deployed at respective departments within the analysis center 120 (such as measurement-specimen reception department, analysis in-charge department, and measurement-instrument calibration operation department, which will be described later).

Additionally, the radiation measurement device 17 is the publicly-known α-ray measurement device, which is capable of making the radioactive-nuclide analysis and radioactivity-intensity analysis, and is disclosed in JP-A-2003-50279 or the like. Accordingly, the detailed explanation thereof will be omitted here.

<<Measurement-Specimen Sampling and Gross Measurement at Worksites>>

Figure 4A:
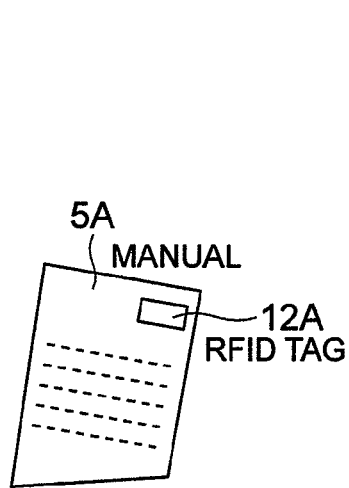
FIG. 4A to FIG. 4F are diagrams for explaining configurations of appliances or the like which are to be deployed at the worksites, where
Figure 4B:
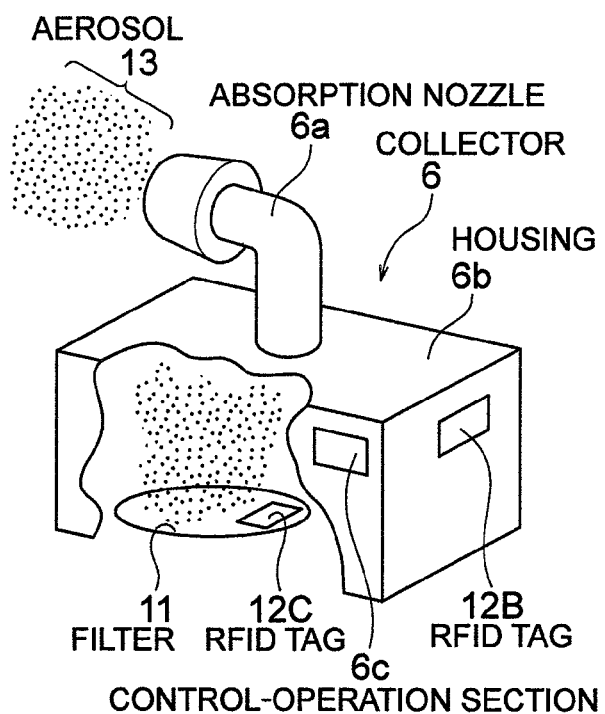
Figure 4C:
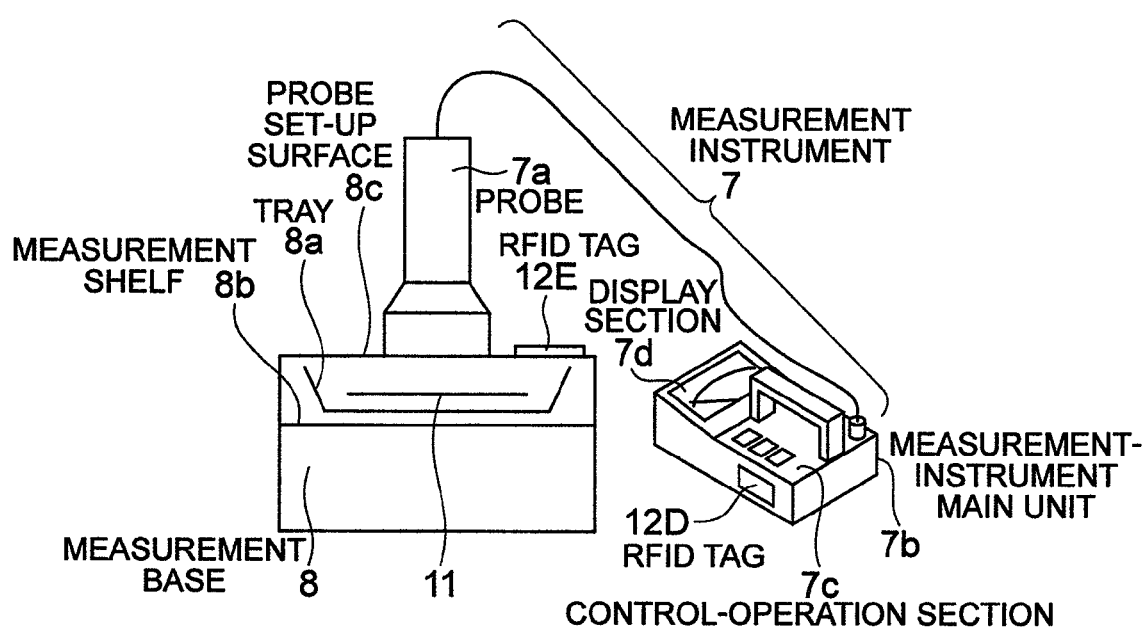
Figure 4D:
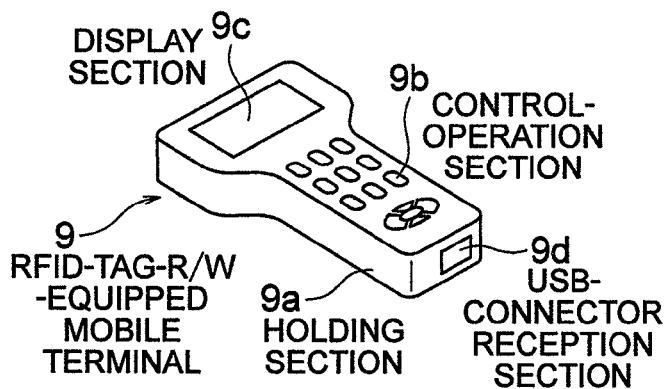
Figure 4E:
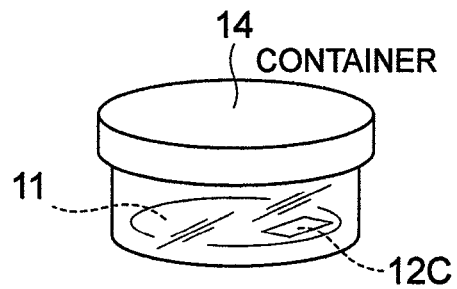
Figure 4F:
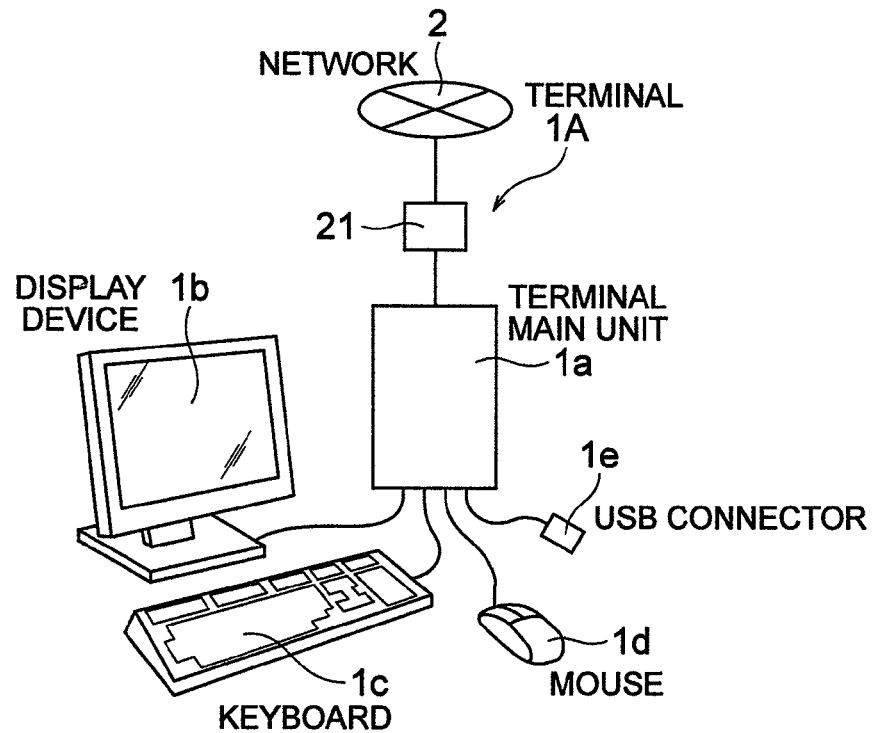
Figure 7:
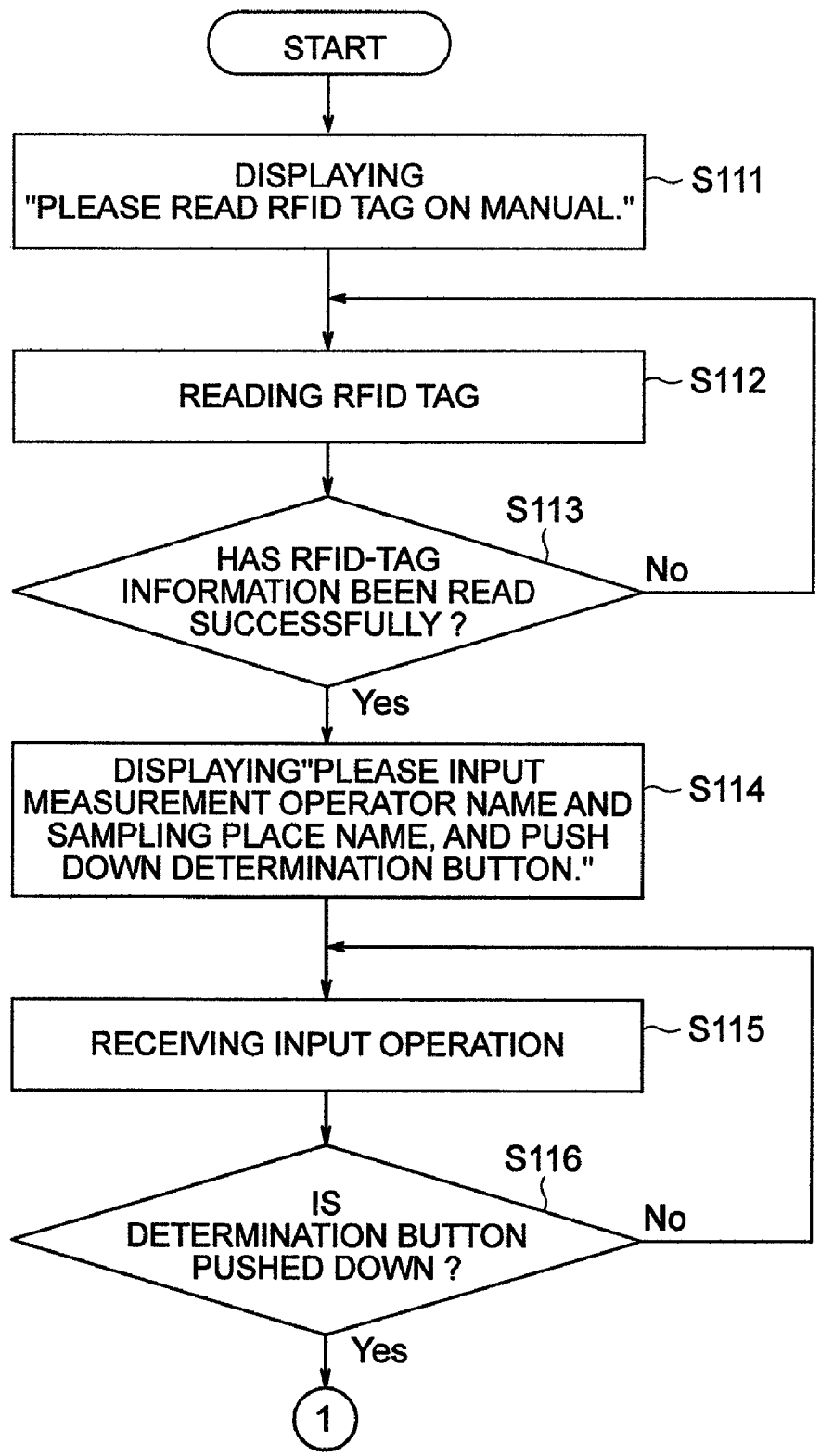
FIG. 7 is a flowchart for illustrating a flow of the control for assisting, with the mobile terminal, the operations of the sampling of the measurement specimen and the gross measurement on the measurement specimen at the worksite.
Figure 8:
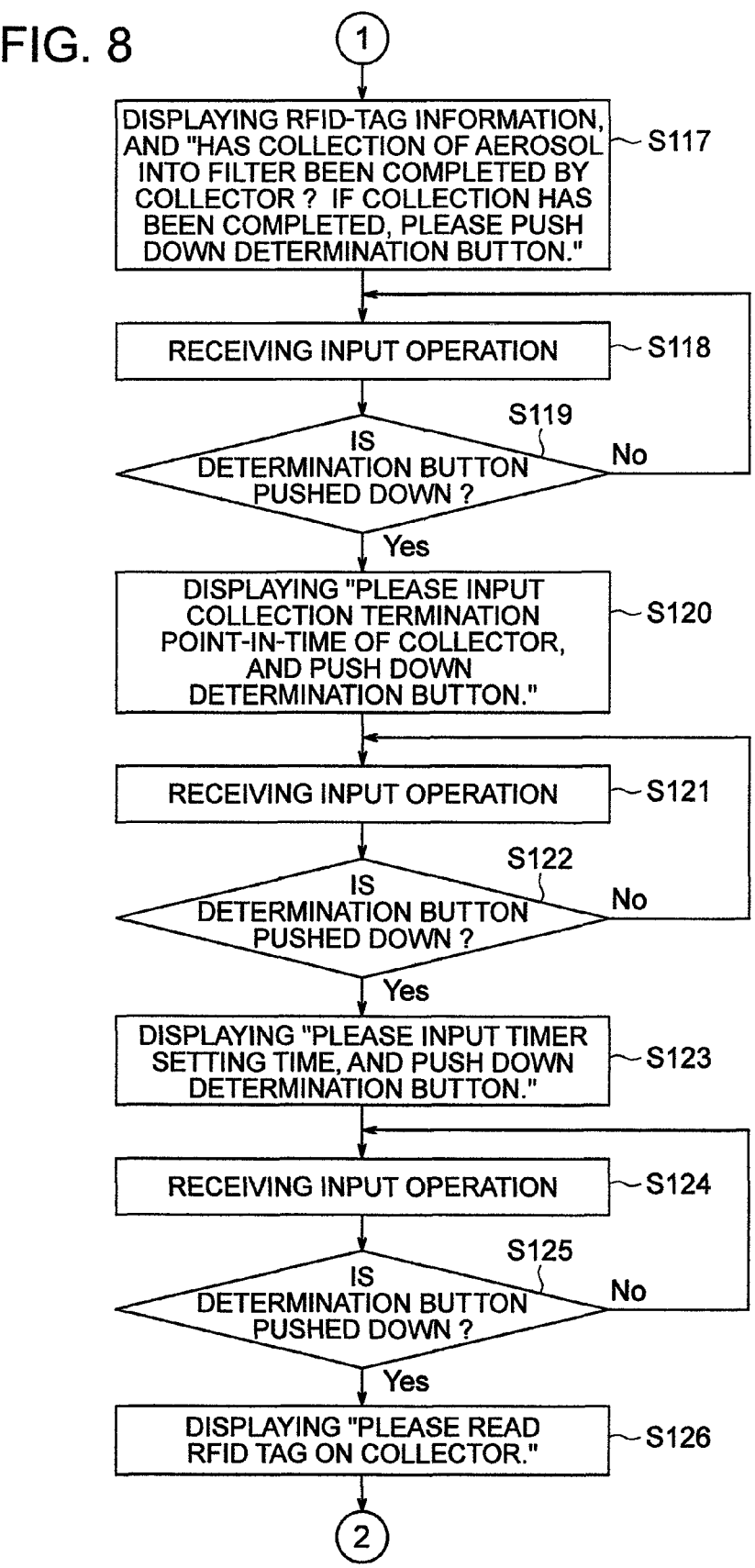
FIG. 8 is a flowchart for illustrating the flow of the control for assisting, with the mobile terminal, the operations of the sampling of the measurement specimen and the gross measurement on the measurement specimen at the worksite.
Figure 9:
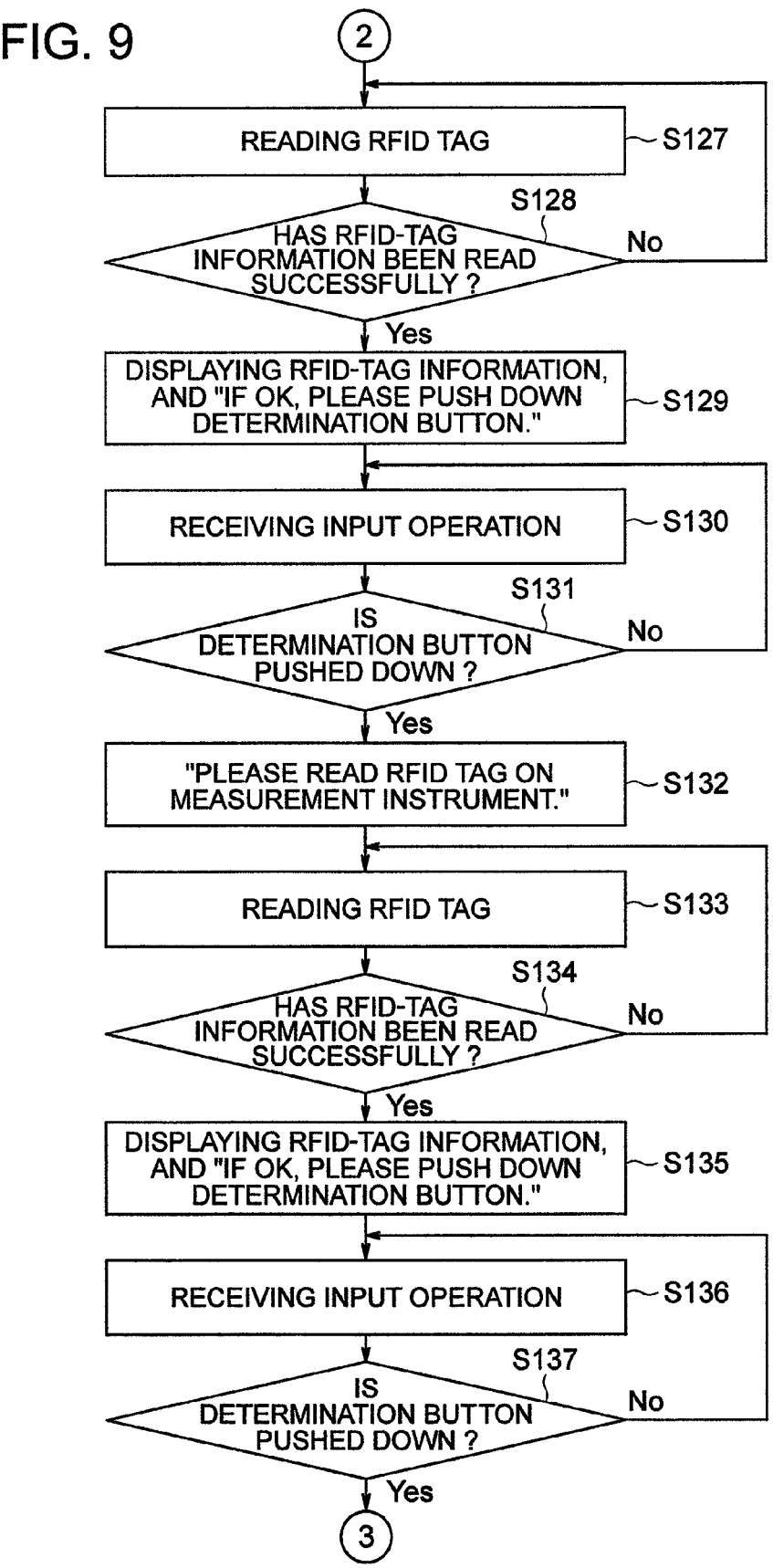
FIG. 9 is a flowchart for illustrating the flow of the control for assisting, with the mobile terminal, the operations of the sampling of the measurement specimen and the gross measurement on the measurement specimen at the worksite.
Figure 10:
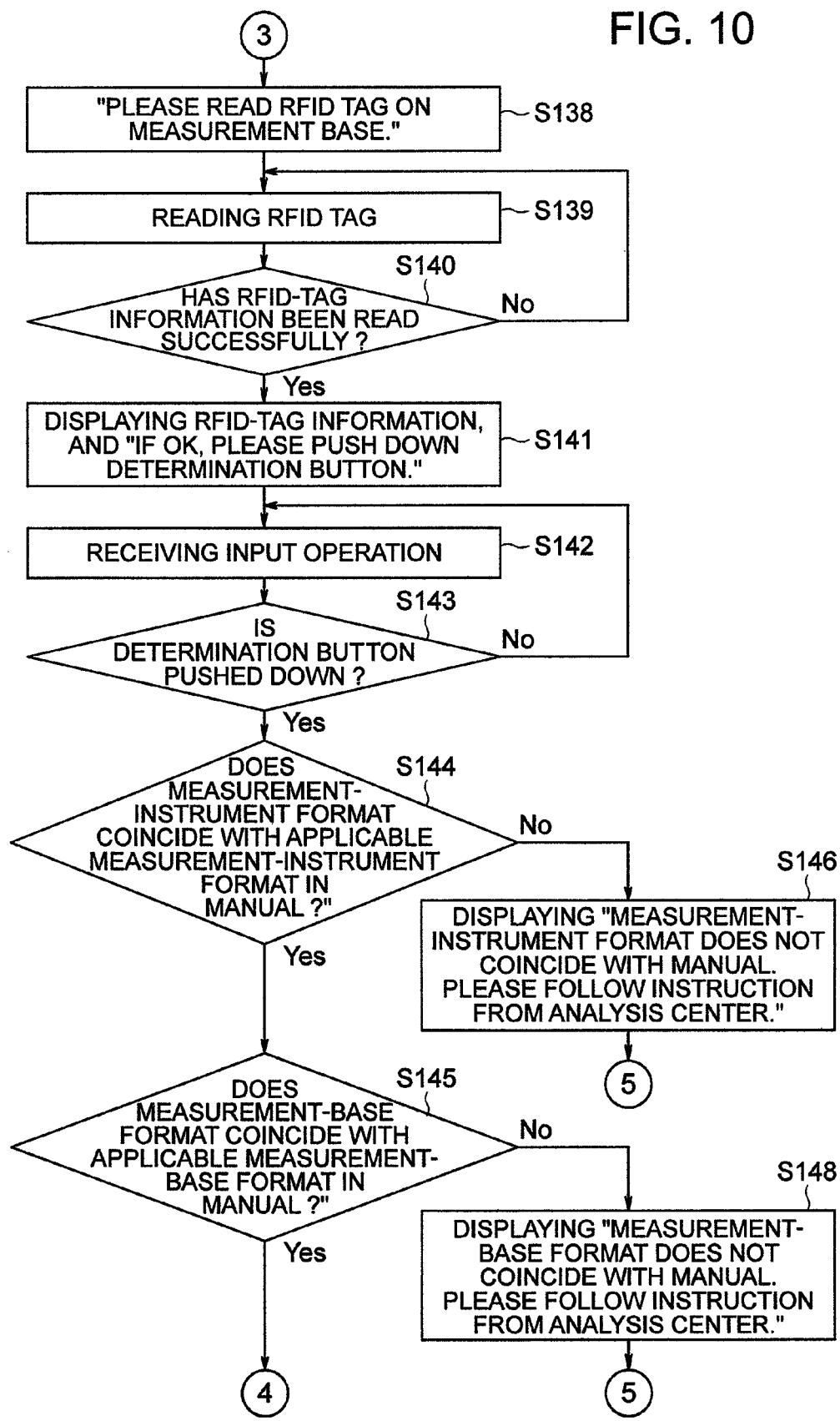
FIG. 10 is a flowchart for illustrating the flow of the control for assisting, with the mobile terminal, the operations of the sampling of the measurement specimen and the gross measurement on the measurement specimen at the worksite.
Figure 11:
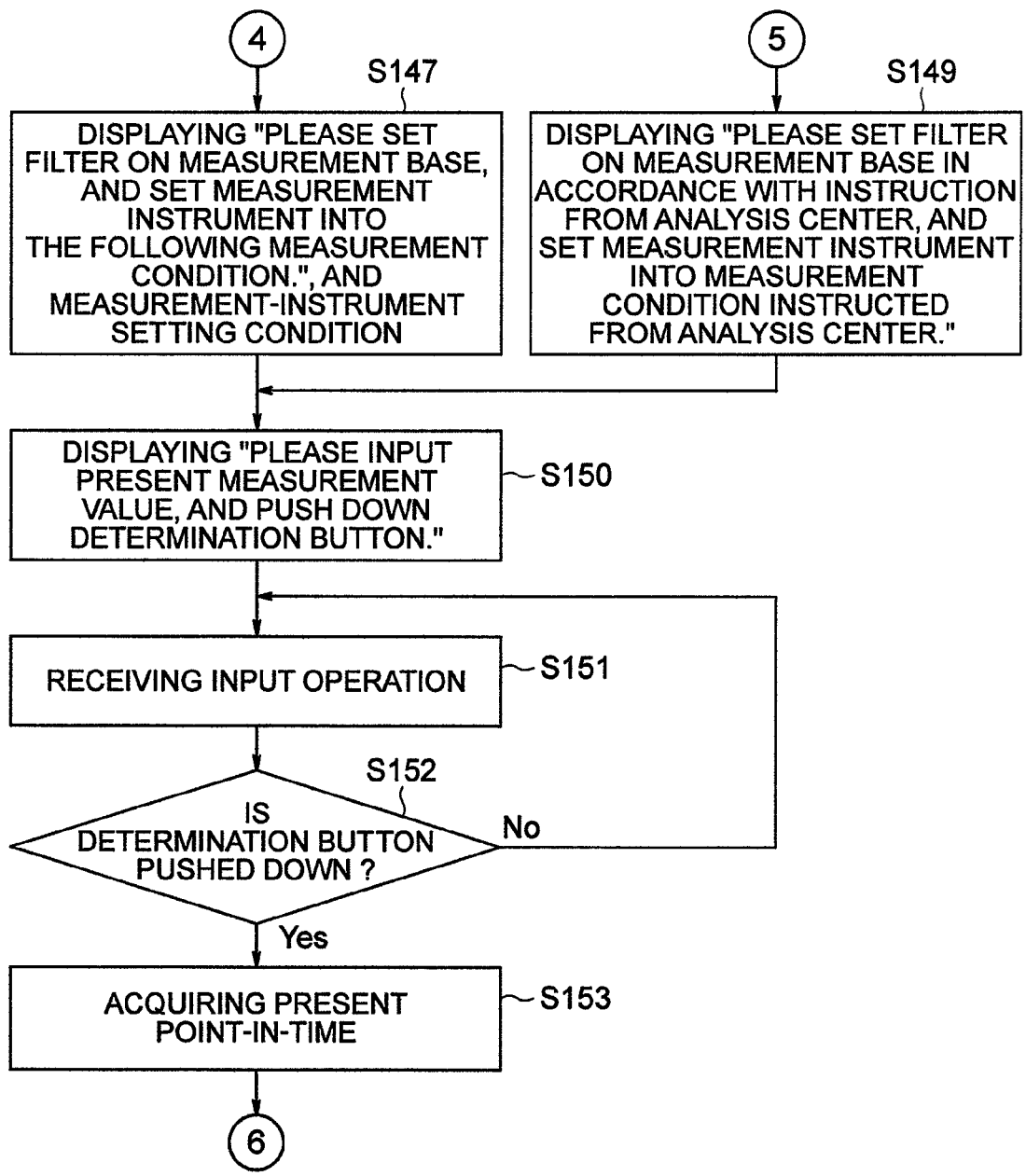
FIG. 11 is a flowchart for illustrating the flow of the control for assisting, with the mobile terminal, the operations of the sampling of the measurement specimen and the gross measurement on the measurement specimen at the worksite.

Next, referring to FIGS. 4A to 4F to FIG. 6, the explanation will be given below concerning appliances or the like which are to be deployed at the worksites 110. FIG. 4A to FIG. 4F are diagrams for explaining configurations of the appliances or the like which are to be deployed at the worksites, where FIG. 4A is a diagram for explaining the worksite-used manual, FIG. 4B is a configuration diagram of the collector, FIG. 4C is a diagram for explaining the appliance configuration in the case of making the gross measurement using the measurement instrument, FIG. 4D is an outer-appearance diagram of the RFID-tag-reader/writer-equipped mobile terminal, FIG. 4E is a diagram for explaining a state where the measurement specimens are contained in a container, and FIG. 4F is a configuration diagram of the terminal.

(Worksite-Used Manual)

FIG. 5A is a diagram for exemplifying contents of RFID-tag information on a RFID tag affixed on the worksite-used manual, and FIG. 5B is a diagram for exemplifying contents of RFID-tag information on a RFID tag affixed on the collector.

The worksite-used manual 5A describes therein the following information: Manual ID for identifying manual number or the like, measurement purpose, date of issue, revision number, applicable measurement-instrument format, i.e., format of the measurement instrument 7 applied, applicable measurement-base format, i.e., format of the measurement base 8 applied, measurement-instrument setting condition, sending date to client, client code, i.e., information for identifying client, contract-identifying service-contract ID 40c, which will be described later (refer to FIG. 15), method of setting up, on the measurement base 8, the filter 11 where aerosol 13 is collected by setting up the filter 11 on the collector 6, method of writing data by using the mobile terminal 9 into a RFID tag 12C affixed on the filter 11, sending method of sending the filter 11 to the analysis center 120, and the like.

Incidentally, the collector 6 is separately equipped with an illustration-omitted manual for explaining usage method of the collector 6.

As illustrated in FIG. 4A, a RFID tag 12A is affixed on the worksite-used manual 5A. The RFID tag 12A, and RFID tags 12B, 12C, 12D, and 12E, which will be described later, are all assumed to be the RAM-type RFID tags. Namely, although the RFID-tag identification number which was written into a RFID tag at the manufacturing stage for identifying the RFID tag is unchangeable, the other information is rewritable. As illustrated in FIG. 5A, in addition to the RFID-tag identification number written into the RFID tag 12A at the manufacturing stage for identifying the RFID tag 12A, manual information 50, such as the above-described manual ID, applicable measurement-instrument format, applicable measurement-base format, measurement-instrument setting condition, sending date to the client, client code, and service-contract ID, are recorded into the RFID tag 12A in advance before the manual 5A is delivered to the client.

(Collector)

Next, referring to FIG. 4B, the explanation will be given below regarding configuration of the collector 6 and the sampling method of sampling the measurement specimen. The aerosol 13 floating in the air is collected by an absorption nozzle 6a having an absorption inlet and the collector 6 of a housing structure whose hermetically-sealed structure is formable except a not-illustrated exhaustion outlet. First, a not-illustrated door is opened which is provided on the front-surface side of the housing 6b of the collector 6, then setting up the filter 11 for collecting the aerosol 13. The rear surface of the door is so configured as to be made hermetically-sealable in a manner of being in close contact with an aperture edge portion on the front-surface side of the housing 6b. The air taken in from the absorption nozzle 6a is guided onto the top-surface side of the filter 11, then being caused to pass from the top-surface side onto the bottom-surface side by rotating a not-illustrated absorption fan for a predetermined time. After that, the air is exhausted out from the not-illustrated exhaustion outlet. The air absorption amount per unit time is investigated beforehand as performance specification. Accordingly, it turns out that the air volume corresponding to the collected aerosol 13 is found out from the operation time (timer setting time), i.e., the collection time. Otherwise, the air absorption amount may be measured by setting up a flow-amount gauge on the exhaustion side.

A control-operation section 6c is provided on the front-surface side of the housing 6b. An operator of the client operates the control-operation section 6c, thereby setting a not-illustrated timer to rotate the absorption fan for the predetermined time.

Incidentally, the collector 6 includes a display screen formed of, e.g., liquid crystal at the control-operation section 6c. When the set timer setting time is terminated, the air amount per unit time, timer setting time, and collection termination point-in-time will be displayed each. Also, when the timer setting time is terminated, alarm sound will be rung.

The RFID tag 12B is affixed on the housing 6b of the collector 6 (refer to FIG. 4B). As illustrated in FIG. 5B, the RFID-tag identification number written into the RFID tag 12B at the manufacturing stage for identifying the RFID tag 12B, and collector information 51A, such as collector ID for identifying the collector 6, collector format, wind-sending capacity (represented by, e.g., litter/minute unit, and referred to as "collection capacity" also), i.e., the air absorption amount per unit time, manufacturing number, manufacturer, and owner, and check information 51B, such as the date at which the collector was set up at the worksite 110 of the client, the latest check date (set-up date/check date), and checker's name, are recorded into the RFID tag 12B in advance before the collector 6 is delivered to the client.

Incidentally, the RFID tag 12C is affixed on a portion which is not the collection portion at the circumferential portion of the filter 11. Information to be recorded into the RFID tag 12C will be described later in the explanation of FIG. 13.

(Measurement Instrument)

Next, referring to FIG. 4C and FIG. 6A, the explanation will be given below regarding the measurement instrument 7.

FIG. 6A is a diagram for exemplifying contents of RFID-tag information on a RFID tag affixed on the measurement instrument, and FIG. 6B is a diagram for exemplifying contents of RFID-tag information on a RFID tag affixed on the measurement base.

The measurement instrument 7 is, e.g., the gross α-ray measurement instrument for making the gross measurement on α-rays from detectors such as ZnS (Ag) scintillation detector and GM-tube detector. The measurement instrument 7 includes a probe 7a, and a measurement-instrument main unit 7b connected to the probe 7a via a cable. The measurement-instrument main unit 7b includes a control-operation section 7c having control-operation buttons, and a display section 7d for displaying the measurement value.

The control-operation section 7c includes the control-operation buttons, such as, e.g., ON/OFF button for switching power-supply of the measurement instrument 7 ON/OFF, unit change button for switching the unit of the measurement value, counting start/stop button for operating start/stop of the counting, ON/OFF button for switching ON/OFF not-illustrated speaker and illumination built in the measurement instrument 7, range switching button for switching the range, function switching button for switching the function, and, in the case of the measurement instrument 7 using the GM-tube detector type, button for switching the time constant or measurement time.

The display section 7d, which displays the measurement value, may be either an indicator which indicates the measurement result with calibrated scale and needle as is illustrated in FIG. 4C, or a LCD (Liquid Crystal Display) for implementing digital display of the measurement result.

The RFID tag 12D is affixed on the measurement instrument 7 (refer to FIG. 4C). As illustrated in FIG. 6A, the RFID-tag identification number written into the RFID tag 12D at the manufacturing stage for identifying the RFID tag 12D, and measurement-instrument information 52, such as measurement-instrument ID for identifying the measurement instrument 7, measurement-instrument format, manufacturing number, manufacturer, owner, calibration execution date, calibration expiration time-limit, calibration executer, measurement-base format to be applied (applicable measurement-base format), manual ID to be applied (applicable manual ID), and detection efficiency, are recorded into the RFID tag 12D in advance before the measurement instrument 7 is delivered to the client.

Here, the detection efficiency of the measurement instrument 7 deployed at the worksite 110 corresponds to a first detection efficiency which will be disclosed in the appended claims.

An incidence window of the probe 7a of this gross α-ray measurement instrument is about 0.8 to 1 mg/cm² thick. This value is equivalent to 4 μm when converted into the transmission thickness for aluminum. The incidence window is configured with aluminum mylar film or the like.

The energy of α-rays from α-ray emission nuclides falls in the range of a few MeV to 9 MeV. Also, the energy of α-rays from the α-ray emission nuclides existing in common environments (i.e., radon, thoron and their progeny nuclides) falls in the range of 4 MeV to 9 MeV. The aluminum transmission thicknesses of the 4-MeV α-rays and 5-MeV α-rays are equal to 16 μm and 21 μm, respectively. As long as the incidence window is about 0.8 to 1 mg/cm² thick, the α-rays in this energy range will pass through the incidence window almost entirely, although this transmission is accompanied by a slight amount of energy loss. Namely, in the gross measurement where no energy analysis is made, a single α-rays can be detected as being the single α-rays such that its incidence is not shielded by the incidence window.

Accordingly, the calibration of the detection efficiency in the gross α-ray measurement is usually performed using the standard-ray source which emits 5. 49-MeV α-rays of Am-241 (americium 241) whose radioactivity intensity has been already known.

(Measurement Base)

At the point-in-time when the timer setting time of the collector 6 is terminated, the operator of the client takes out the filter 11 out of the collector 6, and mounts the filter 11 on a tray 8a (refer to FIG. 4C), then setting up the tray 8a on a measurement shelf 8b of the measurement base 8. Moreover, the measurement instrument 7 is switched into the operation state, then being set up on a probe set-up surface 8c of the measurement base 8 with the incidence window of the probe 7a directed below. An aperture portion corresponding to the incidence window of the probe 7a is provided on the probe set-up surface 8c. This measurement base 8 is designed in order to specify and maintain the difference between the filter 11 and incidence window of the probe 7a at a predetermined constant value. A not-illustrated probe-fixing arm is provided, and the probe 7a is fixed onto the probe-fixing arm, thereby specifying and maintaining the difference between the filter 11 and incidence window of the probe 7a at the constant value. In the state where the probe 7a is fixed onto the probe-fixing arm, and when the measurement instrument 7 is set at a predetermined sensitivity, the measurement instrument 7 is designed to exhibit the above-described calibrated detection efficiency including geometrical efficiency.

The RFID tag 12E is affixed on the measurement base 8 (refer to FIG. 4C). As illustrated in FIG. 6B, the RFID-tag identification number written into the RFID tag 12E at the manufacturing stage for identifying the RFID tag 12E, and measurement-base information 53, such as measurement-base ID for identifying the measurement base 8, measurement-base format, measurement-instrument format to be applied (applicable measurement-instrument format), owner, and set-up date, are recorded into the RFID tag 12E in advance before the measurement base 8 is delivered to the client.

Next, the explanation will be given below regarding the mobile terminal 9. As illustrated in FIG. 4D, the mobile terminal 9 includes a holding section 9a held by hand, a control-operation section 9b having control-operation buttons such as ten-key, cursor-displacement button, and determination button, and a display section 9c. This mobile terminal 9 not only reads the information on the RFID tags or writes information into the RFID tags, but also has the function of the mobile terminal. Namely, the mobile terminal 9 is designed such that, in accordance with an application program downloaded onto the mobile terminal 9 in advance, the mobile terminal 9 instructs a processing step which ascertains an operation that the operator of the client writes the result of the gross measurement on the measurement specimen sampled at the worksite 110 into the RFID tag 12C affixed on the filter 11.

Additionally, as illustrated in FIG. 4F, the terminal 1A of client's self possession, e.g., a personal computer, is provided at the worksite 110 of the client. The terminal 1A includes components such as a terminal main unit 1a, a display device 1b connected to the terminal main unit 1a, a keyboard 1c, and a mouse 1d. The terminal main unit 1a includes components such as a not-illustrated CPU, bus, ROM, RAM, interface circuit, and storage device. The terminal main unit 1a is connected to the network 2 via, e.g., a terminal adapter (TA) 21.

Furthermore, the mobile terminal 9 includes, e.g., a USB-connector reception section 9d for downloading the above-described application program via the terminal 1A, thereby being made connectable to a USB connector 1e (refer to FIG. 4F) of the terminal 1A.

Hereinafter, referring to FIG. 7 to FIG. 13, the explanation will be given below concerning a flow of the operations of the sampling of the measurement specimen and the gross measurement on the measurement specimen at the worksite 110.

FIG. 7 to FIG. 12 illustrate a flowchart for illustrating the flow of the control for assisting, with the mobile terminal 9, the operations of the sampling of the measurement specimen and the gross measurement on the measurement specimen at the worksite 110. FIG. 13 is a diagram for exemplifying contents of RFID-tag information to be written into a RFID tag affixed on the measurement specimen.

It is assumed that the operator in charge of the environmental-radioactivity measurement at the worksite 110 of the client has read the manual 5A and the manual of the collector 6 beforehand, and is now thoroughly familiar with the flow of the operations. Moreover, the operator takes out the clean filter 11 out of a hermetical-package sack such as polyethylene sack, in which the filter 11 has been hermetically packaged. Next, the operator sets the filter 11 on the collector 6, then setting up the collector 6 at a place at which the measurement specimen is to be sampled. Furthermore, the operator sets the timer of the control-operation section 6c of the collector 6, then collecting the air for a predetermined time.

In addition, the operator switches the mobile terminal 9 ON around the timer-set collection termination point-in-time, thereby starting the above-described gross-measurement-operation-assisting application program downloaded thereon in advance. Then, taking advantage of the mobile terminal 9, the operator causes the operations to proceed in accordance with messages which are to be displayed on the display section 9$c$ as follows:

When the mobile terminal 9 is started, the mobile terminal 9 displays "Please read RFID tag on manual." on the display section 9$c$ (step S111). In response thereto, the operator brings the antenna-section side (i.e., rear side of the display section 9$c$) of the RFID-tag R/W of the mobile terminal 9 closer to the RFID tag 12A. Then, the RFID-tag R/W communicates with the RFID tag 12A, thereby reading the RFID tag 12A (step S112). Next, at a step S113, the mobile terminal 9 checks whether or not the RFID-tag information on the RFID tag 12A (refer to the manual information 50 in FIG. 5A) has been read successfully. If the RFID-tag information has been read successfully (: Yes), the mobile terminal proceeds to a step S114. If not (: No), the mobile terminal returns to the step S112.

At the step S114, the mobile terminal 9 displays "Please input measurement operator name and sampling place name, and push down determination button.". Moreover, the mobile terminal 9 receives an input operation of the measurement operator name and sampling place name, which is to be performed by the operator using the control-operation section 9$b$ (step S115). Next, at a step S116, the mobile terminal 9 checks whether or not the determination button has been pushed down actually. If the determination button has been pushed down actually (: Yes), the mobile terminal proceeds to a step S117. If not (: No), the mobile terminal returns to the step S115, then continuing the reception of the input operation.

At the step S117, the mobile terminal 9 displays, on the display section 9$c$, the RFID-tag information acquired at the step S112, as well as "Has collection of aerosol into filter been completed by collector? If collection has been completed, please push down determination button.". Moreover, the mobile terminal 9 receives the input operation (step S118). Next, at a step S119, the mobile terminal 9 checks whether or not the determination button has been pushed down actually. If the determination button has been pushed down actually (: Yes), the mobile terminal proceeds to a step S120. If not (: No), the mobile terminal returns to the step S118, then continuing the reception of the input operation.

At the step S120, the mobile terminal 9 displays "Please input collection termination point-in-time of collector 6, and push down determination button.". Moreover, the mobile terminal 9 receives the input operation (step S121). Next, at a step S122, the mobile terminal 9 checks whether or not the determination button has been pushed down actually. If the determination button has been pushed down actually (: Yes), the mobile terminal proceeds to a step S123. If not (: No), the mobile terminal returns to the step S121, then continuing the reception of the input operation.

Incidentally, the collection termination point-in-time is point-in-time information including the date.

At the step S123, the mobile terminal 9 displays "Please input timer setting time, and push down determination button.". Moreover, the mobile terminal 9 receives the input operation (step S124). Next, at a step S125, the mobile terminal 9 checks whether or not the determination button has been pushed down actually. If the determination button has been pushed down actually (: Yes), the mobile terminal proceeds to a step S126. If not (: No), the mobile terminal returns to the step S124, then continuing the reception of the input operation.

At the step S126, the mobile terminal 9 displays "Please read RFID tag on collector.". In response thereto, the operator brings the antenna-section side of the RFID-tag R/W of the mobile terminal 9 closer to the RFID tag 12B. Then, the RFID-tag R/W communicates with the RFID tag 12B, thereby reading the RFID tag 12B (step S127). Next, at a step S128, the mobile terminal 9 checks whether or not the RFID-tag information on the RFID tag 12B (refer to the collector information 51A and the check information 51B in FIG. 5B) has been read successfully. If the RFID-tag information has been read successfully (: Yes), the mobile terminal proceeds to a step S129. If not (: No), the mobile terminal returns to the step S127.

At the step S129, the mobile terminal 9 displays, on the display section 9$c$, the RFID-tag information acquired at the step S127, as well as "If OK, please push down determination button.". Moreover, the mobile terminal 9 receives the input operation (step S130). Next, at a step S131, the mobile terminal 9 checks whether or not the determination button has been pushed down actually. If the determination button has been pushed down actually (: Yes), the mobile terminal proceeds to a step S132. If not (: No), the mobile terminal returns to the step S130, then continuing the reception of the input operation.

At the step S132, the mobile terminal 9 displays "Please read RFID tag on measurement instrument.". In response thereto, the operator brings the antenna-section side of the RFID-tag R/W of the mobile terminal 9 closer to the RFID tag 12D. Then, the RFID-tag R/W communicates with the RFID tag 12D, thereby reading the RFID tag 12D (step S133). Next, at a step S134, the mobile terminal 9 checks whether or not the RFID-tag information on the RFID tag 12D (refer to the measurement-instrument information 52 in FIG. 6A) has been read successfully. If the RFID-tag information has been read successfully (: Yes), the mobile terminal proceeds to a step S135. If not (: No), the mobile terminal returns to the step S133.

At the step S135, the mobile terminal 9 displays, on the display section 9$c$, the RFID-tag information acquired at the step S133 (refer to the measurement-instrument information 52 in FIG. 6A), as well as "If OK, please push down determination button.". Moreover, the mobile terminal 9 receives the input operation (step S136). Next, at a step S137, the mobile terminal 9 checks whether or not the determination button has been pushed down actually. If the determination button has been pushed down actually (: Yes), the mobile terminal proceeds to a step S138. If not (: No), the mobile terminal returns to the step S136, then continuing the reception of the input operation.

At the step S138, the mobile terminal 9 displays "Please read RFID tag on measurement base.". In response thereto, the operator brings the antenna-section side of the RFID-tag R/W of the mobile terminal 9 closer to the RFID tag 12E. Then, the RFID-tag R/W communicates with the RFID tag 12E, thereby reading the RFID tag 12E (step S139). Next, at a step S140, the mobile terminal 9 checks whether or not the RFID-tag information on the RFID tag 12E (refer to the measurement-base information 53 in FIG. 6B) has been read successfully. If the RFID-tag information has been read successfully (: Yes), the mobile terminal proceeds to a step S141. If not (: No), the mobile terminal returns to the step S139.

At the step S141, the mobile terminal 9 displays, on the display section 9$c$, the RFID-tag information acquired at the step S139 (refer to the measurement-base information 53 in FIG. 6B), as well as "If OK, please push down determination button.". Moreover, the mobile terminal 9 receives the input operation (step S142). Next, at a step S143, the mobile terminal 9 checks whether or not the determination button has been pushed down actually. If the determination button has been pushed down actually (: Yes), the mobile terminal proceeds to a step S144. If not (: No), the mobile terminal returns to the step S142, then continuing the reception of the input operation.

At the step S144, the mobile terminal 9 checks whether or not the applicable measurement-instrument format included in the manual information 50 acquired at the step S112 and the measurement-instrument format included in the measurement-instrument information 52 acquired at the step S113 coincide with each other ("Does measurement-instrument format coincide with applicable measurement-instrument format in manual?"). If the coincidence therebetween holds (: Yes), the mobile terminal proceeds to a step S145. If not (: No), the mobile terminal proceeds to a step S146.

At the step S145, the mobile terminal 9 checks whether or not the applicable measurement-base format included in the manual information 50 acquired at the step S112 and the measurement-base format included in the measurement-base information 53 acquired at the step S139 coincide with each other ("Does measurement-base format coincide with applicable measurement-base format in manual?"). If the coincidence therebetween holds (: Yes), the mobile terminal proceeds to a step S147. If not (: No), the mobile terminal proceeds to a step S148.

At the step S147, the mobile terminal 9 displays "Please set filter on measurement base, and set measurement instrument into the following measurement condition." Furthermore, the mobile terminal 9 displays the measurement-instrument setting condition included in the manual information 50 acquired at the step S112. After that, in accordance with the instruction displayed on the display section 9c, the operator sets the filter 11 on the measurement base 8 while confirming the manual 5A. Then, the operator pushes down the control-operation buttons of the control-operation section 7c of the measurement instrument 7, thereby setting the measurement instrument 7 into the predetermined measurement condition instructed, and making the first gross measurement on the radiation.

Meanwhile, if the mobile terminal has proceeded from the step S144 to the step S146, the mobile terminal 9 displays "Measurement-instrument format does not coincide with manual. Please follow instruction from analysis center.", then proceeding to a step S149.

Meanwhile, if the mobile terminal has proceeded from the step S145 to the step S148, the mobile terminal 9 displays "Measurement-base format does not coincide with manual. Please follow instruction from analysis center.", then proceeding to the step S149.

Namely, the mobile terminal 9 proceeds to the step S149 after the step S146 or the step S148. At the step S149, the mobile terminal 9 displays "Please set filter on measurement base in accordance with instruction from analysis center, and set measurement instrument into measurement condition instructed from analysis center." The operator makes contact with the analysis center 120 by telephone, thereby informing its consultation section about the present situation. Then, the operator receives the instruction from a technical-support engineer at the consultation section, then setting the filter 11 on the measurement base 8, and setting the measurement instrument 7 into the instructed measurement condition.

The step S146, step S148, and step S149 are the flows for addressing the case in a first-aid manner where there is a contradiction between the applicable measurement-instrument format described in the manual 5A and the format of the measurement instrument 7, or where there is a contradiction between the applicable measurement-base format described in the manual 5A and the format of the measurement base 8.

The mobile terminal 9 proceeds to a step S150 after the step S147 and the step S149.

At the step S150, the mobile terminal 9 displays "Please input present measurement value, and push down determination button.". Moreover, the mobile terminal 9 receives an input operation of the first gross-measurement value by the operator (step S151). Next, at a step S152, the mobile terminal 9 checks whether or not the determination button has been pushed down actually. If the determination button has been pushed down actually (: Yes), the mobile terminal proceeds to a step S153. If not (: No), the mobile terminal returns to the step S151, then continuing the reception of the input operation.

At the step S153, the mobile terminal 9 acquires the present point-in-time based on a built-in calendar/clock function.

At a step S154, the mobile terminal 9 displays "Please contain filter into container, and write information into RFID tag.". In response thereto, the operator contains the filter 11 into the container 14 (refer to FIG. 4E), then strongly fastening its lid to seal the container 14 hermetically. Furthermore, the operator brings the antenna-section side of the RFID-tag R/W of the mobile terminal 9 closer to the RFID tag 12C through the lid of the container 14. Then, the RFID-tag R/W communicates with the RFID tag 12C, thereby writing, into the RFID tag 12C, each type of information exemplified in FIG. 13 and following worksite-measurement operator name (step S155, "writing RFID-tag information").

FIG. 13 illustrates examples of RFID-tag information to be written into the RFID tag 12C at the step S155. The RFID-tag identification number, which is co-used for identifying the filter 11 as well, is the one written into the RFID tag 12C at the manufacturing stage for identifying the RFID tag 12C. The worksite-measurement operator name 54a and sampling place name 54b are the ones resulting from receiving the input operation by the operator at the step S115. The collection termination point-in-time 55a is the one resulting from receiving the input operation by the operator at the step S121. The timer setting time 55b is the one resulting from receiving the input operation by the operator at the step S124. The collector information 51A, such as the collector ID, collector format, and wind-sending capacity, is the one acquired from the RFID tag 12B at the step S127.

The gross-measurement information 56 including the gross-measurement value and the measurement point-in-time are the present measurement value resulting from receiving the input operation by the operator at the step S151 and the present point-in-time acquired at the step S153.

Additionally, the measurement point-in-time includes information on the date as well.

The present measurement value resulting from receiving the input operation by the operator at the step S151 corresponds to a first gross-measurement value which will be disclosed in the appended claims. The present point-in-time acquired at the step S153 is measurement point-in-time information corresponding to the first gross-measurement value which will be disclosed in the appended claims.

The measurement-instrument information 52, such as the measurement-instrument ID, measurement-instrument format, calibration expiration time-limit, and detection efficiency, is the one acquired from the RFID tag 12D at the step S133. The measurement-base information 53, such as the measurement-base ID and measurement-base format, is the one acquired from the RFID tag 12E at the step S139. The manual information 50, such as the manual ID, client code, and service-contract ID, is the one acquired from the RFID tag 12A at the step S112.

Here, the collection termination point-in-time 55a and timer setting time 55b, and the collector information 51A, such as the collector ID, collector format, and wind-sending capacity, correspond to "collection-condition information" at the step S02 described earlier. The gross-measurement information 56 including the gross-measurement value and the measurement point-in-time correspond to "gross-measurement information" at the step S02. The worksite-measurement operator name 54a and sampling place name 54b, and the manual information 50, such as the manual ID, client code, and service-contract ID, correspond to "sampling-worksite information" at the step S02.

Incidentally, a filter ID for identifying the filter may also be recorded into the RFID tag 12C independently of the RFID-tag identification number.

At a step S156, the mobile terminal 9 displays the contents written into the RFID tag 12C at the step S155, thereby prompting the operator to confirm the contents (displaying RFID-tag information confirmation). Simultaneously, the mobile terminal 9 displays "If writing of RFID-tag information into RFID tag on filter has been completed, please merely push down determination button; if not, please align cursor at "return" button on display, and push down determination button.".

Moreover, the mobile terminal 9 receives the input operation by the operator (step S157). Next, at a step S158, the mobile terminal 9 checks whether this input is "determination" or "return". In the case of "determination", the mobile terminal 9 displays "Measurement on measurement specimen has been completed. Please send measurement specimen to analysis center immediately. Also, please transmit this contents to analysis center." (step S159). This step terminates the operation of the series of conversation processings using the mobile terminal 9. Meanwhile, in the case of "return", the mobile terminal 9 returns to the step S155, then redoing the writing of the RFID-tag information.

After the writing of the RFID-tag information into the RFID tag 12C has been completed, the operator contains the measurement specimen (i.e., the filter 11) into the container 14. Next, the operator describes the information, such as the service-contract ID, collection termination point-in-time, and sampling place name, onto a not-illustrated label affixed on the container 14. Moreover, the operator specifies, as a delivery time, the time and date within, e.g., twenty-four hours from the collection termination point-in-time, then sending the container 14 to the analysis center 120 using door-to-door delivery service. Also, the operator is allowed to connect the mobile terminal 9 to the USB connector 1e of the terminal 1A, and to transmit the contents written into the RFID tag 12C to the server 3 at the analysis center 120 via the terminal 1A.

<<Detailed Explanation of Analysis Center>>

Next, referring to FIG. 14 to FIG. 34, the explanation will be given below concerning the environmental-radioactivity measurement service-operation and detailed function configuration of the server 3 deployed at the analysis center 120.

(Server)

First, referring to FIG. 14, the explanation will be given below regarding the function configuration of the server 3.

Figure 14:
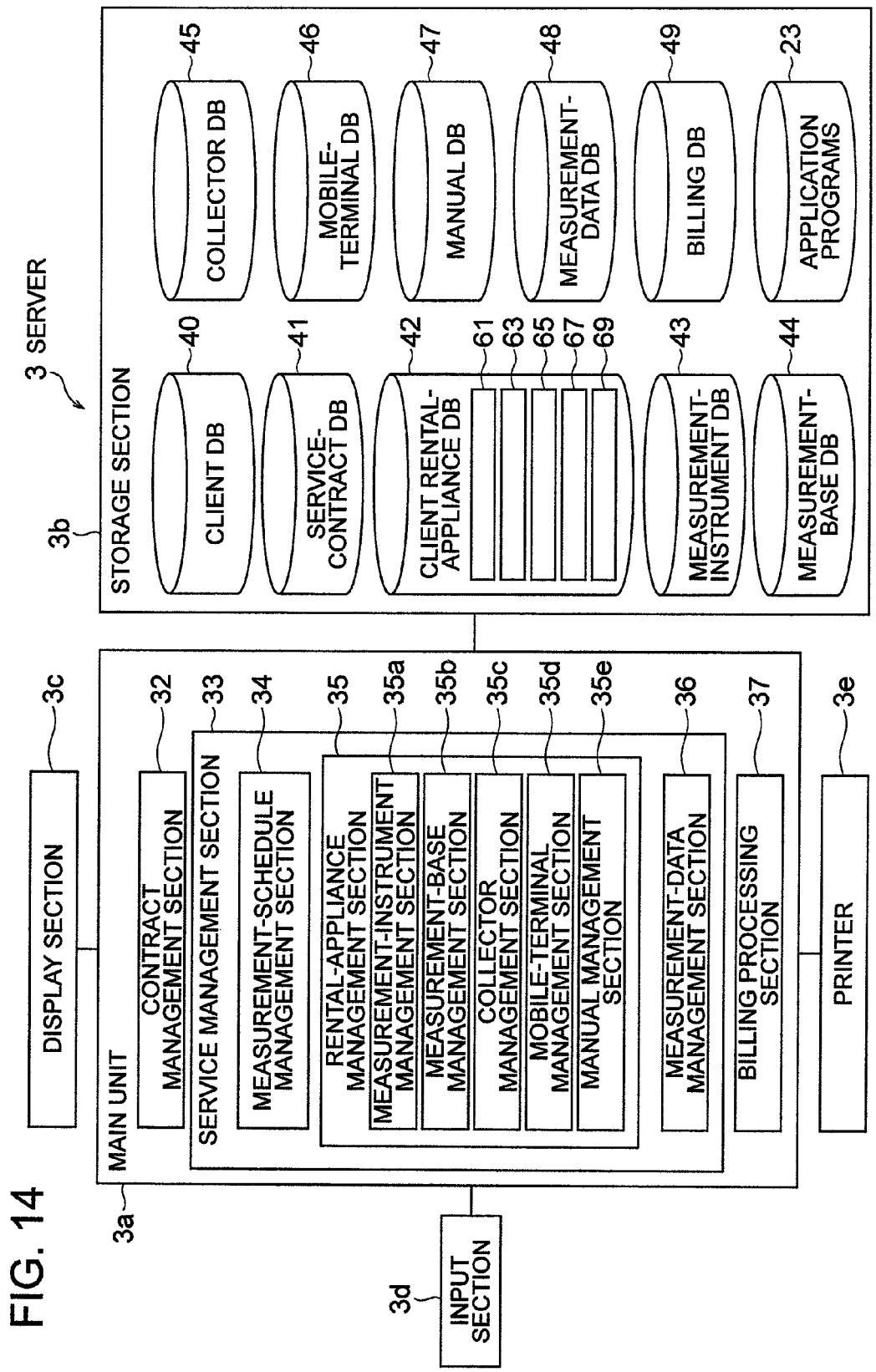
FIG. 14 is a function-configuration block diagram of the server deployed at the analysis center.

FIG. 14 is a function-configuration block diagram of the server 3 deployed at the analysis center 120. The function of the server 3 is implemented by executing application programs 23 stored into the storage section 3b at the CPU included in the main unit 3a of the server 3.

The main unit 3a includes a contract management section (contract management unit) 32, a service management section 33, and a billing processing section (billing processing unit) 37. Furthermore, the service management section 33 includes a measurement-schedule management section 34, a rental-appliance management section (rental-appliance management unit) 35, a measurement-data management section 36, and the billing processing section 37.

The storage section 3b includes the application programs 23, a client database (which, hereinafter, will be referred to as "client DB") 40, a service-contract database (hereinafter, referred to as "service-contract DB") 41, a client rental-appliance database (hereinafter, referred to as "client rental-appliance DB") 42, a measurement-instrument database (hereinafter, referred to as "measurement-instrument DB") 43, a measurement-base database (hereinafter, referred to as "measurement-base DB") 44, a collector database (hereinafter, referred to as "collector DB") 45, a RFID-tag-R/W-equipped mobile-terminal database (hereinafter, referred to as "mobile-terminal DB") 46, a manual database (hereinafter, referred to as "manual DB") 47, a measurement-data database (hereinafter, referred to as "measurement-data DB") 48, and a billing database (hereinafter, referred to as "billing DB") 49.

The client rental-appliance DB 42 includes measurement-instrument rental data 61, measurement-base rental data 63, collector rental data 65, mobile-terminal rental data 67, and manual rental data 69.

Hereinafter, referring to the drawings, the explanation will be given below concerning each database in such a manner that each database is caused to correspond to the function of reach management section.

(Contract Management Section)

Figure 15:
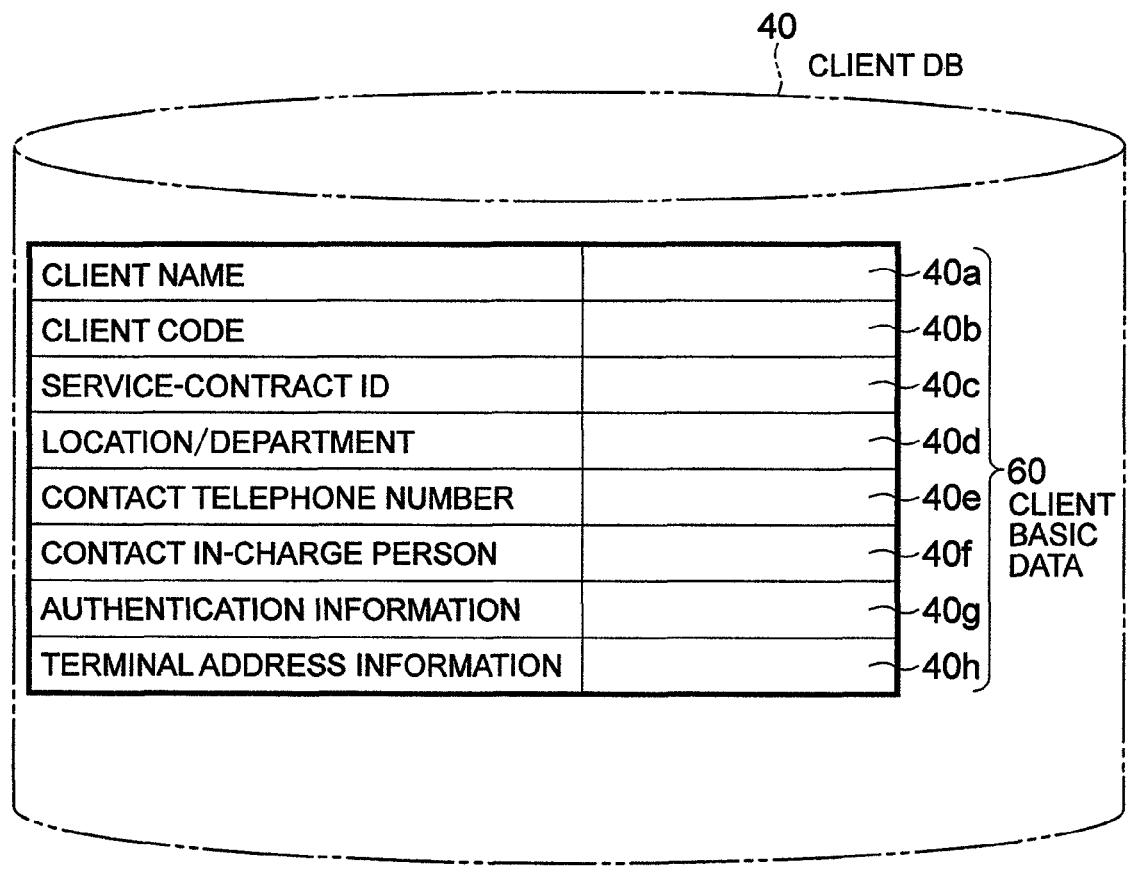
FIG. 15 is a diagram for exemplifying data contents of a client DB (database)
Figure 16:
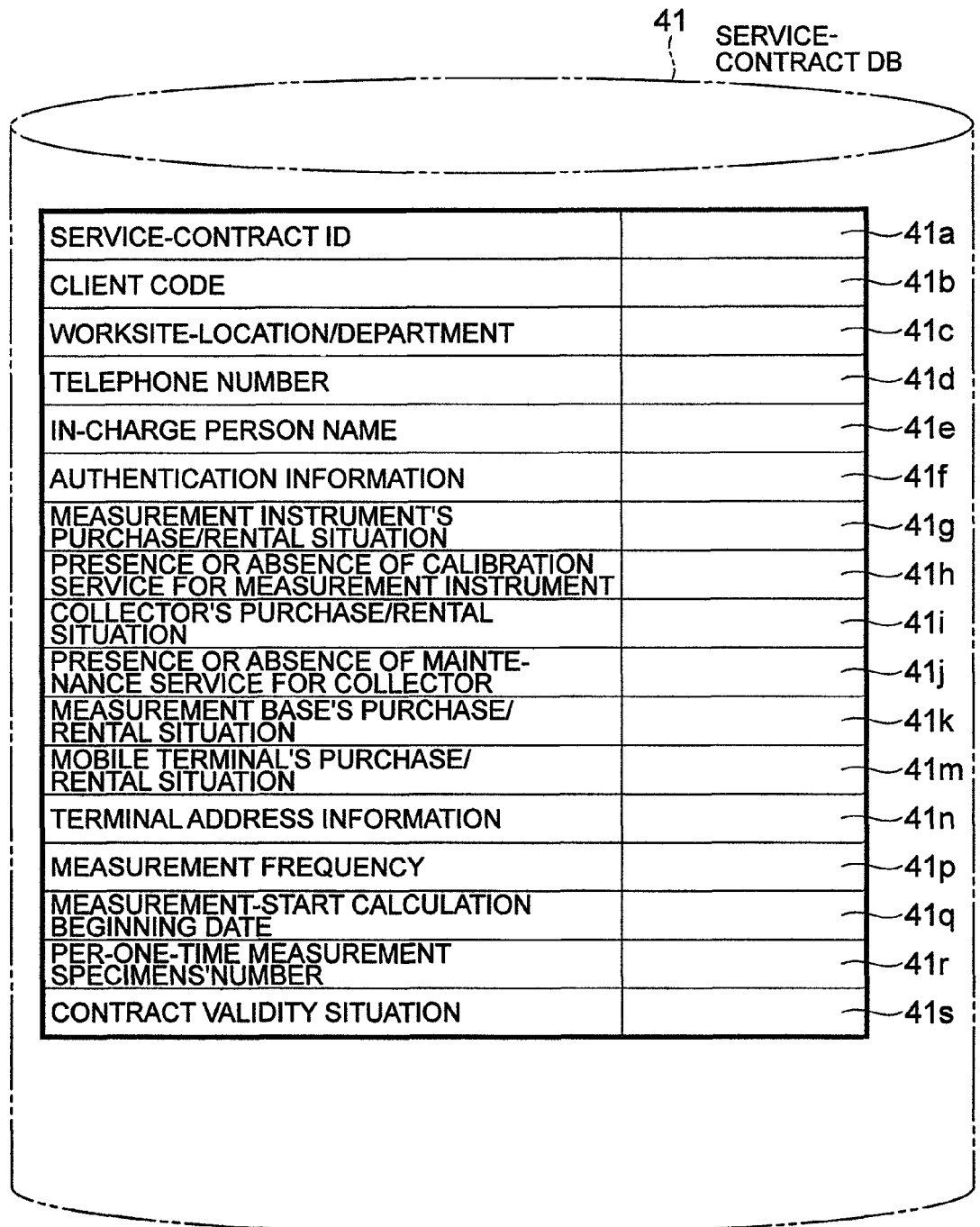
FIG. 16 is a diagram for exemplifying data contents of a service-contract DB.

FIG. 15 is a diagram for exemplifying data contents of the client DB. FIG. 16 is a diagram for exemplifying data contents of the service-contract DB.

The contract management section 32 has a function of registering or updating contracted contents of the environmental-radioactivity measurement service-operation with the clients, and manages the client DB 40 and the service-contract DB 41.

As illustrated in FIG. 15, the client DB 40 includes client basic data 60 such as client name 40a for each client, client code 40b, i.e., identification number for identifying each client, service-contract ID 40c, i.e., identification ID for the service contract in which contract contents of contracted service operation is registered for each worksite 110 at which the environmental-radioactivity measurement is requested by each client, location/department 40d, i.e., information on location and department name of contract in-charge department of each client, contact telephone number 40e (which is allowed to include information on mail address as well), name of contact in-charge person of the contract in-charge department (contact in-charge person) 40f, authentication information 40g, i.e., password registered by each client at the time of the contract with the service contractor, and terminal address information 40h on the terminal 1B (refer to FIG. 3).

For example, if a client is a company which owns a plurality of hot-spring hotels or hot-spring inns under its umbrella, the service-contract ID 40c exists for each worksite 110 of each hot-spring hotel or hot-spring inn. Then, contents of the service contract illustrated in FIG. 16 will be registered each.

The service-contract DB 41 registers therein information such as service-contract ID 41a, client code 41b, worksite-location/department 41c, i.e., information on location of each worksite 110 and the department name in charge of the environmental-radioactivity measurement there, telephone number 41d, in-charge person name 41e, authentication information 41f, i.e., password determined for each worksite, measurement instrument 7's purchase/rental situation 41g, presence or absence 41h of calibration service for the measurement instrument 7, collector 6's purchase/rental situation 41*i*, presence or absence 41*j* of maintenance service for the collector 6, measurement base 8's purchase/rental situation 41*k*, mobile terminal 9's purchase/rental situation 41*m*, terminal 1A's address information 41*n*, measurement frequency 41*p*, i.e., frequency with which the environmental radioactivity is to be measured, e.g., one-time/month or one-time/six-months, measurement-start calculation beginning date 41*q*, per-one-time measurement specimens' number 41*r*, and contract validity situation 41*s*.

Incidentally, the measurement frequency 41*p* is determined based on a management reference value and the measurement result in the case where concentration management of radon and thoron is legislated. Accordingly, the measurement is actually made on trial at the contract stage, and then the measurement frequency is set under mutual consent between the client and the service contractor. Consequently, the measurement frequency is set at a relatively higher value as the concentrations of radon and thoron at the worksite 110 are higher.

Also, concerning the per-one-time measurement specimens' number 41*r*, if there exist a plurality of spaces at the worksite 110 where the concentration management of radon and thoron should be made, the measurement is actually made on trial at the contract stage in accordance with the management reference and depending on the requirement. Then, based on its result, the per-one-time measurement specimens' number is set under mutual consent between the client and the service contractor.

Additionally, here, it is assumed that the manual 5A, the collector 6, the measurement instrument 7, the measurement base 8, and the mobile terminal 9, each of which is one in number, are deployed with respect to the one worksite. The present embodiment, however, is not limited thereto.

Here, the information registered in the service-contract DB 41 corresponds to measurement contract information which will be disclosed in the appended claims.

In this way, the client basic data 60 and the information registered in the service-contract DB 41 are managed in the separated manner. This separated management makes it possible to flexibly address differences in the contract contents for each worksite 110, and changes in the contract contents for each worksite 110.

(Measurement-Schedule Management Section)

The measurement-schedule management section 34 retrieves the service-contract DB 41, thereby calculating a management-scheduled date based on the measurement frequency 41*p* and the measurement-start calculation beginning date 41*q*. Moreover, the section 34 extracts a corresponding service-contract ID 41*a* predetermined days before the calculated management-scheduled date, e.g., four days before the calculated management-scheduled date, then causing the printer 3*e* to output the service-contract ID 41*a*, client code 41*b*, worksite-location/department 41*c*, telephone number 41*d*, in-charge person name 41*e*, per-one-time measurement specimens' number 41*r*, terminal 1A's address information 41*n*, and the management-scheduled date.

Based on the above-described printed-out information, the in-charge person who is in charge of the measurement-schedule management at the analysis center 120 prepares a set of the necessary number of hermetically-packaged filters 11 on which the RFID tag 12C is affixed and the necessary number of containers 14. Then, the in-charge person makes an arrangement so that this set will be able to be delivered to the worksite 110 by the day before the management-scheduled date using door-to-door delivery service.

Incidentally, the in-charge person is allowed to make the arrangement with electronic notice using the LAN without printing out this arrangement.

(Rental-Appliance Management Section)

Next, referring to FIG. 14 and FIGS. 17A to 17B to FIG. 24, the detailed explanation will be given below regarding the rental-appliance management section 35. The rental-appliance management section 35 includes a measurement-instrument management section 35*a*, a measurement-base management section 35*b*, a collector management section 35*c*, a mobile-terminal management section 35*d*, and a manual management section 35*e*.

Hereinafter, it is assumed that, for simplifying the explanation, the collector 6, the measurement instrument 7, the measurement base 8, and the mobile terminal 9 are all rental appliances which are rented to a client by the service contractor which contracts the environmental-radioactivity measurement service-operation.

FIG. 17A is a diagram for exemplifying the measurement-instrument rental data 61 about the measurement instruments which are now rented, and which are recorded into the client rental-appliance DB 42 for each worksite of the clients. FIG. 17B is a diagram for exemplifying the measurement-base rental data 63 about the measurement bases which are now rented, and which are recorded into the client rental-appliance DB 42 for each worksite of the clients.

(Function Explanation of Measurement-Instrument Management Section)

The measurement-instrument management section 35*a* registers or updates the measurement-instrument rental data 61 recorded into the client rental-appliance DB 42 and information recorded into the measurement-instrument DB 43. Moreover, the measurement-instrument management section 35*a* has a function of instructing an arrangement of retrieving the measurement-instrument rental data 61 to extract a measurement instrument 7 which has already become closer to the calibration expiration time-limit, and sending a replacement-purpose measurement instrument 7 to the worksite 110 of the client. A flowchart of the control for making this replacement arrangement instruction will be described later.

As illustrated in FIG. 17A, the measurement-instrument rental data 61 includes client code 61*a*, service-contract ID 61*b*, and one-rental-duration-equivalent measurement-instrument rental data unit 62, which are stored into a single file on each service-contract-ID basis. The one-rental-duration-equivalent measurement-instrument rental data unit 62 includes information such as duration start date (sending date) 62*a*, i.e., first rental start date, or date on which a measurement instrument was sent for replacement since it had become closer to the calibration expiration time-limit, duration termination date (recall date) 62*b* on which the measurement instrument was recalled since it had become closer to the calibration expiration time-limit, measurement-instrument ID 62*c*, RFID-tag identification number 62*d* of the RFID tag 12D (refer to FIG. 4C) affixed on the measurement instrument 7, measurement-instrument format 62*e*, calibration expiration time-limit 62*f*, detection efficiency 62*g*, and manual ID 62*h* to be applied to the measurement instrument 7.

Although the duration start date 62*a* is recorded with respect to a measurement instrument 7 which is rented at present, the duration termination date 62*b* is blanked. In contrast thereto, with respect to a measurement instrument 7 which had been recalled already, both the duration start date 62*a* and the duration termination date 62*b* are recorded. This makes it possible to make a distinction between these measurement instruments 7.

Furthermore, history information as to which of the measurement instruments 7 have been rented at a single worksite 110 until now can be confirmed by seeing a plurality of rental-durations-equivalent measurement-instrument rental data units 62 included in the measurement-instrument rental data 61.

Also, the manual ID 62h to be applied to the measurement instrument 7 is included in the measurement-instrument rental data 61. Accordingly, if the format of the measurement instrument 7 differs from that of the measurement instruments 7 which have been rented until then, a judgment as to whether or not changing the manual 5A is necessary is made easily. Also, the format of the measurement base 8 to be applied in coincidence with the measurement instruments 7 is also described in the manual 5A. Consequently, if the format of the measurement instrument 7 differs from that of the measurement instruments 7 which have been rented until then, a judgment as to whether or not changing the measurement base 8 is necessary is made easily by identifying the manual ID 62h.

The measurement-instrument management section 35a manages the measurement-instrument DB 43, thereby recording the management history information about each of the measurement instruments 7 owned for rent by the service contractor which contracts the environmental-radioactivity measurement service-operation.

FIG. 20 is a diagram for exemplifying the management history information about a single measurement instrument 7 in the measurement-instrument DB. The management history information about the single measurement instrument 7 includes measurement-instrument ID 43a, RFID-tag identification number 43b of the RFID tag 12D (refer to FIG. 4C) affixed on the measurement instrument 7, measurement-instrument name 43c, measurement-instrument format 43d, applicable measurement-base format 43e, manufacturing number 43f, manufacturer 43g, usage-limit scheduled date 43h on which maintenance service by the manufacturer becomes unable to receive, disposal flag 43i for indicating that the usage is prohibited, owner 43j, location situation flag 43k, applicable manual ID 43m, and rental history information 43n which is recorded every time the measurement instrument 7 is rented.

Additionally, the location situation flag 43k is a flag for indicating situations such as "at rent at present", "on standby for rent", "in calibration operation", and "under repair".

The rental history information 43n includes information such as the service-contract ID for becoming capable of checking the rental destination, in-service duration (start, termination), i.e., date on which the measurement instrument had been sent for rent and date on which the measurement instrument was recalled, and further, calibration execution date, calibration expiration time-limit, calibration executer, and detection efficiency for becoming capable of maintaining quality guarantee for the gross-measurement accuracy.

(Function Explanation of Measurement-Base Management Section)

The measurement-base management section 35b registers or updates the measurement-base rental data 63 recorded into the client rental-appliance DB 42 and information recorded into the measurement-base DB 44.

As illustrated in FIG. 17B, the measurement-base rental data 63 includes client code 63a, service-contract ID 63b, and measurement-base rental data unit 64, which are stored into a single file on each service-contract-ID basis. The measurement-base rental data unit 64 includes information such as duration start date (sending date) 64a, i.e., first rental start date, or date on which the measurement base was sent for replacement in order to implement consistency with a replaced measurement base 7, duration termination date (recall date) 64b on which the measurement base was recalled for the replacement, measurement-base ID 64c, RFID-tag identification number 64d of the RFID tag 12E (refer to FIG. 4C) affixed on the measurement base 8, measurement-base format 64e, manual ID 64f to be applied to the measurement base 8 based on the measurement-instrument format of the measurement instrument 7, and the applicable measurement-instrument format 64g.

Although the duration start date 64a is recorded with respect to a measurement base 8 which is rented at present, the duration termination date 64b is blanked. In contrast thereto, with respect to a measurement base 8 which had been recalled already, both the duration start date 64a and the duration termination date 64b are recorded. This makes it possible to make a distinction between these measurement bases 8.

Furthermore, history information as to which of the measurement bases 8 have been rented at a single worksite 110 until now can be confirmed by seeing a plurality of measurement-base rental data units 64 included in the measurement-base rental data 63.

The measurement-base management section 35b manages the measurement-base DB 44, thereby recording the management history information about each of the measurement bases 8 owned for rent by the service contractor which contracts the environmental-radioactivity measurement service-operation.

Figure 21:
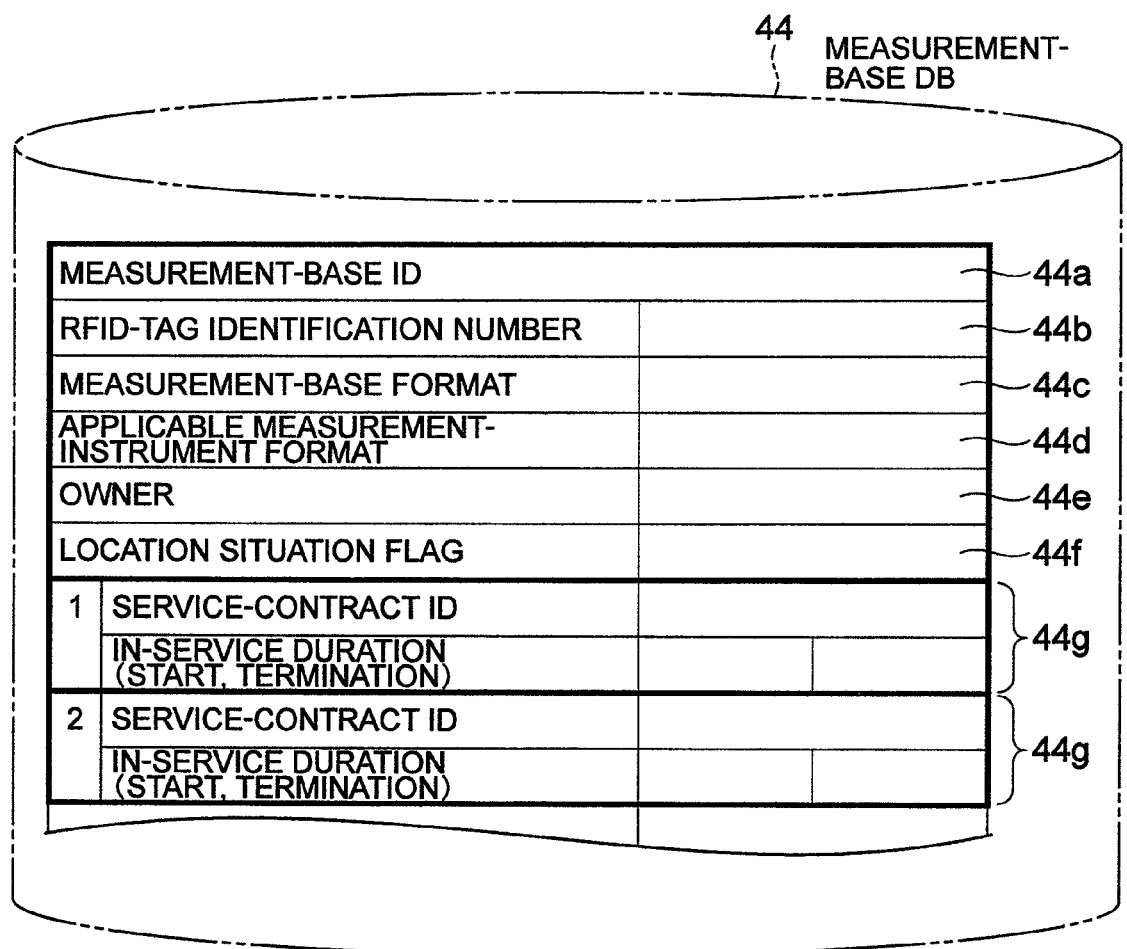
FIG. 21 is a diagram for exemplifying management history information about a single measurement base in the measurement-base DB.

FIG. 21 is a diagram for exemplifying the management history information about a single measurement base 8 in the measurement-base DB 44. The management history information about the single measurement base 8 includes measurement-base ID 44a, RFID-tag identification number 44b of the RFID tag 12E affixed on the measurement base 8, measurement-base format 44c, applicable measurement-instrument format 44d, owner 44e, location situation flag 44f, and rental history information 44g which is recorded every time the measurement base 8 is rented.

Additionally, the location situation flag 44f is a flag for indicating situations such as "at rent at present" and "on standby for rent".

The rental history information 44g includes the service-contract ID for becoming capable of checking the rental destination, and in-service duration (start, termination), i.e., date on which the measurement base had been sent for rent and date on which the measurement base was recalled.

(Function Explanation of Collector Management Section)

FIG. 18A is a diagram for exemplifying the collector rental data 65 about the collectors which are now rented, and which are recorded into the client rental-appliance DB 42 for each worksite of the clients. FIG. 18B is a diagram for exemplifying the mobile-terminal rental data 67 about the mobile terminals which are now rented, and which are recorded into the client rental-appliance DB 42 for each worksite of the clients.

The collector management section 35c registers or updates the collector rental data 65 recorded into the client rental-appliance DB 42 and information recorded into the collector DB 45. Moreover, the section 35c has a function of instructing an arrangement of retrieving the collector rental data 65 to extract a collector 6 in which predetermined days $N_A$ have elapsed since the previous check date of the collector 6, and causing a round checker to visit the worksite 110 of the client for checking the collector 6.

As illustrated in FIG. 18A, the collector rental data 65 includes client code 65a, service-contract ID 65b, and collector rental data unit 66, which are stored into a single file on each service-contract-ID basis. The collector rental data unit 66 includes information such as duration start date (sending date) 66a, i.e., first rental start date, or date on which a collector 6 was newly sent for maintenance or replacement of a failed collector thereby, duration termination date (recall date) 66b on which the collector was recalled for maintenance or failure, collector ID 66c, RFID-tag identification number 66d of the RFID tag 12B (refer to FIG. 4B) affixed on the collector 6, collector format 66e, wind-sending capacity (litter/minute) 66f, manufacturing number 66g, manufacturer 66h, and check data 66i.

The check data 66i includes information such as check date, checker, and remarks.

Incidentally, in the present embodiment, in coincidence with the check for the collectors 6, the round check including the other rental appliances as well is made as will be described later. Accordingly, memorandum at the time of the check is recorded into the remarks field.

Additionally, although not illustrated, the round checker carries with him or her the mobile terminal 9 on which a check-used application program is loaded. The round checker reads the RFID tags affixed on rental appliances of check targets, thereby identifying the rental appliances. Next, with respect to a rental appliance which needs maintenance or replacement, the round checker records its record into the mobile terminal 9. Moreover, getting back to the analysis center 120, the round checker establishes the connection with the server 3, then making access to the client rental-appliance DB 42, and recording the record into the collector rental data 65 as the check data 66i. Consequently, the remarks field of the check data 66i includes the check information about all of the rental appliances. Namely, part of the collector rental data 65 is only utilized for convenience, so to speak. An independent check data file may be created on each service-contract-ID basis, and these files may be operated in a manner of being stored into a single check DB.

Although the duration start date 66a is recorded with respect to a collector 6 which is rented at present, the duration termination date 66b is blanked. In contrast thereto, with respect to a collector 6 which had been recalled already, both the duration start date 66a and the duration termination date 66b are recorded. This makes it possible to make a distinction between these collectors 6.

Furthermore, history information as to which of the collectors 6 have been rented at a single worksite 110 until now, and as to whether or not the periodic round check is made can be confirmed by seeing a plurality of collector rental data units 66 included in the collector rental data 65.

The collector management section 35c manages the collector DB 45, thereby recording the management history information about each of the collectors 6 owned for rent by the service contractor which contracts the environmental-radioactivity measurement service-operation.

Figure 22:
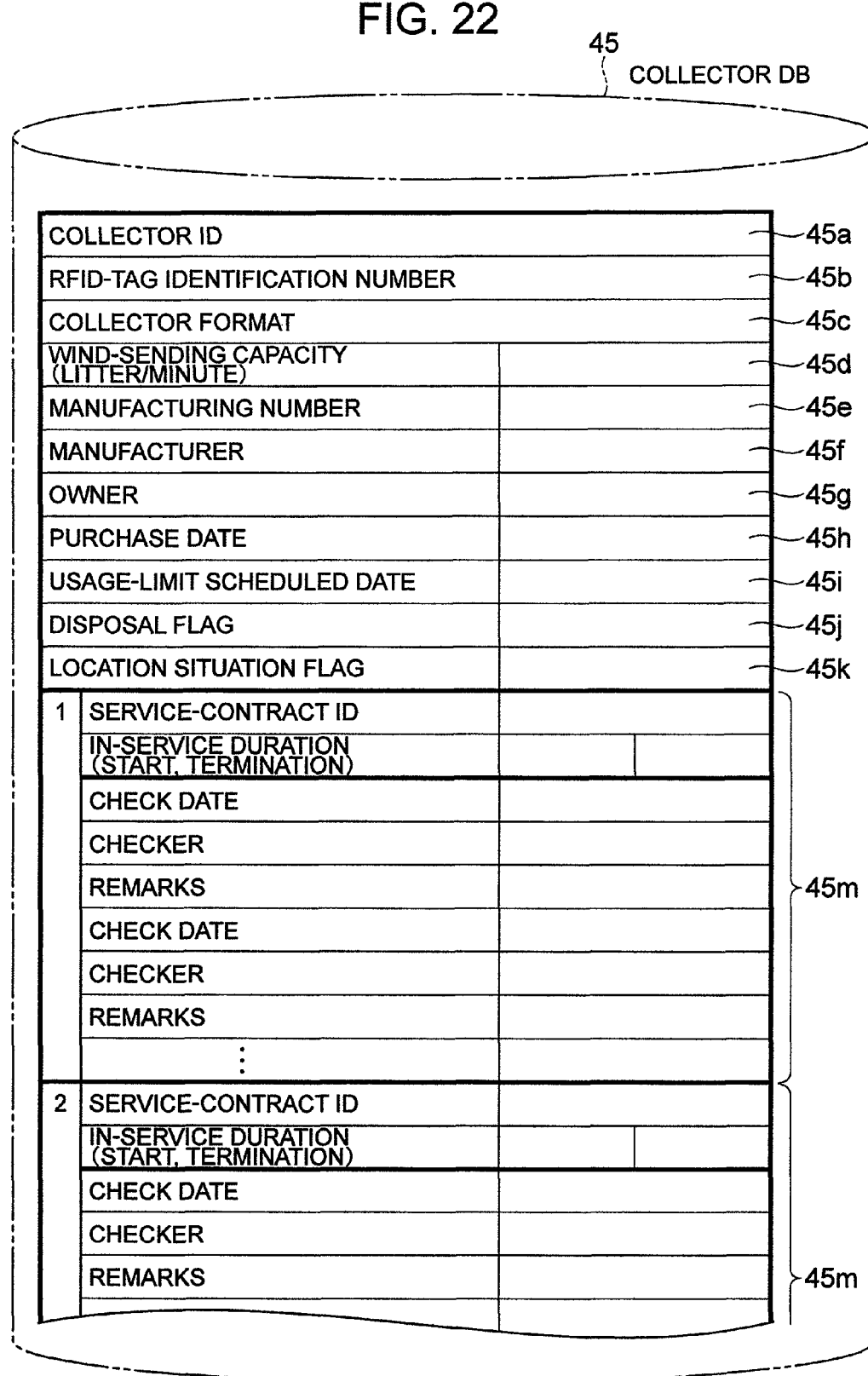
FIG. 22 is a diagram for exemplifying management history information about a single collector in the collector DB.

FIG. 22 is a diagram for exemplifying the management history information about a single collector 6 in the collector DB 45. The management history information about the single collector 6 includes collector ID 45a, RFID-tag identification number 45b of the RFID tag 12B (refer to FIG. 4B) affixed on the collector 6, collector format 45c, wind-sending capacity (litter/minute) 45d, manufacturing number 45e, manufacturer 45f, owner 45g, purchase date 45h, usage-limit scheduled date 45i on which maintenance service by the manufacturer becomes unable to receive, disposal flag 45j for indicating that the usage is prohibited, location situation flag 45k, and rental history information 45m which is recorded every time the collector 6 is rented.

Additionally, the location situation flag 45k is a flag for indicating situations such as "at rent at present", "on standby for rent", and "under repair".

The rental history information 43m includes information such as the service-contract ID for becoming capable of checking the rental destination, in-service duration (start, termination), i.e., date on which the collector had been sent for rent and date on which the collector was recalled, and the check data for each check (check date, checker, and remarks).

(Function Explanation of Mobile-Terminal Management Section)

The mobile-terminal management section 35d registers or updates the mobile-terminal rental data 67 recorded into the client rental-appliance DB 42 and information recorded into the mobile-terminal DB 46.

As illustrated in FIG. 18B, the mobile-terminal rental data 67 includes client code 67a, service-contract ID 67b, and mobile-terminal rental data unit 68, which are stored into a single file on each service-contract-ID basis. The mobile-terminal rental data unit 68 includes information such as duration start date (sending date) 68a, i.e., first rental start date, or date on which a mobile terminal 9 was newly sent for maintenance or replacement of a failed mobile terminal thereby, duration termination date (recall date) 68b on which the mobile terminal was recalled for maintenance or failure, mobile-terminal ID 68c, format 68d, manufacturing number 68e, and manufacturer 68f.

Although the duration start date 68a is recorded with respect to a mobile terminal 9 which is rented at present, the duration termination date 68b is blanked. In contrast thereto, with respect to a mobile terminal 9 which had been recalled already, both the duration start date 68a and the duration termination date 68b are recorded. This makes it possible to make a distinction between these mobile terminals 9.

Furthermore, history information as to which of the mobile terminals 9 have been rented at a single worksite 110 until now can be confirmed by seeing a plurality of mobile-terminal rental data units 68 included in the mobile-terminal rental data 67.

The mobile-terminal management section 35d manages the mobile-terminal DB 46, thereby recording the management history information about each of the mobile terminals 9 owned for rent by the service contractor which contracts the environmental-radioactivity measurement service-operation.

Figure 23:
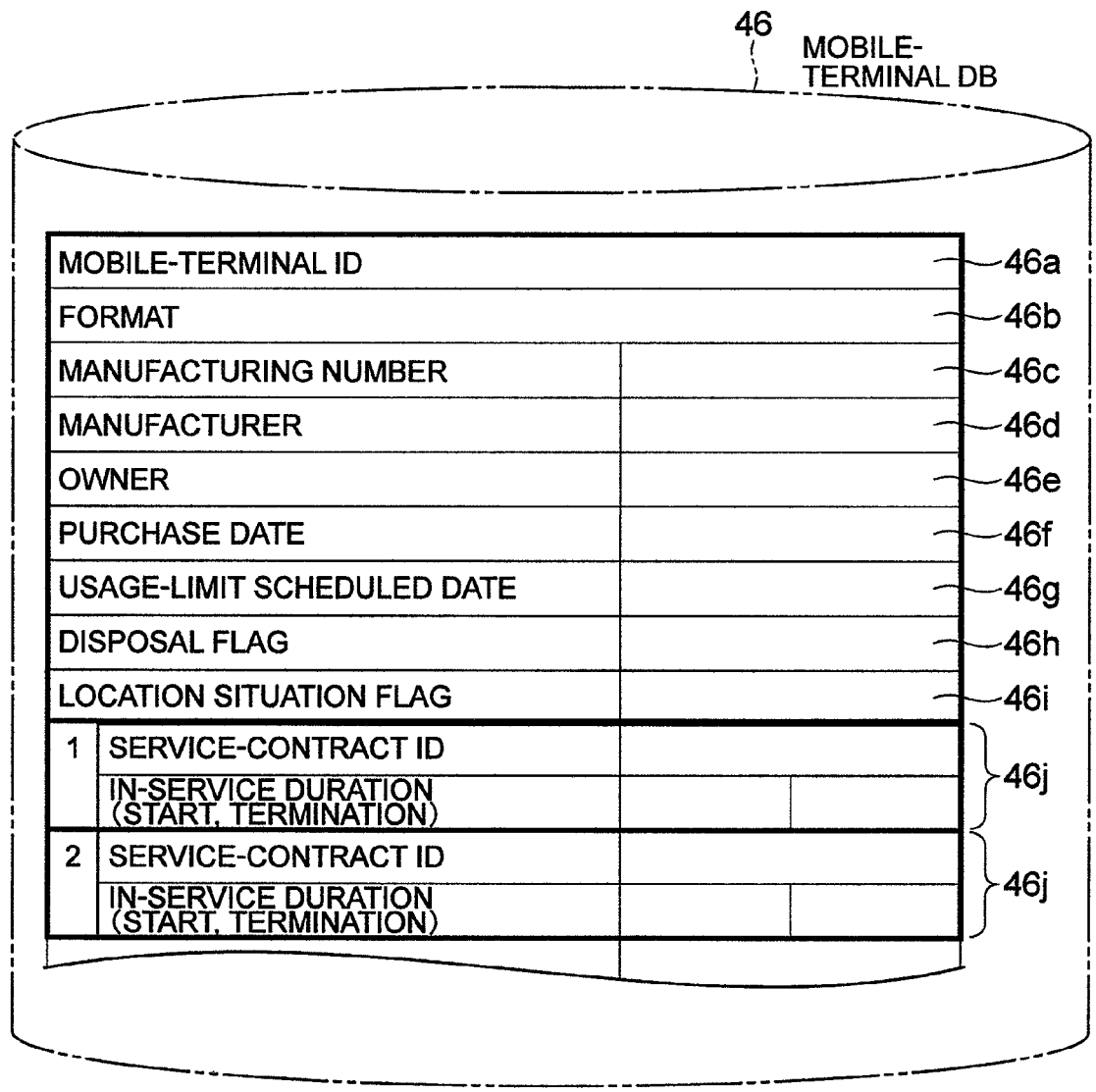
FIG. 23 is a diagram for exemplifying management history information about a single mobile terminal in the mobile-terminal DB.

FIG. 23 is a diagram for exemplifying the management history information about a single mobile terminal 9 in the mobile-terminal DB 46. The management history information about the single mobile terminal 9 includes mobile-terminal ID 46a, format 46b, manufacturing number 46c, manufacturer 46d, owner 46e, purchase date 46f, usage-limit scheduled date 46g on which maintenance service by the manufacturer becomes unable to receive, disposal flag 46h for indicating that the usage is prohibited, location situation flag 46i, and rental history information 46j which is recorded every time the mobile terminal 9 is rented.

Additionally, the location situation flag 46i is a flag for indicating situations such as "at rent at present", "on standby for rent", and "under repair".

The rental history information 46j includes information such as the service-contract ID for use in checking the rental destination, and in-service duration (start, termination), i.e., date on which the mobile terminal had been sent for rent and date on which the mobile terminal was recalled.

(Function Explanation of Manual Management Section)

FIG. 19 is a diagram for exemplifying the manual rental data 69 about the manuals which are now rented, and which are recorded into the client rental-appliance DB for each worksite of the clients.

The manual management section 35e registers or updates the manual rental data 69 recorded into the client rental-appliance DB 42 and information recorded into the manual DB 47.

As illustrated in FIG. 19, the manual rental data 69 includes client code 69a, service-contract ID 69b, and manual rental data unit 70, which are stored into a single file on each service-contract-ID basis. The manual rental data unit 70 includes information such as duration start date (sending date) 70a, i.e., first rental start date, or date on which a manual was sent for replacement of the manual 5A, duration termination date (recall date) 70b on which the manual was recalled for replacement, manual ID 70c, RFID-tag identification number 70d of the RFID tag 12A (refer to FIG. 4A) affixed on the manual 5A, applicable measurement-instrument format 70e, applicable measurement-base format 70f, manual's publication date 70g, revision number 70h, and revision date 70i. Although the duration start date 70a is recorded with respect to a manual 5A which is rented at present, the duration termination date 70b is blanked. In contrast thereto, with respect to a manual 5A which had been recalled already, both the duration start date 70a and the duration termination date 70b are recorded. This makes it possible to make a distinction between these manuals 5A.

Furthermore, history information as to which of the manuals 5A have been rented at a single worksite 110 until now can be confirmed by seeing a plurality of manual rental data units 70 included in the manual rental data 69.

Additionally, the recalled manual 5A will be disposed.

Figure 24:
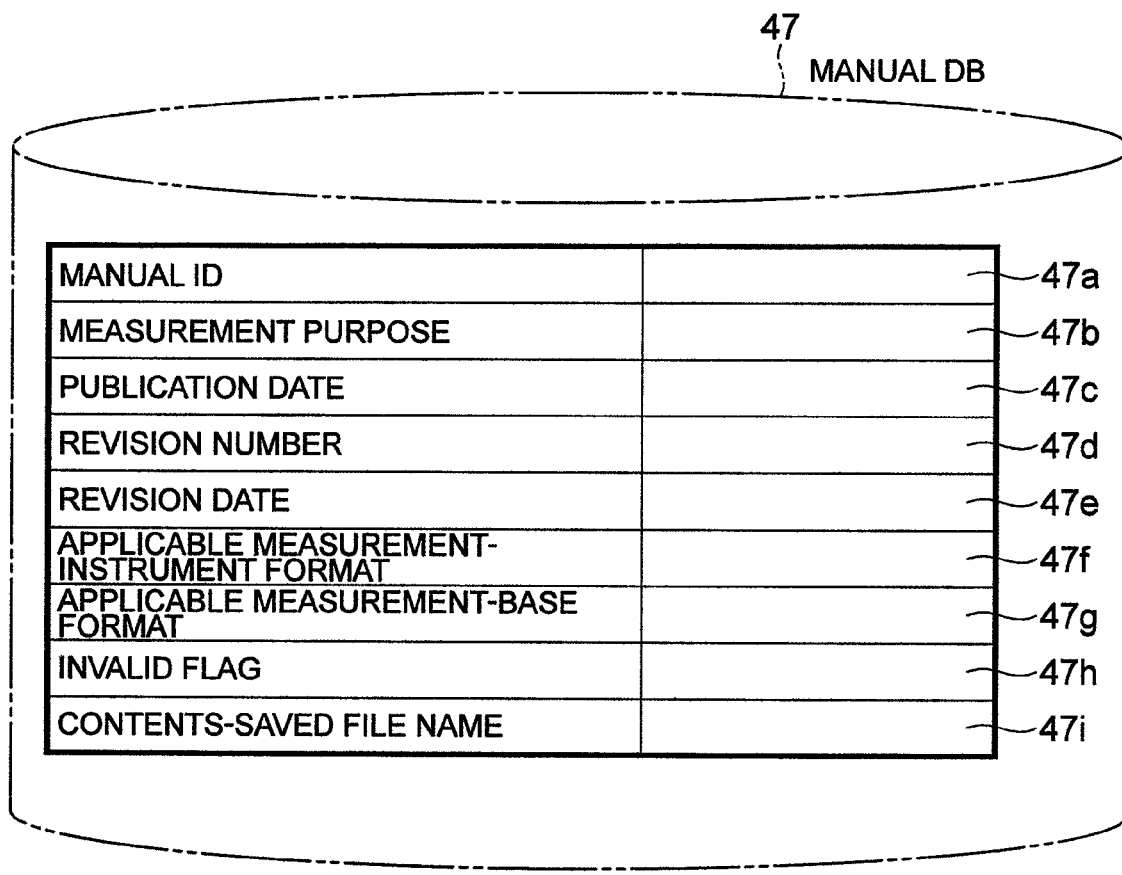
FIG. 24 is a diagram for exemplifying management history information about a single manual in the manual DB.

FIG. 24 is a diagram for exemplifying the management history information about a single manual in the manual DB 47. The management history information about a single manual 5A or manual 5B includes information such as manual ID47a, measurement purpose 47b indicating whether the manual is designed for the gross measurement at the worksites 110, or for the gross measurement and precise measurement at the analysis center 120, publication date 47c, revision number 47d, revision date 47e, applicable measurement-instrument format 47f, applicable measurement-base format 47g, invalid flag 47h indicating that this manual 5A or manual 5B becomes inapplicable since the revised version exists or the corresponding measurement instrument 7 ceases to be used, and contents-saved file name 47i, i.e., file name in which contents of the manual 5A or manual 5B are saved.

The above-described measurement-instrument rental data 61 (refer to FIG. 17A), measurement-base rental data 63 (refer to FIG. 17B), collector rental data 65 (refer to FIG. 18A), mobile-terminal rental data 67 (refer to FIG. 18B), and manual rental data 69 (refer to FIG. 19) correspond to rental information which will be disclosed in the appended claims.

<<Management Method for Detection Efficiency and Calibration Expiration Time-Limit of Measurement Instrument>>

Next, referring to FIG. 14 and FIG. 25 to FIG. 27 (refer to FIG. 16, FIG. 17A, and FIG. 20 depending on the requirements), the explanation will be given below concerning the management method of managing the detection efficiency and calibration expiration time-limit of a measurement instrument 7 at the analysis center 120.

Figure 25:
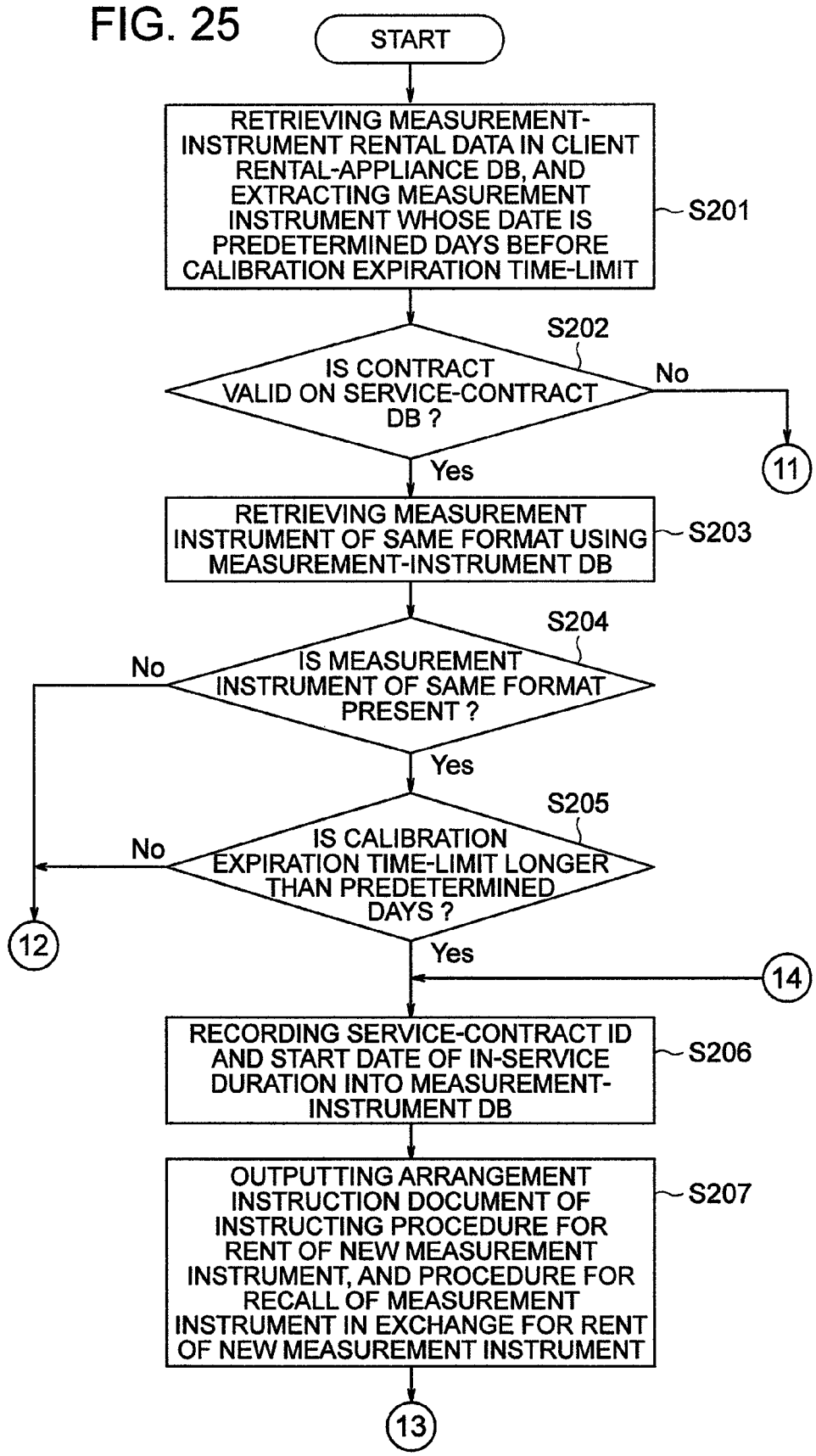
FIG. 25 is a flowchart for illustrating a flow of the control processing in the server at the analysis center for outputting a replacement arrangement instruction of replacing a measurement instrument which has been already pre-deployed at a worksite, and which has already become closer to the calibration expiration time-limit.
Figure 26:
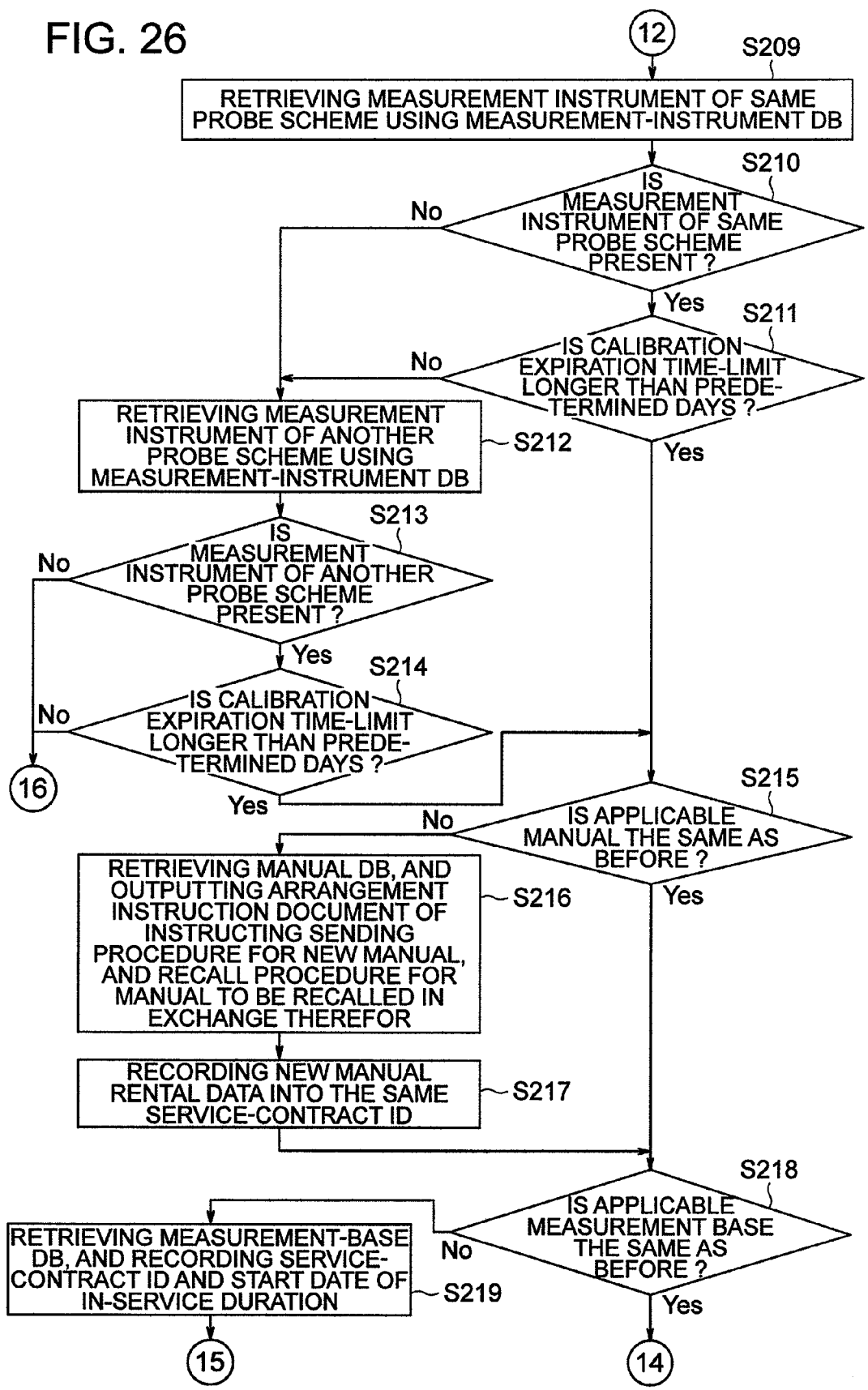
FIG. 26 is a flowchart for illustrating the flow of the control processing in the server at the analysis center for outputting the replacement arrangement instruction of replacing the measurement instrument which has been already pre-deployed at the worksite, and which has already become closer to the calibration expiration time-limit.
Figure 27:
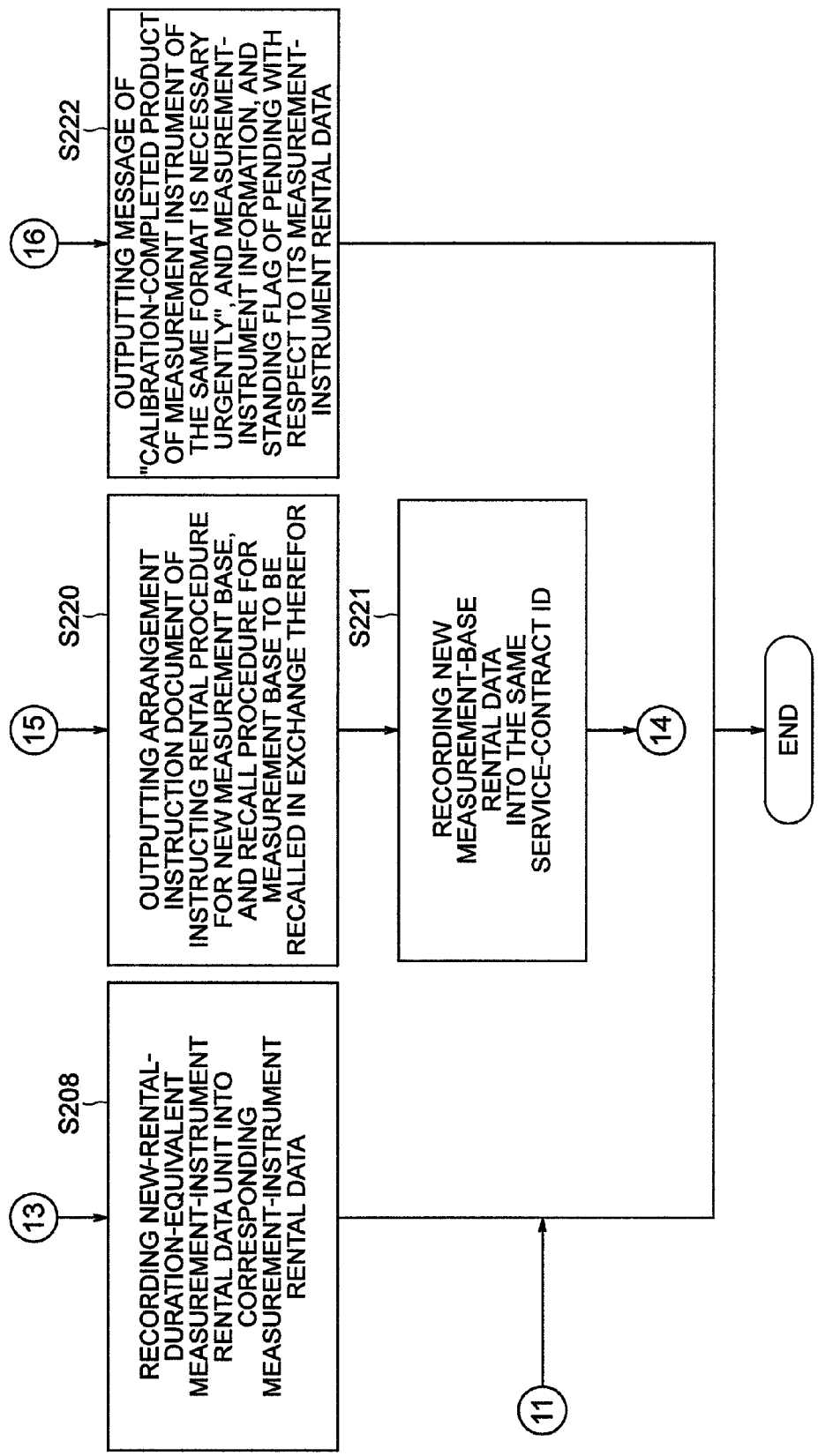
FIG. 27 is a flowchart for illustrating the flow of the control processing in the server at the analysis center for outputting the replacement arrangement instruction of replacing the measurement instrument which has been already pre-deployed at the worksite, and which has already become closer to the calibration expiration time-limit.

FIG. 25 to FIG. 27 illustrate the flowchart for illustrating a flow of the control processing in the server 3 at the analysis center 120 for outputting the replacement arrangement instruction of replacing a measurement instrument 7 which has been already pre-deployed at a worksite, and which has already become closer to the calibration expiration time-limit.

This control is mainly processed at the measurement-instrument management section 35a of the main unit 3a (refer to FIG. 14) in the server, and is also processed at the measurement-base management section 35b and the manual management section 35e depending on the requirements.

Unless otherwise specified, this control is the control processed at the measurement-instrument management section 35a.

At a step S201, the measurement-instrument management section 35a retrieves the measurement-instrument rental data 61 (refer to FIG. 17A) of the client rental-appliance DB 42, then extracting a measurement instrument 7 whose date is predetermined days before the calibration expiration time-limit from among the measurement instruments 7 which are at rent at present. Here, the predetermined days are assumed to be, e.g., four days.

Moreover, the measurement-instrument management section 35a checks whether or not the contract is valid on the service-contract DB 41 (step S202). As illustrated in FIG. 17A, the measurement-instrument rental data 61 extracted at the step S201 includes the service-contract ID 61b. Accordingly, the section 35a retrieves the service-contract DB 41 based on the service-contract ID 61b, then checking the contract validity situation 41s (refer to FIG. 16). This makes it possible to check whether or not the contract is valid.

If the contract is invalid (: No), the control processing for the arrangement instruction is terminated which instructs to arrange a before-calibration-expiration-time-limit replacement-purpose measurement instrument 7 with respect to the measurement instrument 7 which was extracted at the step S201 and is at rent at present. Consequently, it turns out that the section 35a searches for another measurement instrument 7 which is at rent at present. Meanwhile, if, at the step S202, the contract is valid (: Yes), the section 35a proceeds to a step S203.

At the step S203, the section 35a retrieves, based on the measurement-instrument DB 43 (refer to FIG. 20), a measurement instrument 7 of the same format as that of the measurement instrument 7 which is at rent at present. As illustrated in FIG. 20, the measurement-instrument DB 43 records the location situation flag 43k therein. Consequently, from among measurement instruments whose location situation flag 43k is "on standby for rent", the section 35a can easily retrieve, based on the measurement-instrument DB 43, the measurement instrument 7 of the same format as that of the measurement instrument 7 which is at rent at present. Furthermore, at a step S204, the section 35a checks whether or not the measurement instrument 7 of the same format is present. If this measurement instrument 7 is present (: Yes), the section 35a proceeds to a step S205. Meanwhile, if this measurement instrument 7 is absent (: No), the section 35a proceeds to a step S209.

Here, the reason for giving priority to the measurement instrument 7 of the same format as that of the measurement instrument 7 which is at rent at present is as follows: In the measurement instrument 7 of the same manufacturer, the same probe scheme, i.e., the same GM-tube detector or ZnS (Ag) scintillation detector, and the same format commercially designated by the maker, the setting condition for the control-operation buttons at the control-operation section 7c becomes the same. Accordingly, even if the measurement instrument 7 is replaced, the manual 5A and the measurement base 8 need not be replaced, i.e., they are allowed to remain the same as before.

At the step S205, the section 35a checks whether or not the calibration expiration time-limit of the measurement instrument 7 retrieved at the step S203 is longer than predetermined days. This check can be easily made as follows: In the measurement instrument 7 which is "on standby for rent" on the measurement-instrument DB 43, fields of the service-contract ID and in-service duration (start, termination) in the rental history information 43n are blanked, and the calibration execution date, calibration expiration time-limit, calibration executer, and detection efficiency therein are recorded. Accordingly, this check can be easily made by simply checking the calibration expiration time-limit in the rental history information 43n. If the calibration expiration time-limit is shorter than, e.g., 50%, the measurement instrument 7 needs to be replaced soon after it is rented. Consequently, of measurement instruments 7 which have margins of days longer than 50% of the calibration expiration time-limit, the measurement instruments 7 will be rent in the ascending order of the margins.

If, at the step S205, the calibration expiration time-limit is longer than the predetermined days (: Yes), the section 35a proceeds to a step S206. Meanwhile, if the calibration expiration time-limit is not longer than the predetermined days (: No), the section 35a proceeds to the step S209.

At the step S206, with respect to the measurement instrument 7 in the measurement-instrument DB 43, the section 35a records the service-contract ID and the start date of the in-service duration which are blanked in the rental history information 43n. Of course, the location situation flag 43k is rewritten from "on standby for rent" to "at rent at present".

In addition, at a step S207, the section 35a outputs, to the printer 3e ((refer to FIG. 3), an arrangement instruction document of instructing a procedure for the rent of a new measurement instrument 7 with respect to the measurement instrument 7, and a procedure for the recall of the measurement instrument 7 in exchange for the rent of the new measurement instrument 7.

Although the illustration is omitted, this arrangement instruction document prints thereon the service-contract ID 41a, client code 41b, worksite-location/department 41c, telephone number 41d, and in-charge person name 41e, and information about the measurement instrument 7 which will be newly rented (such as measurement-instrument ID 43a, RFID-tag identification number 43b, measurement-instrument name 43c, measurement-instrument format 43d, applicable measurement-base format 43e, calibration execution date, calibration expiration time-limit, and detection efficiency). Also, as the measurement-instrument information about the measurement instrument 7 which should be recalled, this arrangement instruction document prints thereon information such as the measurement-instrument ID 62c, RFID-tag identification number 62d, and calibration expiration time-limit 62f.

After the step S207, the section 35a proceeds to a step S208.

When the section 35a has proceeded from the step S204 or the step S205 to the step S209, the section 35a retrieves, based on the measurement-instrument DB 43, a measurement instrument 7 of the same probe scheme, i.e., the same GM-tube detector or ZnS (Ag) scintillation detector as before. Furthermore, at a step S210, the section 35a checks whether or not the measurement instrument 7 of the same probe scheme is present. If this measurement instrument 7 is present (: Yes), the section 35a proceeds to a step S211. Meanwhile, if this measurement instrument 7 is absent (: No), the section 35a proceeds to a step S212.

Here, the reason for searching for the measurement instrument 7 of the same probe scheme is as follows: In the measurement instrument 7 of the same probe scheme, the operator of the client finds and experiences a less change. Operation setting of the measurement instrument 7 at the time of the gross measurement at the worksite is almost the same, i.e., there exists a merely trivial operational change, such that only the deployment of the control-operation buttons differs at the operation setting of the measurement instrument 7. Accordingly, a false operation by the operator can be prevented.

At the step S211, the section 35a checks whether or not the calibration expiration time-limit of the measurement instrument 7 retrieved at the step S209 is longer than predetermined days. This is due to the reason explained at the step S205.

If, at the step S211, the calibration expiration time-limit is longer than the predetermined days (: Yes), the section 35a proceeds to a step S215. Meanwhile, if the calibration expiration time-limit is not longer than the predetermined days (: No), the section 35a proceeds to the step S212.

At the step S212, the section 35a retrieves, based on the measurement-instrument DB 43, a measurement instrument 7 of another probe scheme. Furthermore, at a step S213, the section 35a checks whether or not the measurement instrument 7 of another probe scheme is present. If this measurement instrument 7 is present (: Yes), the section 35a proceeds to a step S214. Meanwhile, if this measurement instrument 7 is absent (: No), the section 35a proceeds to a step S222.

At the step S214, the section 35a checks whether or not the calibration expiration time-limit of the measurement instrument 7 retrieved at the step S212 is longer than predetermined days. This is due to the reason explained at the step S205.

If, at the step S214, the calibration expiration time-limit is longer than the predetermined days (: Yes), the section 35a proceeds to the step S215. Meanwhile, if the calibration expiration time-limit is not longer than the predetermined days (: No), the section 35a proceeds to the step S222.

At the step S215, the section 35a checks whether or not the manual ID 62h of the measurement-instrument rental data unit 62 with respect to the measurement instrument 7 which is at rent at present is the same as the applicable manual ID 43m in the measurement-instrument DB 43 with respect to the measurement instrument 7 retrieved at the step S209 or step S212 (i.e., the applicable manual is the same as the one before). If the applicable manual is the same as the one before (: Yes), the section 35a proceeds to a step S218. Meanwhile, if the applicable manual is not the same (: No), the section 35a proceeds to a step S216.

At the step S216, the manual management section 35e retrieves the manual DB 47, then outputting, to the printer 3e, an arrangement instruction document of instructing a procedure for the sending of a new manual, and a procedure for the recall of the manual in exchange for the sending of the new manual.

Although the illustration is omitted, this arrangement instruction document prints thereon the service-contract ID 41a, client code 41b, worksite-location/department 41c, telephone number 41d, and in-charge person name 41e, and information about the manual 5A which will be newly rented (such as the manual ID 47a, measurement purpose 47b, publication date 47c, revision number 47d, revision date 47e, applicable measurement-instrument format 47f, applicable measurement-base format 47g, and contents-saved file name 47i). Also, as the information about the manual 5A which should be recalled, this arrangement instruction document prints thereon information such as the manual ID 70*c* and RFID-tag identification number 70*d*.

Incidentally, the RFID-tag identification number 70*d* of the RFID tag 12A, which is to be affixed onto the manual 5A that will be newly rented, is registered as follows: The person in charge performs a procedure of printing the manual 5A, and delivering the manual 5A to the worksite 110 of the client together with the measurement instrument 7. Namely, the in-charge person affixes the RFID tag 12A onto the manual 5A, then reading and registering the RFID-tag identification number 70*d* of the RFID tag 12A.

At a step S217, the manual management section 35*e* records a new manual rental data unit 70 into the manual rental data 69 which includes the corresponding service-contract ID 69*b*. Here, however, the duration termination date (i.e., recall date) 70*b* is blanked. The duration termination date (i.e., recall date) of the one-rental-duration-preceding manual rental data unit 70 will be recorded when the manual is recalled actually. After the step S217, the processing proceeds to the step S218.

At the step S218, the measurement-base management section 35*b* retrieves the measurement-base rental data 63 based on the corresponding service-contract ID 69*b*, thereby checking whether or not the measurement-base format of the measurement base 8 which is at rent at present is the same as the applicable measurement-base format 43*e* in the measurement-instrument DB 43 with respect to the measurement instrument 7 retrieved at the step S209 or step S212 (i.e., the applicable measurement base is the same as the one before). If the applicable measurement base is the same as the one before (: Yes), the section 35*b* proceeds to the step S206. Meanwhile, if the applicable measurement base is not the same (: No), the section 35*b* proceeds to a step S219.

At the step S219, the measurement-base management section 35*b* retrieves a measurement base 8 in which the location situation flag 44*f* of the measurement-base format 44*c* is "on standby for rent". Here, the measurement-base format 44*c* is included in the measurement-base DB 44, and is the same as the applicable measurement-base format 43*e*. Then, the 35*b* records the service-contract ID and the start date of the in-service duration which are blanked in the rental history information 44*g*. Of course, the location situation flag 44*f* is rewritten from "on standby for rent" to "at rent at present". Moreover, at a step S220, the measurement-base management section 35*b* outputs, to the printer 3*e* (refer to FIG. 3), an arrangement instruction document of instructing a procedure for the rent of a new measurement base 8 with respect to the measurement base 8, and a procedure for the recall of the measurement base 8 in exchange for the rent of the new measurement base 8.

Although the illustration is omitted, this arrangement instruction document prints thereon the service-contract ID 41*a*, client code 41*b*, worksite-location/department 41*c*, telephone number 41*d*, and in-charge person name 41*e*, and information about the measurement base 8 which will be newly rented (such as measurement-base ID 44*a*, RFID-tag identification number 44*b*, measurement-base format 44*c*, and applicable measurement-instrument format 44*d*). Also, as the measurement-base information about the measurement base 8 which should be recalled, this arrangement instruction document prints thereon information such as the measurement-base ID 64*c* and RFID-tag identification number 64*d*.

At a step S221, the section 35*b* records a new measurement-base rental data unit 64 into the corresponding measurement-base rental data 63. Here, however, the duration termination date (i.e., recall date) 64*b* is blanked. The duration termination date (i.e., recall date) 64*b* of the one-rental-duration-preceding measurement-base rental data unit 64 will be recorded when the measurement base is recalled actually. After the step S221, the section 35*b* proceeds to the step S206. After that, the section 35*b* proceeds to the step S208 via the above-described step S207.

At the step S208, the section 35*a* records a new-rental-duration-equivalent measurement-instrument rental data unit 62 into the corresponding measurement-instrument rental data 61. Here, however, the duration termination date (i.e., recall date) is blanked. The duration termination date (i.e., recall date) of the one-rental-duration-preceding measurement-instrument rental data unit 62 will be recorded when the measurement instrument is recalled actually. This step terminates the control processing for outputting the arrangement instruction document of arranging the replacement-purpose measurement instrument 7 with respect to the single measurement instrument 7 which was extracted at the step S201, whose contract was found to be valid, and which is at rent at present. After that, getting back to the step S201 again, the section 35*a* performs the management of the calibration expiration time-limit with respect to another measurement instrument 7 which is at rent at present.

In response to the fact that the arrangement instruction document to the effect that the next already-calibrated measurement instrument 7 be delivered within the calibration expiration time-limit has been outputted in this way, the operator at the department in charge of the rent and recall of the measurement instruments 7 takes out the corresponding measurement instrument 7 and measurement base 8 out of a storage room. Also, depending on the requirements, the operator asks the person in charge of manual preparation to prepare the manual 5A on which the RFID tag 12A is affixed, and prepares a request letter of asking the in-charge person at the worksite 110 of the client to send back the necessary recall products. Finally, the operator at the department packages these appliances, the manual, and the request letter, then sending them to the worksite 110 using door-to-door delivery service.

The measurement instrument 7, the measurement base 8, and the manual 5A, which are to be rented to the worksite 110, are managed in this way. The measurement instrument 7, the measurement base 8 applicable thereto, and the manual 5A to be applied thereto will be deployed at the worksite 110. As a result, with respect to the detection efficiency of the measurement instrument 7 deployed at the worksite 110, a constant reliability can be ensured for the purpose of the gross measurement at the worksite 110 in association with maintaining of the calibration expiration time-limit of the measurement instrument 7 and ensuring of the measurement base 8 and manual 5A applicable thereto.

When the measurement-instrument management section 35*a* has proceeded from the step S213 or the step S214 to the step S222, the section 35*a* outputs, to the printer 3*e*, a message of "calibration-completed product of measurement instrument of the same format is necessary urgently", and the measurement-instrument information (such as service-contract ID 41*a*, client code 41*b*, worksite-location/department 41*c*, telephone number 41*d*, and in-charge person name 41*e*, measurement-instrument format 43*d*, and manufacturer 43*g*). Then, the section 35*a* stands a flag of pending with respect to its measurement-instrument rental data 61.

The technician at the measurement-instrument calibration operation department, to whom this procedure instruction document is passed, immediately performs the calibration operation of the corresponding measurement instrument 7. This makes it possible to make the measurement instrument 7 ready in time for the replacement operation.

Additionally, although the illustration was omitted, the measurement-instrument calibration operation department is also equipped with a set of the terminal 1A connected to the server 3 via a LAN, the mobile terminal 9, and the manual 5A and measurement base 8 corresponding to each measurement-instrument format. Moreover, the technician combines the measurement instrument 7 set into the carry-out of the calibration with a measurement base 8 corresponding thereto and to be applied thereto. Then, the technician sets these appliances at the setting condition described on the manual 5A of the measurement instrument 7, and obtains the count value by the standard radiation source described earlier, thereby calculating the detection efficiency of the measurement instrument 7. Next, using the mobile terminal 9, the technician rewrites the calculated detection efficiency with respect to the RFID tag 12D affixed on the measurement instrument 7 together with the information on the calibration execution date, new calibration expiration time-limit, and calibration executer. Furthermore, using the terminal 1A, the technician makes access to the measurement-instrument DB 43 (refer to FIG. 20) by the measurement-instrument management section 35a in the server 3. In addition, the technician changes the location situation flag 43k from "in calibration operation" to "on standby for rent" with respect to the file of the corresponding measurement-instrument ID. Finally, the technician, in the new rental history information 43n, blanks the service-contract ID and in-service duration (start, termination), then inputting and registering information such as the calibration execution date, calibration expiration time-limit, calibration executer, and detection efficiency.

Incidentally, the explanation has been given in the above-described manner of outputting the arrangement instruction documents. The present invention, however, is not limited thereto. For example, an electronic notice via the LAN may also be used.

Also, the steps S201 to S222 in the present flowchart constitutes a measurement-instrument calibration/management unit which will be disclosed in the appended claims.

<<Management Method for Round Check of Rental Appliances>>

Next, referring to FIG. 28, the explanation will be given below concerning a management method of managing the round check of the rental appliances performed by the service contractor which contracts the environmental-radioactivity measurement service-operation.

Figure 28:
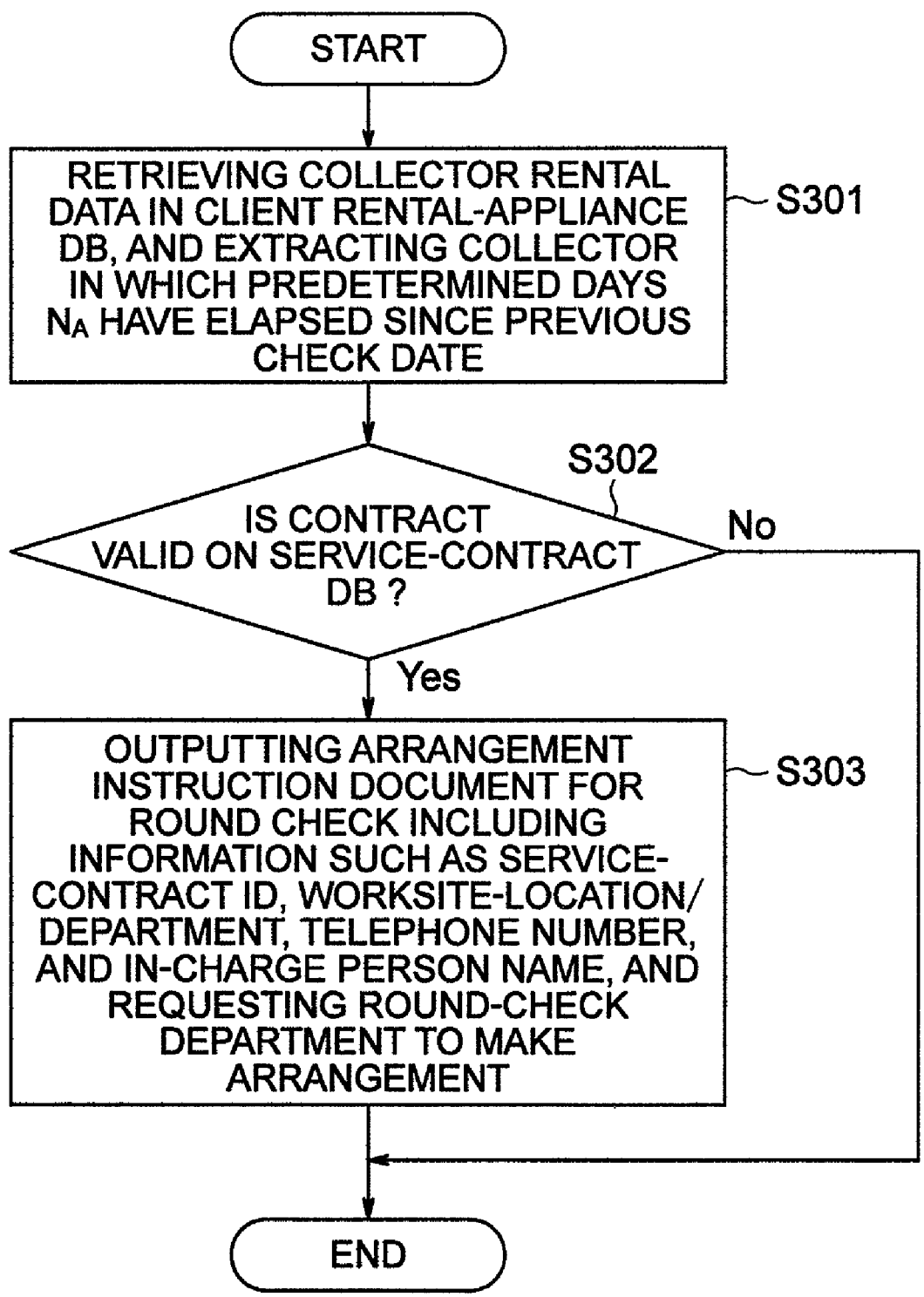
FIG. 28 is a flowchart for illustrating a flow of the control processing in the server at the analysis center for outputting an arrangement instruction of arranging the round check of the rental appliances which have been already pre-deployed at the worksite.

FIG. 28 is a flowchart for illustrating a flow of the control processing in the server at the analysis center for outputting an arrangement instruction of arranging the round check of the rental appliances which have been already pre-deployed at the worksite.

The collector management section 35c retrieves the collector rental data 65 in the client rental-appliance DB 42, thereby extracting a collector 6 in which predetermined days $N_A$ have elapsed since the previous check date (step S301).

Moreover, the section 35c checks whether or not the contract is valid on the service-contract DB 41 (step S302). As illustrated in FIG. 18A, the collector rental data 65 extracted at the step S301 includes the service-contract ID 65b. Accordingly, the section 35c retrieves the service-contract DB 41 based on the service-contract ID 65b, then checking the contract validity situation 41s (refer to FIG. 16). This makes it possible to check whether or not the contract is valid.

If the contract is invalid (: No), the control processing for the arrangement instruction is terminated which instructs to arrange the round check of the rental appliances (i.e., the collector 6, measurement instrument 7, measurement base 8, and mobile terminal 9) which were extracted at the step S301 and are at rent at present. Consequently, it turns out that the section 35c searches for another collector 6 which is at rent at present. Meanwhile, if, at the step S302, the contract is valid (: Yes), the section 35c proceeds to a step S303.

At the step S303, the section 35c outputs, to the printer 3e, an arrangement instruction document for the round check including the information such as the service-contract ID 41a, worksite-location/department 41c, telephone number 41d, and in-charge person name 41e, and requesting the round-check department to make the arrangement.

Although the illustration is omitted, in addition to the above-described information, this arrangement instruction document prints thereon the information on the measurement instrument 7 (such as measurement-instrument ID 43a, RFID-tag identification number 43b, measurement-instrument name 43c, measurement-instrument format 43d, applicable measurement-base format 43e, manufacturer 43g, calibration execution date, calibration expiration time-limit, and detection efficiency), the collector information (such as collector ID 45a, RFID-tag identification number 45b, collector format 45c, wind-sending capacity 45d, manufacturer 45f, and previous check date), the mobile-terminal information (such as mobile-terminal ID 46a, format 46b, and manufacturer 46d) and the information on the measurement base 8.

Here, it is assumed that the round check of the rental appliances is performed based on the period $N_A$ of the check date of the collector 6. The present invention, however, is not limited thereto. The collector 6 is, at least a dynamical appliance.

Accordingly, unless the wind-sending capacity 45d is maintained at a constant value, the collector 6 becomes inaccurate in the measurement of the environmental radioactivity. Consequently, at the stage of the check for the collector 6, a simultaneous check is made as to whether or not the other rental appliances, such as the measurement instrument 7 and mobile terminal 9, may exhibit an abnormality.

<<Analysis Method for Thoron/Radon Amounts at Analysis Center and Functions of Measurement-Data Management Section>>

(Analysis Method for Thoron/Radon Amounts at Analysis Center)

Next, referring to FIGS. 29A and 29B to FIG. 33, the explanation will be given below concerning the analysis method for the thoron/radon amounts at the analysis center 120 and functions of the measurement-data management section 36.

FIG. 29A is a flowchart for illustrating decay series of the uranium series' natural radioactive nuclides, where the half-life of each nuclide is indicated on the lower side of a solid line which indicates a follow of the disintegration. Radon (Rn-222), i.e., a radioactive noble gas, is emitted from minerals or the like into the air. After that, radon (Rn-222) is disintegrated into Pb-214 whose half-life is equal to 26.8 minutes, which is comparatively short. Pb-214 decays further to attain to Po-214. Moreover, Po-214 α-decays with an extremely short half-life, thereby emitting α-rays whose energy is equal to 7.68 MeV.

FIG. 29B is a flowchart for illustrating the decay series of the thorium series' natural radioactive nuclides, where, similarly, the half-life of each nuclide is indicated on the lower side of a solid line which indicates a follow of the disintegration. Thoron (Rn-220, also denoted as "Tn"), i.e., a radioactive noble gas, is emitted from the minerals or the like into the air. After that, thoron (Rn-220) is disintegrated into Pb-212 whose half-life is equal to 10.64 h, which is comparatively long (this is the significantly long half-life when compared with the half-life of Pb-214). Pb-212 decays further to attain to Bi-212 and Po-212. Moreover, Bi-212 and Po-212 α-decay with extremely short half-lives, thereby emitting α-rays whose energies are equal to 6.05 MeV and 8.78 MeV respectively.

Furthermore, in the case of the uranium series, the amount of Po-214 which emits the α-decays is in a radiation equilibrium state which is rate-determined by Pb-214 whose half-life is short. Similarly, the amounts of Bi-212 and Po-212 are also in the radiation equilibrium state which is rate-determined by Pb-212 whose half-life is long.

The amounts of radon (whose half-life is equal to 3.825 d) and thoron (whose half-life is equal to 55 s) in the air are directly measurable if the α-ray measurement device is brought into each worksite. In the case where a large number of measurement specimens are to be analyzed, however, this method means that the expensive α-ray measurement device must be deployed at each worksite. This is an unrealistic choice of option.

Then, each of the amounts of radon and thoron, which are in the radiation equilibrium state, can be analyzed in the following way: The air containing radon and thoron is absorbed using the collector 6. In this way, the progeny nuclides (mainly, Pb-214 and Pb-212 here), which are in the radiation equilibrium state with radon and thoron, are collected into the filter 11. Next, radioactivity intensities of the nuclides resulting from the disintegration of these progeny nuclides are measured, thereby making it possible to analyze each of the amounts of radon and thoron in the radiation equilibrium state.

Getting back to the flowchart illustrated in FIG. 2, at the step S01, at the worksite 110, the gross measurement on the α-ray amount is made within one hour from the collection. This gross measurement results in the acquisition of the first gross-measurement value given by the following Expression: Namely, the first gross-measurement value acquired can be related with the amount of the thoron (Tn) progeny nuclides and the amount of the radon (Rn) progeny nuclides as follows:

$$C_{G^1}(t0) = \eta_1 \cdot \epsilon \{\lambda_{Tn} N_{Tn}(t0) + \lambda_{Rn} N_{Rn}(t0)\}, \quad (1)$$

where $C_{G^1}(t0)$: gross-measurement value at worksite at point-in-time t0

$\eta_1$: already-known detection efficiency of measurement instrument at worksite $\epsilon$: gross-measurement correction coefficient (unknown value)

$\lambda_{Tn}$: effective decay constant of thoron progeny nuclides in radiation equilibrium state (0.693/10.64 h)

$N_{Tn}(t0)$: amount of thoron progeny nuclides at worksite at point-in-time t0 (actually, amount of Bi-212 and Po-212)

$\lambda_{Rn}$: effective decay constant of radon progeny nuclides in radiation equilibrium state (0.693/30 m)

$N_{Rn}(t0)$: amount of radon progeny nuclides at worksite at point-in-time t0 (actually, amount of Po-214).

Moreover, at the step S03, at the analysis center 120, the gross measurement on the α-ray amount is made using the measurement instrument 7 within ten to twenty-four hours after the collection. This gross measurement results in the acquisition of the second gross-measurement value given by the following Expression: Namely, the second gross-measurement value acquired can be related with the amount of the thoron (Tn) progeny nuclides and the amount of the radon (Rn) progeny nuclides as follows:

$$C_{G^2}(t1) = \eta_2 \cdot \epsilon \{\lambda_{Tn} N_{Tn}(t0) \cdot \exp(-\lambda_{Tn} \Delta t) + \lambda_{Rn} N_{Rn}(t0) \cdot \exp(-\lambda_{Rn} \Delta t)\}, \quad (2)$$

where $C_{G^2}(t1)$: gross-measurement value at analysis center at point-in-time t1

$\eta_2$: already-known detection efficiency of measurement instrument at analysis center $\Delta t$: time (t1−t0).

Since the half-life of Pb-214 is equal to 26.8 minutes, the amount of Pb-214 becomes equal to $1 \cdot 10^{-6}$ when ten hours have elapsed. In contrast thereto, the amount of Pb-212 mixed therewith becomes equal to about one-half. Accordingly, even if the amount of the radon progeny nuclides collected into the filter 11 were one-thousand times as large as the amount of the thoron progeny nuclides collected therein, the amount of the thoron progeny nuclides becomes dominant. Namely, the second term of the Expression (2) is equal to zero.

Consequently, after the second gross-measurement value has been acquired, the amount of Po-212 and Bi-212 at the point-in-time t1 can be measured by making the radioactive-nuclide analysis of the measurement specimen (filter 11) directly, or after applying a pre-processing such as ash processing thereto. Here, the radiation measurement device 17 which allows implementation of the accurate α-ray measurement is used in this radioactive-nuclide analysis. Then, from the measurement result of the amount of Po-212 and Bi-212, the above-described gross-measurement correction coefficient $\epsilon$, i.e., the proportional constant in the second gross measurement and the accurate α-ray measurement, is obtained. As a result, the radioactivity intensity of the thoron progeny nuclides at the point-in-time t0 can be determined as is given by the following Expression:

$$\lambda_{Tn} N_{Tn}(t0) = C_{G^2}(t1) \cdot \exp(\lambda_{Tn} \Delta t)/(\eta_2 \cdot \epsilon) \quad (3)$$

From the Expressions (1) and (3), the radioactivity intensity of the radon progeny nuclides at the point-in-time t0 can be determined as follows:

$$\lambda_{Rn} N_{Rn}(t0) = C_{G^1}(t0)/(\eta_1 \cdot \epsilon) - \lambda_{Tn} N_{Tn}(t0) \quad (4)$$

The determination of the amounts of $N_{Tn}(t0)$ and $N_{Rn}(t0)$ allows $N_{Tn}(t0)$ and $N_{Rn}(t0)$ of the unit air volume ($m^3$) to be determined from the timer setting time and wind-sending capacity at the collection time of the collector 6. Consequently, it becomes possible to calculate the respective amounts (i.e., concentrations) themselves of radon and thoron in the radiation equilibrium state by making the proportional calculations.

Hereinafter, referring to FIG. 3 and FIG. 30 to FIG. 34, the explanation will be given below concerning the functions of the measurement-data management section 36.

Figure 30:
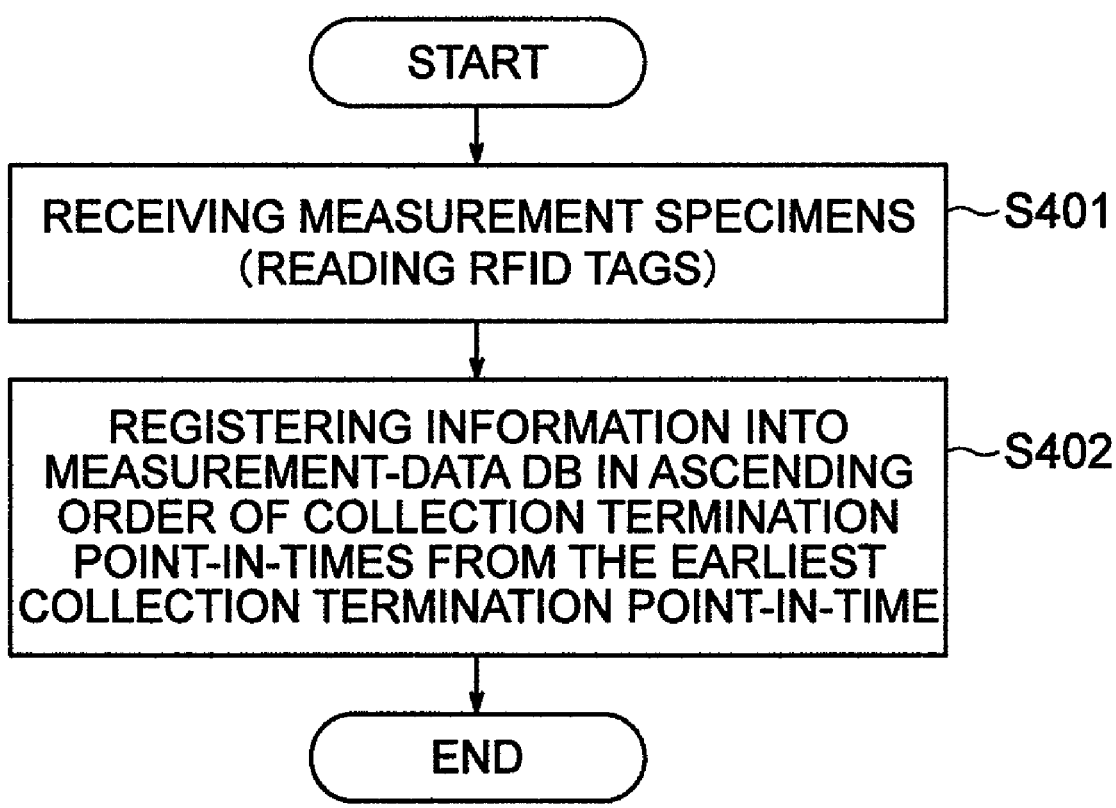
FIG. 30 is a flowchart for illustrating a flow of the control over a measurement-specimen reception function at the analysis center.
Figure 31:
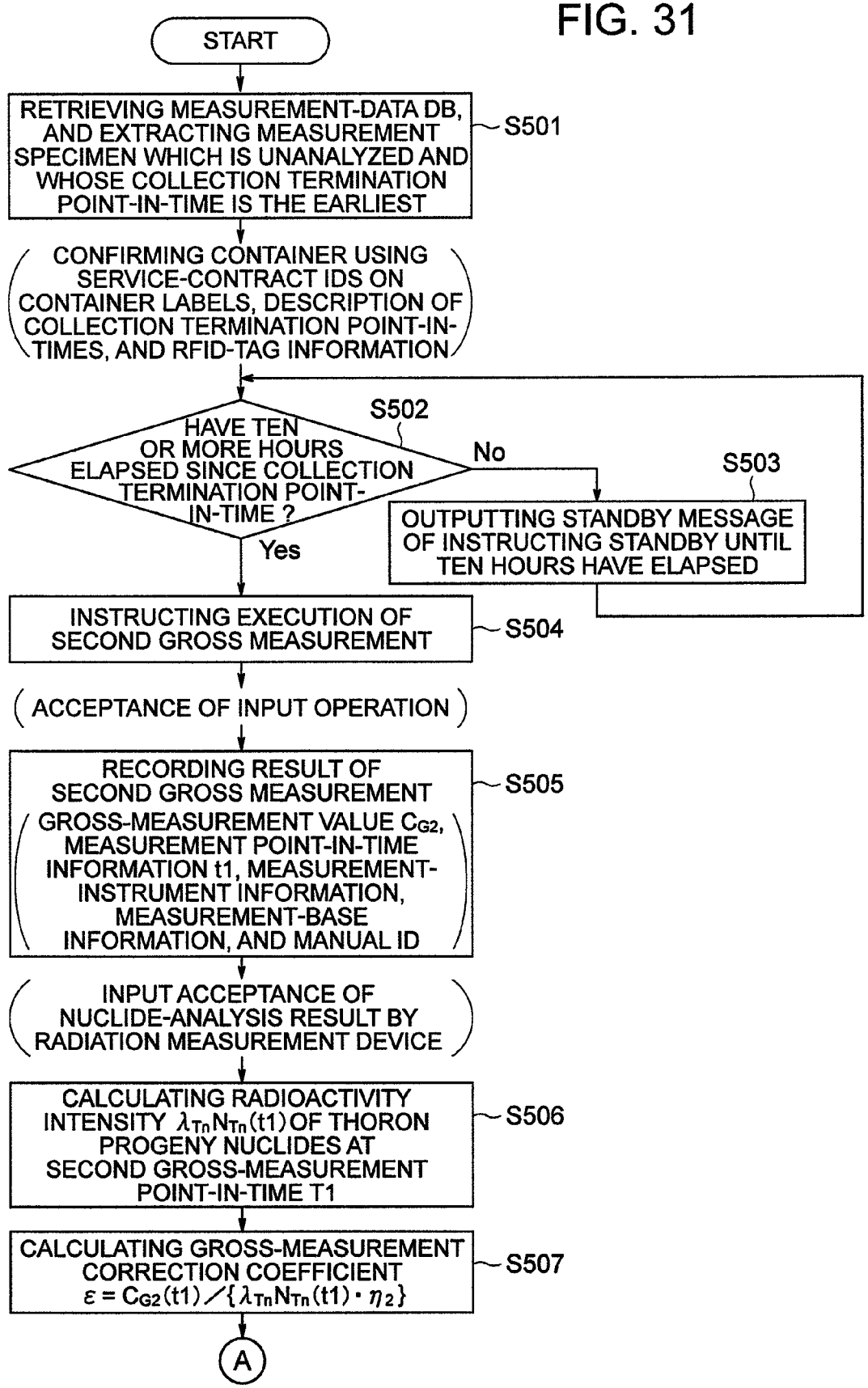
FIG. 31 is a flowchart for illustrating a flow of the control over a thoron/radon-amount analysis/evaluation & report function at the analysis center.
Figure 32:
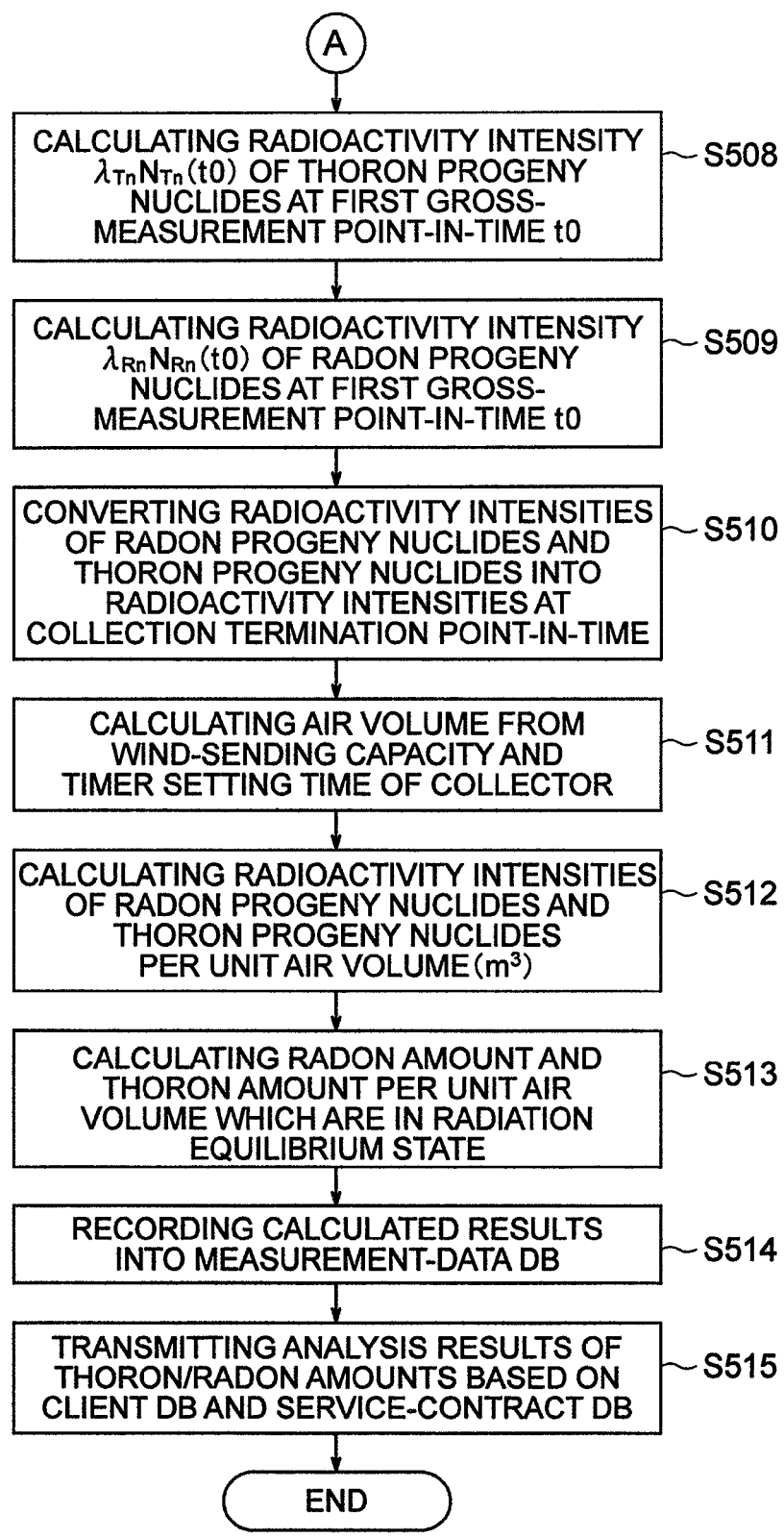
FIG. 32 is a flowchart for illustrating the flow of the control over the thoron/radon-amount analysis/evaluation & report function at the analysis center.

FIG. 30 is a flowchart for illustrating a flow of the control over a measurement-specimen reception function at the analysis center. FIG. 31 and FIG. 32 illustrate a flowchart for illustrating a flow of the control over a thoron/radon-amount analysis/evaluation & report function at the analysis center.

FIG. 33 is a diagram for exemplifying contents of a file of the measurement data about a single measurement specimen in the measurement-data DB.

The measurement-data management section 36 includes (1) the measurement-specimen reception function and (2) the measurement-specimen analysis & report function.

Incidentally, in FIG. 3, the server 3 and the mobile terminal 9 are illustrated in the analysis center 120. In more detail, however, a plurality of terminals 1A, whose illustration is omitted and which are connected to the server 3 via a LAN, are prepared at the measurement-specimen reception department and the analysis in-charge department. Also, a main unit 1a of the terminal 1A and the mobile terminal 9 are connected to each other via the USB connector 1*e*. Also, application programs designed for the analysis center 120 are loaded on the mobile terminal 9, and function in cooperation with the measurement-data management section 36 in the server 3.

Also, a manual 5B designed for the analysis center 120 is deployed at the analysis in-charge department together with the measurement instrument 7 and measurement base 8 corresponding thereto. In addition, the radiation measurement device 17, which is the accurate α-ray measurement device, is deployed.

(Function (1) of Measurement-Data Management Section—Measurement-Specimen Reception)

First, the explanation will be given below regarding the operation of receiving the measurement specimens sent from the worksite 110 of the client using door-to-door delivery service of the analysis center 120.

The in-charge person who is in charge of the measurement-specimen reception department opens the door-to-door delivery service goods, then reading the RFID tags 12C using the mobile terminal 9 with the containers 14 remaining in the hermetically-packaged state (step S401). Next, the in-charge person delivers the containers 14 to the analysis in-charge department, where the containers 14 are arranged in an ascending order of the collection termination point-in-times 55*a* from the earliest collection termination point-in-time described on the labels affixed on the containers 14. The measurement-data management section 36 summarizes the information read from the RFID tags 12C into a format illustrated in FIG. 33. Next, the section 36 registers, as measurement data, the format-summarized information into the measurement-data DB 48 in the ascending order of the collection termination point-in-times 55*a* from the earliest collection termination point-in-time (step S402). As illustrated in FIG. 33, this measurement data is created for each RFID-tag identification number 48*a* on each of the RFID tags 12C affixed on the filters 11. Here, however, information corresponding to reference numerals 81 to 88 is blanked.

Additionally, the steps S401 and S402 in the flowchart correspond to "first gross-measurement information acquisition unit" and "step B" which will be disclosed in the appended claims.

(Function (2) of Measurement-Data Management Section—Analysis and Report)

First, using the measurement-data management section 36, the in-charge person who is in charge of the analysis in-charge department retrieves the measurement-data DB 48, thereby extracting a measurement specimen which is unanalyzed and whose collection termination point-in-time is the earliest (step S501). In the file of the individual measurement data labeled with each RFID-tag identification number 48*a* on each RFID tag 12C affixed on each filter 11, it is immediately understood that, as illustrated in FIG. 33, the information denoted by the reference numerals 81 to 88 is blanked and unanalyzed. The file of the measurement data extracted will be displayed on the display device.

The in-charge person sees the contents of the file of the measurement data displayed on the display device, then reading the service-contract IDs on the labels affixed on the containers 14, the description of the collection termination point-in-times 55*a*, and the information on the RFID tags 12C by using the mobile terminal 9. By doing this, the in-charge person finds it easy to confirm and take out the corresponding container 14 out of the containers 14 which contain the measurement specimens (filters 11) delivered and deployed from the measurement-specimen reception department.

The measurement-data management section 36 confirms that the extracted RFID-tag identification number coincides with the RFID-tag identification number of the file of the measurement data extracted at the step S501. If the extracted RFID-tag identification number does not coincide therewith, the section 36 calls attention to the in-charge person via the display section 9*c*. Meanwhile, if the extracted number coincides therewith, the section 36 proceeds to a step S502, then checking whether or not ten or more hours have elapsed since the collection termination point-in-time up to the present point-in-time. If ten or more hours have elapsed (: Yes), the section 36 proceeds to a step S504. Meanwhile, if ten or more hours have not elapsed (: No), the section 36 proceeds to a step S503.

In the case of having proceeded to the step S503, the section 36 outputs a standby message of instructing the in-charge person to be on standby until ten or more hours have elapsed. Accordingly, the in-charge person, who will rerun to the step S502, is made to wait for a while until ten or more hours have elapsed.

In the case of having proceeded to the step S504, the measurement-data management section 36 instructs the in-charge person to execute the second gross measurement.

In accordance with this instruction, the in-charge person takes out the measurement specimen (filter 11) out of the container 14, and sets up the measurement specimen on the measurement base 8 as illustrated in FIG. 4C, thereby making the second gross measurement. Moreover, the in-charge person inputs the second gross-measurement value and the in-charge person name from the mobile terminal 9, and further, reads with the RFID-tag R/W the RFID tag 12A affixed on the manual 5A, the RFID tag 12D affixed on the measurement instrument 7, and the RFID tag 12E affixed on the measurement base 8.

At a step S505, the measurement-data management section 36 accepts the input operation by the control-operation section 9*b* and the read result of the RFID-tag information read by the RFID-tag R/W, then recording the result of the second gross measurement into the file of the corresponding measurement data in the measurement-data DB 48.

Concretely, the result of the second gross measurement is information such as the second gross-measurement information 81 of the second gross-measurement value (value $C_{G^2}$) and measurement point-in-time (t1), measurement-instrument information 82 such as the measurement-instrument ID, measurement-instrument format, calibration expiration time-limit, and detection efficiency (second detection efficiency $\eta_2$) read from the RFID tag 12D affixed on the measurement instrument 7 deployed at the analysis center 120, measurement-base information such as the measurement-base ID and measurement-base format read from the RFID tag 12E, and manual ID read from the RFID tag 12A. In FIG. 33, only the second gross-measurement information 81 and measurement-instrument information 82 are exemplified, and displaying the other information is omitted.

After that, the in-charge person sets up the measurement specimen (filter 11) into the radiation measurement device 17 directly, or after applying the pre-processing such as ash processing thereto. Furthermore, the in-charge person makes the analysis of the measurement specimen using the radiation measurement device 17, thereby acquiring results of the radioactive-nuclide analysis and radioactivity intensity for each radioactive nuclide. The in-charge person inputs these results using the mobile terminal 9, and the measurement-data management section 36 accepts this input (i.e.,"input acceptance of nuclide analysis result by radiation measurement device"). At this time, the in-charge person reads a not-illustrated RFID tag affixed on the radiation measurement device 17, thereby inputting information on radiation-measurement-device ID and radiation-measurement-device format as well ("input acceptance of nuclide analysis result by radiation measurement device").

At a step S506, the measurement-data management section 36 calculates the radioactivity intensity $\lambda_{Tn} N_{Tn}$ (t1) of the thoron progeny nuclides at the second gross-measurement point-in-time t1. This is intended to correct, with the use of the decay constant $\lambda_{Tn}$, a time difference which will inevitably occur between the second gross-measurement point-in-time t1 and the measurement point-in-time by the radiation measurement device 17.

Next, the section 36 calculates the gross-measurement correction coefficient ε (step S507).

$$\epsilon = C_G{}^2(t1)/\{\lambda_{Tn} N_{Tn}(t1)\cdot\eta_2\}$$

In the first gross measurement at the worksite 110 and the second gross measurement at the analysis center 120, only the α-rays are measured which enter the incidence window of the probe 7a of the measurement instrument 7 from part of the filter 11 in accordance with a geometrical condition therebetween. In contrast thereto, the measurement method by the radiation measurement device 17 is a method of applying the ash processing to the filter 11, i.e., the measurement specimen, and deploying all of the collected progeny nuclides in a manner of being concentrated into the field-of-view of the radiation measurement device. As a result, this measurement method makes it possible to measure the number of the progeny nuclides grabbed into the filter, i.e., the number of the progeny nuclides with respect to the collected air volume. Consequently, the measurement result of the radioactivity intensity obtained by the radiation measurement device 17 is in a constant proportional relationship with the measurement result of the radioactivity intensity obtained by the gross measurement.

Similarly, in the case of directly analyzing the filter 11 without applying the ash processing thereto, the measurement result obtained by the radiation measurement device 17 is also in a constant proportional relationship with the measurement result of the radioactivity intensity obtained by the gross measurement. In this case, the above-described gross-measurement correction coefficient ε can be calculated as follows: Namely, the first and second gross-measurement values and the measurement value obtained by the radiation measurement device 17 are addressed in a unified manner by converting these values into the radioactivity intensities per unit area of the filter 11 using the detection efficiencies including their respective geometrical conditions.

Next, at a step S508, the section 36 calculates the radioactivity intensity $\lambda_{Tn} N_{Tn}$ (t0) of the thoron progeny nuclides at the first gross-measurement point-in-time t0.

Since the gross-measurement correction coefficient ε has been calculated at the step S507, the radioactivity intensity $\lambda_{Tn} N_{Tn}$ (t0) can be easily calculated by making the inverse calculation from the relationship given by the following Expression:

$$\lambda_{Tn} N_{Tn}(t1) = \lambda_{Tn} N_{Tn}(t0)\cdot\exp(-\lambda_{Tn}\Delta t) \quad (5)$$

Next, the section 36 calculates the radioactivity intensity $\lambda_{Rn} N_{Rn}$ (t0) of the radon progeny nuclides at the first gross-measurement point-in-time t0 (step S509). This radioactivity intensity can be easily calculated as indicated by the following Expression:

$$\lambda_{Rn} N_{Rn}(t0) = C_G{}^1(t0)/(\eta_1\cdot\epsilon) - \lambda_{Tn} N_{Tn}(t0) \quad (6)$$

Moreover, at a step S510, the section 36 converts the radioactivity intensities of the radon progeny nuclides and the thoron progeny nuclides into the radioactivity intensities at the collection termination point-in-time. This is intended to correct, with the use of the decay constants $\lambda_{Rn}$ and $\lambda_{Tn}$, a time difference between the collection termination point-in-time and the first gross-measurement point-in-time t0 in order to enhance the accuracy further.

At a step S511, the section 36 calculates the air volume from the wind-sending capacity and timer setting time of the collector 6, then calculating the radioactivity intensities of the radon progeny nuclides and the thoron progeny nuclides per unit air volume ($m^3$) (step S512).

At a step S513, the measurement-data management section 36 calculates the amount of radon and the amount of thoron per unit air volume which are in the radiation equilibrium state. In the case of being in the radiation equilibrium state, the amount of the radon progeny nuclides and the amount of radon are in a proportional relationship with each other, and the amount of the thoron progeny nuclides and the amount of thoron are in a proportional relationship with each other. Accordingly, the section 36 possesses their proportional constants in advance, and thus can easily calculate the radon amount and the thoron amount using these proportional constants.

Moreover, at a step S514, the measurement-data management section 36 records the calculated results into the file of the corresponding measurement data in the measurement-data DB 48. As illustrated in FIG. 33, the calculated results thus recorded are, e.g., value 83 of the thoron-progeny-nuclides radioactivity intensity calculated at the step S506, value 84 of the gross-measurement correction coefficient ε calculated at the step S507, information 85 on the radiation-measurement-device ID and radiation-measurement-device format inputted from the mobile terminal 9 after the step S505, and value 86 of the thoron amount and value 87 of the radon amount calculated at the step S513.

Incidentally, the other calculated values halfway in the calculation processes at the steps S508 to S512 may also be recorded into the file of the measurement data.

At a step S515, based on the service-contract ID and client DB, the measurement-data management section 36 transmits the calculated radon amount and thoron amount to the contract department of the client and in-charge department at the worksite 110 via mail in a predetermined format (i.e., transmitting analysis result of thoron/radon amounts based on client DB and service-contract ID). Furthermore, the section 36 records report time-and-date 88 into the file of the measurement data.

Additionally, in the file of the measurement data, as illustrated in FIG. 33, the service-contract ID and client code are recorded in the field indicated by the manual information 50. Consequently, retrieving the client DB 40 with the client code makes it possible to easily obtain the terminal address information, and retrieving the service-contract DB 41 with the service-contract ID makes it possible to easily obtain the terminal address information.

In the foregoing explanation, the control over the management at the analysis center 120 is terminated which manages the series of operations of the analysis with respect to a single measurement specimen and the report of the analysis result to the client.

The step S505 in the present flowchart corresponds to "second-gross-measurement information acquisition unit" and "step C" which will be disclosed in the appended claims. "Input acceptance of nuclide analysis result by radiation measurement device" subsequent to the step S505 corresponds to "accurate-analysis-result acquisition unit" and "step D" which will be disclosed in the appended claims. The steps S506 and S507 correspond to "correction-coefficient acquisition unit" and "step E" which will be disclosed in the appended claims. The step S508 corresponds to "sampling-time thoron-progeny-nuclides amount calculation unit" and "step F" which will be disclosed in the appended claims. The step S509 corresponds to "sampling-time radon-progeny-nuclides amount calculation unit" and "step G" which will be disclosed in the appended claims.

Also, the mobile terminal 9 deployed at the analysis center 120 in the present embodiment corresponds to "input unit" which will be disclosed in the appended claims.

<<Function Explanation of Billing Processing Section>>

Next, referring to FIG. 34, the explanation will be given below concerning function of the billing processing section 37.

FIG. 34 is a diagram for illustrating a format example of billing data for periodically charging a department of the client, which has commissioned the environmental-radioactivity measurement service-operation, the contract expense needed for the environmental-radioactivity measurement service-operation. This billing data 90 is outputted by the billing processing section 37, and is recorded into the billing DB 49.

The billing processing section 37 is a function which is automatically started on a predetermined date by the application programs 23 stored in the storage section 3b. The billing processing section 37 charges fees such as analysis fee occurring from the billing processing at the last time to the billing processing at this time, rental fee needed for the rental appliances during this duration, fee needed for the calibration processing for the measurement instruments 7, and fees such as personnel expense needed for the round check of the rental appliances and maintenance expense at that time.

As illustrated in FIG. 34, the analysis fee is billed in accordance with the number of the measurement specimens. This billing processing is performed as follows: The billing processing section 37 retrieves the measurement-data DB 48 based on the corresponding client code, thereby extracting how many files of the measurement data exist which are equipped with the report time-and-date 88 included within a predetermined duration.

The unit price of the rental fee needed for the rental appliances is determined by the unit of a set of the measurement instrument 7, the measurement base 8, and the manual 5A, the unit of a set of the mobile terminal 9, and the unit of a set of the collector 6, respectively. The subtotal is calculated based on the number of these units. The information on the number of these units is obtained as follows: The billing processing section 37 retrieves the service-contract DB 41 based on the client code, thereby making it possible to calculate the number of the appliances which are at rent at present.

The calibration-processing fee for the measurement instruments 7, and the round-check fee for the rental appliances may be included within the rental fee. Here, however, these fees are billed as separated billing fees. The calibration-processing fee for the measurement instruments 7 is obtained as follows: The billing processing section 37 retrieves the measurement-instrument rental data 61 in the client rental-appliance DB 42 based on the client code, thereby extracting measurement instruments 7 which have the duration start date 62a (refer to FIG. 17A) included within a predetermined duration. This extraction makes it possible to find out how many units of the measurement instruments 7 have been replaced due to the approaching of the calibration expiration time-limit.

Also, the round-check fee for the rental appliances is obtained as follows: The billing processing section 37 retrieves the collector rental data 65 in the client rental-appliance DB 42, thereby extracting collectors 6 whose check data 66i (refer to FIG. 18A) is included within a predetermined duration.

As described above, the billing processing section 37 can perform the billing processing by retrieving the databases such as the service-contract DB 41, client rental-appliance DB 42, and measurement-data DB 48.

As having been described above, according to the present embodiment, basically thanks to the offer of the calibrated measurement instrument 7 and the round-checked collector 6 and other rental appliances, even an in-charge person at the worksite 110 of the client who is not a professional technician at all finds it possible to accurately make the first gross measurement on the thoron progeny nuclides and the radon progeny nuclides which are collected into the filter 11 using the collector 6.

In particular, the use of the measurement base 8 makes it possible to make constant the geometrical-configuration-depending detection efficiency of the probe 7a of the measurement instrument 7. This situation allows the first gross measurement at the worksite 110 to be made with the detection efficiency $\eta_1$ which is the same as the detection efficiency $\eta_1$ at the time of being calibrated.

Also, when a contribution made by the radon progeny nuclides exists in the first gross measurement at the worksite 110, the second gross measurement at the analysis center 120 is made after at lest ten or more hours have elapsed since the collection termination point-in-time. Accordingly, in the second gross measurement, the contribution made by the radon progeny nuclides can be regarded as being zero. Moreover, the absolute value of the thoron progeny nuclides can be known by measuring the radioactivity intensity of the thoron progeny nuclides using the radiation measurement device 17 which allows implementation of the accurate α-ray measurement. Consequently, the gross-measurement correction coefficient $\epsilon$ can be calculated easily.

There are provided the measurement-instrument rental data 61 in the client rental-appliance DB 42 and the measurement-instrument DB 43. The measurement-instrument management section 35a retrieves the measurement-instrument rental data 61. Then, the section 35a makes an arrangement with respect to a measurement instrument 7, which is at rent at present and which has already become closer to the calibration expiration time-limit, so that a new measurement instrument will be delivered before the calibration expiration time-limit has expired. Accordingly, it becomes possible to suitably perform quality management of the first gross measurement at the worksite 110.

Also, the round check of a collector 6 is made in which predetermined days have elapsed since the previous check date. Moreover, the confirmation of the wind-sending capacity 45d is made, and at this time, the check of the other rental appliances, such as the manual 5A, measurement instrument 7, and mobile terminal 9, is made simultaneously. Consequently, it becomes possible to suitably perform quality management of the aspect of the sampling of the measurement specimens.

At the analysis center 120, the results of the second gross measurement and the accurate α-ray measurement by the radiation measurement device 17 are inputted after the contribution by the radon progeny nuclides becomes equal to substantially zero. After that, the measurement-data management section 36 automatically calculates the thoron/radon amounts using the simple calculation method, then automatically reporting the analysis result to the worksite 110 of the client and the order-placing department of the environmental-radioactivity measurement service-operation. Accordingly, the swift report is executable. In particular, even if radon is contained, the radon amount can be calculated because of the fact that the first gross-measurement value at the worksite 110 has been acquired.

Out of the measurement-data DB 48 and based on the client code, the billing processing section 37 retrieves the files of the measurement data whose report times-and-dates are included within a predetermined duration set as the target of the billing. This retrieval allows the billing to be performed in correspondence with the number of the measurement specimens. Also, the billing processing section 37 retrieves the client rental-appliance DB 42, thereby making it possible to easily extract the calibration-processing expense for the measurement instruments 7, and to easily calculate the round-check expense by the round-check person.

<<Modified Embodiment>>

Figure 12:
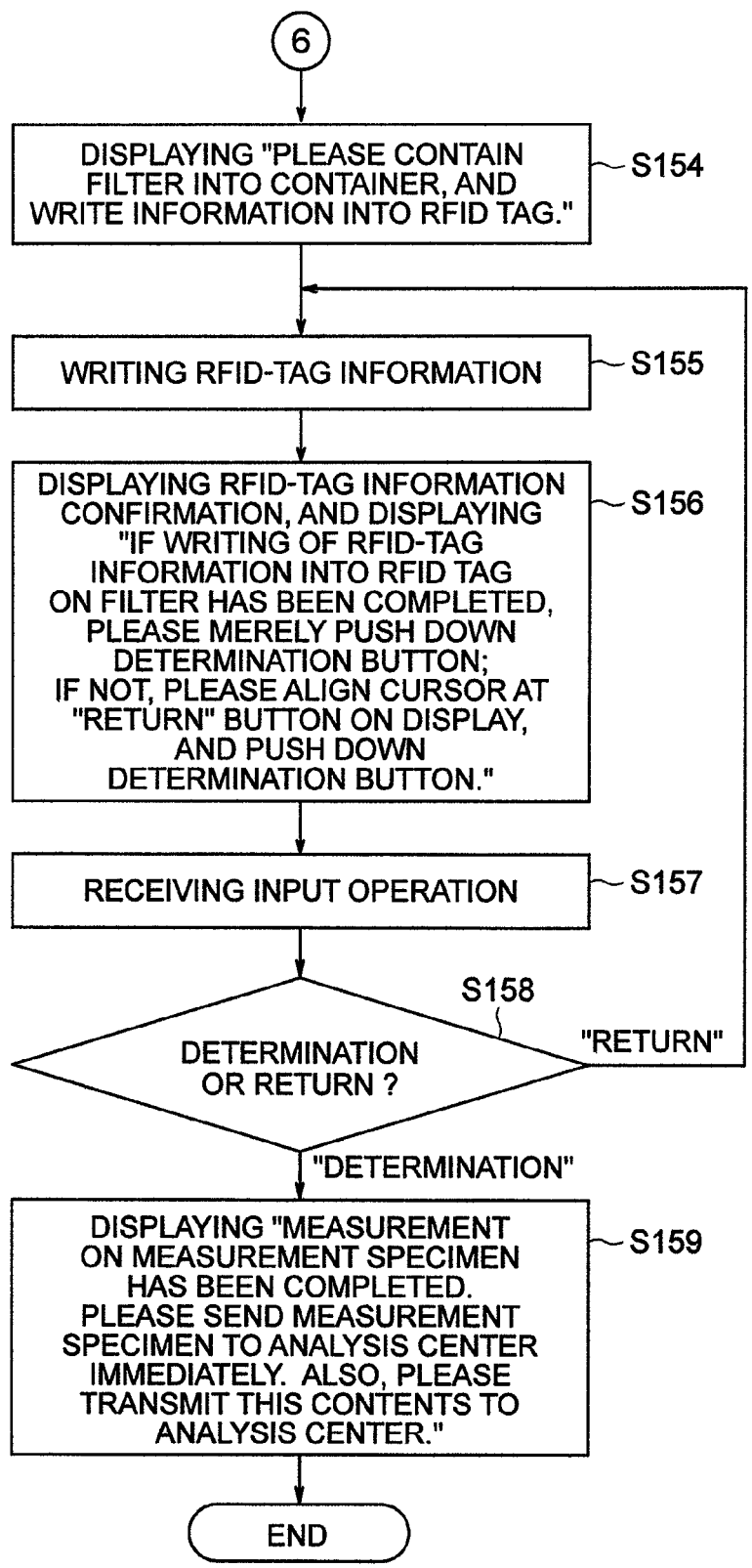
FIG. 12 is a flowchart for illustrating the flow of the control for assisting, with the mobile terminal, the operations of the sampling of the measurement specimen and the gross measurement on the measurement specimen at the worksite.

In the present embodiment, in accompaniment with the collection-condition information and the sampling-worksite information, the result of the gross measurement at the worksite 110 (i.e., the gross-measurement information) is fetched into the server 3 in the analysis center 120 as the RFID-tag identification recorded on the RFID tag 12C affixed on the filter 11. The present invention, however, is not limited thereto. Namely, the following embodiment is also configurable: As described above, the mobile terminal 9 is connected to the main unit 1a of the terminal via the USB connector. Then, all the information rewritten into the RFID tag 12C at the step S155 of the flowchart illustrated in FIG. 12 is transmitted to the server 3 via the network 2. Moreover, instead of the steps S401 and S402 illustrated in FIG. 30, the measurement-data management section 36 in the server 3 records all the data into the measurement-data DB 48 in the ascending order of the collection termination point-in-times from the earliest collection termination point-in-time.

In this case, in the operation of the measurement-specimen reception, the measurement-data management section 36 reads the information from the RFID tags 12C. Then, the section 36 records the read information into the measurement-data DB 48 in a manner of adding thereto a measurement-specimen arrival flag (not illustrated in FIG. 33) for indicating that the pre-recorded measurement specimen has already arrived thereat. The addition of this flag indicates that the information is analyzable. Furthermore, at the step S501 of the flowchart illustrated in FIG. 31, the description is rewritten as follows: "retrieving measurement-data DB, and extracting measurement specimen in which measurement-specimen arrival flag stands, and which is unanalyzed and whose collection termination point-in-time is the earliest".

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An environmental-radioactivity measurement/management system, comprising:
    a first measurement instrument for making gross measurement of radiation;
    a server which manages an environmental-radioactivity measurement service-operation;
    said environmental-radioactivity measurement service-operation being an operation of sampling measurement specimens at a measurement place requested by a client, making said gross measurement of radiation by using said first measurement instrument deployed at a worksite, sending result of said gross measurement and said measurement specimens to an analysis center, and, at said analysis center, calculating amounts of radioactive nuclides of said measurement specimens at a sampling point-in-time by analyzing both said gross measurement made by said first measurement instrument and further measurement of radiation of said measurement specimens at said analysis center, and reporting said calculated amounts to said client,
    said server, comprising:
    a contract management unit which manages measurement contract information which includes said measurement place requested by said client; and
    a measurement-instrument calibration management unit which manages a calibration schedule of said first measurement instrument deployed at a worksite; wherein
    said measurement-instrument calibration management unit issues an instruction so that an alternative first measurement instrument will be delivered within a calibration expiration time-limit of said first measurement instrument, said first measurement instrument being deployed at said measurement place which is requested by said client based on said measurement contract information managed by said contract management unit, and so that said first measurement instrument will be deployed until at that time the first measurement instrument will be recalled in exchange for said delivery of said alternative first measurement instrument, and said first measurement instrument will be designated for recalibration.

2. The environmental-radioactivity measurement/management system according to claim 1, wherein
    said server further comprises a memory unit which stores measurement-instrument information, said measurement-instrument information including said calibration expiration time-limit of said first measurement instrument deployed at a worksite,
    said measurement-instrument calibration management unit managing said calibration schedule by further storing detection efficiency of said first measurement instrument into said memory unit as said measurement-instrument information.

3. The environmental-radioactivity measurement/management system according to claim 2, wherein
    said environmental-radioactivity measurement service-operation being an operation of collecting progeny nuclides of radon and thoron in the air into a filter using a collector deployed at said measurement place, employing said collected progeny nuclides as said measurement specimens, calculating amounts of radon and thoron in said air at the time of said collection, and reporting said calculated amounts to said client,
    said server, further comprising:
    a rental-appliance management unit which manages rental of said collector, said first measurement instrument, and a measurement base to said client as rental appliances, and storing rental information about said rental appliances into said memory unit, said measurement base setting said measurement specimens into a predetermined measurement condition with respect to said first measurement instrument, said rental appliances being to be deployed at said measurement place; and
    a billing processing unit which processes charging of said client fees,
    said billing processing unit periodically calculating said fees based on a number of said measurement specimens and said rental information.

4. The environmental-radioactivity measurement/management system according to claim 3, wherein
said rental-appliance management unit performs scheduled management so that a check person will check said rental appliances for each predetermined-duration basis, said rental appliances being deployed at said measurement place.

5. The environmental-radioactivity measurement/management system according to claim 4, wherein
said measurement specimens are sampled by collecting dust or aerosol in the air into said filter using said collector,
a writable RFID (Radio Frequency Identification) tag being affixed on said filter,
in response to a situation that, after said collection, at least sampling-worksite information about a sampling place and collection-condition information about a collection operation using said collector are written into said RFID tag affixed on said filter, and that said measurement specimens are sent to said analysis center,
said server acquiring, via an input unit, said sampling-worksite information and collection-condition information from said RFID tag affixed on said filter, and calculating said radon amount and thoron amount per unit air volume based on said collection-condition information.

6. The environmental-radioactivity measurement/management system according to claim 3, wherein
said measurement specimens are sampled by collecting dust or aerosol in the air into said filter using said collector,
a writable RFID (Radio Frequency Identification) tag being affixed on said filter,
in response to a situation that, after said collection, at least sampling-worksite information about a sampling place and collection-condition information about a collection operation using said collector are written into said RFID tag affixed on said filter, and that said measurement specimens are sent to said analysis center,
said server acquiring, via an input unit, said sampling-worksite information and collection-condition information from said RFID tag affixed on said filter, and calculating said radon amount and thoron amount per unit air volume based on said collection-condition information.

7. The environmental-radioactivity measurement/management system according to claim 2, wherein
said measurement specimens are sampled by collecting dust or aerosol in the air into a filter using a collector,
a writable RFID (Radio Frequency Identification) tag being affixed on said filter,
in response to a situation that, after said collection, at least sampling-worksite information about a sampling place and collection-condition information about a collection operation using said collector are written into said RFID tag affixed on said filter, and that said measurement specimens are sent to said analysis center,
said server acquiring, via an input unit, said sampling-worksite information and collection-condition information from said RFID tag affixed on said filter, and calculating radon amount and thoron amount per unit air volume based on said collection-condition information.

8. The environmental-radioactivity measurement/management system according to claim 1, wherein
said measurement specimens are sampled by collecting dust or aerosol in the air into a filter using a collector,
a writable RFID (Radio Frequency Identification) tag being affixed on said filter,
in response to a situation that, after said collection, at least sampling-worksite information about a sampling place and collection-condition information about a collection operation using said collector are written into said RFID tag affixed on said filter, and that said measurement specimens are sent to said analysis center,
said server acquiring, via an input unit, said sampling-worksite information and collection-condition information from said RFID tag affixed on said filter, and calculating radon amount and thoron amount per unit air volume based on said collection-condition information.

9. An environmental-radioactivity measurement/management server which manages an environmental-radioactivity measurement service-operation;
said environmental-radioactivity measurement service-operation being an operation of sampling measurement specimens at a measurement place requested by a client, using a first measurement instrument deployed at a worksite for making gross measurement of radiation, sending result of said gross measurement and said measurement specimens to an analysis center, and, at said analysis center, calculating amounts of radioactive nuclides of said measurement specimens at a sampling point-in-time by analyzing both said gross measurement made by said first measurement instrument and further measurement of radiation of said measurement specimens at said analysis center, and reporting said calculated amounts to said client,
said server, comprising:
a hardware processor and memory;
a contract management unit which manages measurement contract information which includes said measurement place requested by said client; and
a measurement-instrument calibration management unit which manages a calibration schedule of said first measurement instrument deployed at a worksite; wherein
said measurement-instrument calibration management unit issues an instruction so that an alternative first measurement instrument will be delivered within a calibration expiration time-limit of said first measurement instrument, said first measurement instrument being deployed at said measurement place which is requested by said client based on said measurement contract information managed by said contract management unit, and so that said first measurement instrument will be deployed until at that time the first measurement instrument will be recalled in exchange for said delivery of said alternative first measurement instrument, and said first measurement instrument will be designated for recalibration.

10. The server according to claim 9, wherein
said server further comprises a memory unit which stores measurement-instrument information, said measurement-instrument information including said calibration expiration time-limit of said first measurement instrument deployed at a worksite,
said measurement-instrument calibration management unit managing said calibration schedule by further storing detection efficiency of said first measurement instrument into said memory unit as said measurement-instrument information.

11. The server according to claim 10, wherein
said environmental-radioactivity measurement service-operation being an operation of collecting progeny nuclides of radon and thoron in the air into a filter using a collector deployed at said measurement place, employing said collected progeny nuclides as said measurement specimens, calculating amounts of radon and thoron in said air at the time of said collection, and reporting said calculated amounts to said client, said server, further comprising:

a rental-appliance management unit which manages rental of said collector, said first measurement instrument, and a measurement base to said client as rental appliances, and storing rental information about said rental appliances into said memory unit, said measurement base setting said measurement specimens into a predetermined measurement condition with respect to said first measurement instrument, said rental appliances being to be deployed at said measurement place; and a billing processing unit which processes charging of said client fees, said billing processing unit periodically calculating said fees based on a number of said measurement specimens and said rental information.

12. The server according to claim 11, wherein said rental-appliance management unit performs scheduled management so that a check person will check said rental appliances for each predetermined-duration basis, said rental appliances being deployed at said measurement place.

13. The server according to claim 12, wherein said measurement specimens are sampled by collecting dust or aerosol in the air into said filter using said collector, a writable RFID (Radio Frequency Identification) tag being affixed on said filter, in response to a situation that, after said collection, at least sampling-worksite information about a sampling place and collection-condition information about a collection operation using said collector are written into said RFID tag affixed on said filter, and that said measurement specimens are sent to said analysis center, said server acquiring, via an input unit, said sampling-worksite information and collection-condition information from said RFID tag affixed on said filter, and calculating said radon amount and thoron amount per unit air volume based on said collection-condition information.

14. The server according to claim 11, wherein said measurement specimens are sampled by collecting dust or aerosol in the air into said filter using said collector, a writable RFID (Radio Frequency Identification) tag being affixed on said filter, in response to a situation that, after said collection, at least sampling-worksite information about a sampling place and collection-condition information about a collection operation using said collector are written into said RFID tag affixed on said filter, and that said measurement specimens are sent to said analysis center, said server acquiring, via an input unit, said sampling-worksite information and collection-condition information from said RFID tag affixed on said filter, and calculating said radon amount and thoron amount per unit air volume based on said collection-condition information.

15. The server according to claim 10, wherein said measurement specimens are sampled by collecting dust or aerosol in the air into a filter using a collector, a writable RFID (Radio Frequency Identification) tag being affixed on said filter, in response to a situation that, after said collection, at least sampling-worksite information about a sampling place and collection-condition information about a collection operation using said collector are written into said RFID tag affixed on said filter, and that said measurement specimens are sent to said analysis center, said server acquiring, via an input unit, said sampling-worksite information and collection-condition information from said RFID tag affixed on said filter, and calculating radon amount and thoron amount per unit air volume based on said collection-condition information.

16. The server according to claim 9, wherein said measurement specimens are sampled by collecting dust or aerosol in the air into a filter using a collector, a writable RFID (Radio Frequency Identification) tag being affixed on said filter, in response to a situation that, after said collection, at least sampling-worksite information about a sampling place and collection-condition information about a collection operation using said collector are written into said RFID tag affixed on said filter, and that said measurement specimens are sent to said analysis center, said server acquiring, via an input unit, said sampling-worksite information and collection-condition information from said RFID tag affixed on said filter, and calculating radon amount and thoron amount per unit air volume based on said collection-condition information.

* * * * *